(12) United States Patent
Yasui et al.

(10) Patent No.: US 7,231,844 B2
(45) Date of Patent: Jun. 19, 2007

(54) TRANSMISSION CONTROL SYSTEM

(75) Inventors: Yuji Yasui, Wako (JP); Kanako Shimojo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 304 days.

(21) Appl. No.: 11/002,920

(22) Filed: Dec. 3, 2004

(65) Prior Publication Data

US 2005/0078516 A1    Apr. 14, 2005

(30) Foreign Application Priority Data

Dec. 5, 2003  (JP) ............................. 2003-407149
Dec. 5, 2003  (JP) ............................. 2003-407150

(51) Int. Cl.
*F16H 59/00*    (2006.01)

(52) U.S. Cl. .......................................... 74/335; 477/34

(58) Field of Classification Search ................... 74/335; 477/34; 701/51, 59
See application file for complete search history.

(56) References Cited

U.S. PATENT DOCUMENTS 6,164,149 A * 12/2000 Ohmori et al. ........... 74/336 R
6,428,446 B1 * 8/2002 Ohtsuka ...................... 477/94
6,578,442 B2 * 6/2003 Aoyama et al. ............... 74/335
7,013,746 B2 * 3/2006 Matsumura et al. .......... 74/335
7,071,638 B2 * 7/2006 Yasui et al. ................. 318/135

FOREIGN PATENT DOCUMENTS

| JP | 1-303345 | * 12/1989 | .................. 74/335 |
| JP | 2003-015703 | 1/2003 | |
| JP | 2004-211717 | 7/2004 | |

* cited by examiner

*Primary Examiner*—Ha Ho
(74) *Attorney, Agent, or Firm*—Arent Fox LLP

(57) ABSTRACT

A transmission control system is capable of promptly compensating for a disturbance attributable to a mechanical interference that takes place in a selecting operation so as to quickly complete the selecting operation. An adaptation disturbance observer provided in a selection controller calculates a disturbance component term in a model equation of a selecting mechanism for each control cycle of the selection controller. An equivalent control input calculator of a sliding mode controller uses the disturbance component term calculated by the adaptation disturbance observer to calculate an equivalent control input. An adder adds a reaching law input calculated by a reaching law input calculator and the equivalent control input to calculate a control value of a voltage to be applied to a selection motor of the selecting mechanism.

12 Claims, 32 Drawing Sheets

FIG. 3
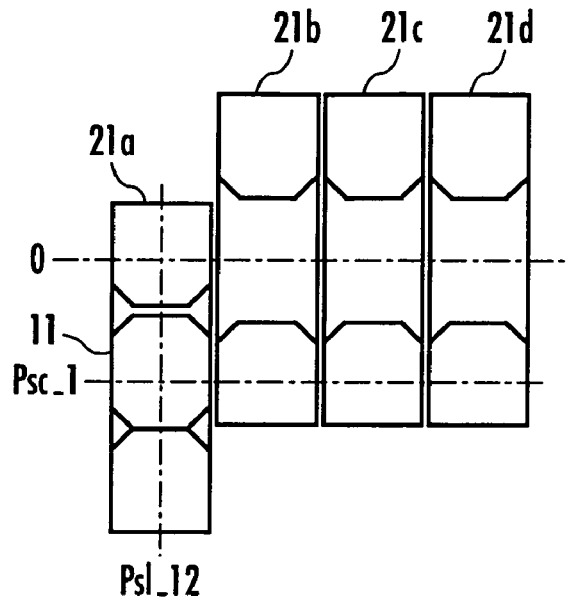
(a) 2ND GEAR IN ENGAGEMENT
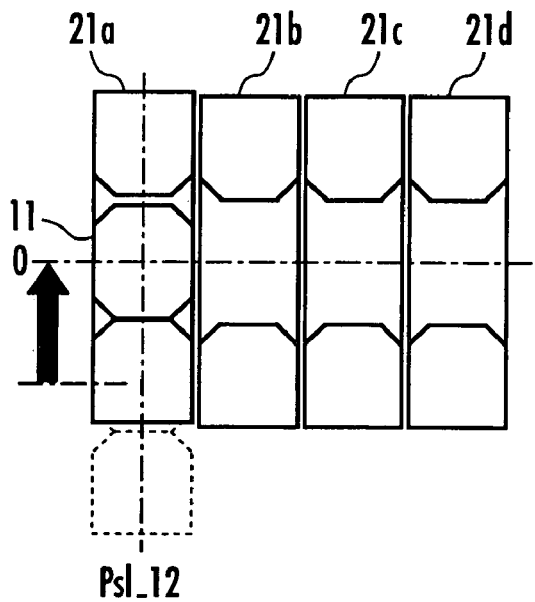
(b) DISENGAGING 2ND GEAR
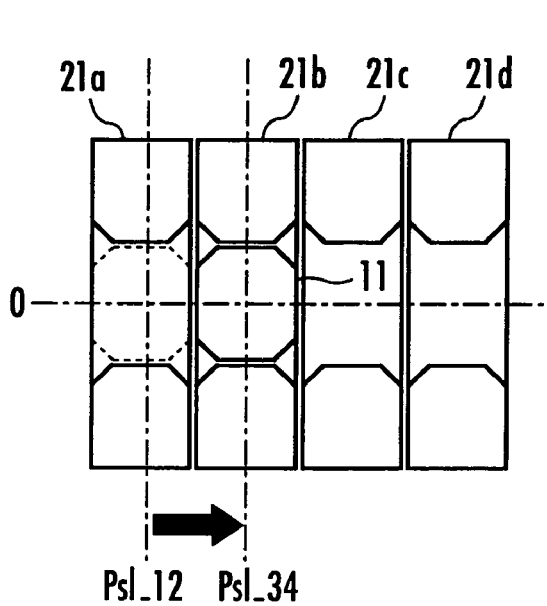
(c) SELECTING 3RD GEAR
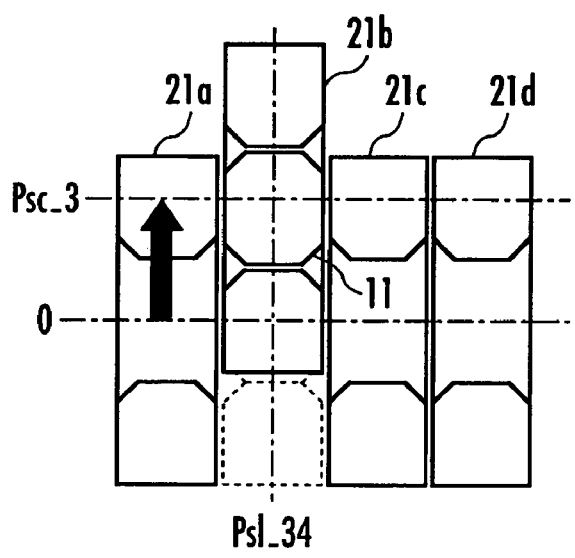
(d) SHIFTING TO 3RD GEAR FIG. 11
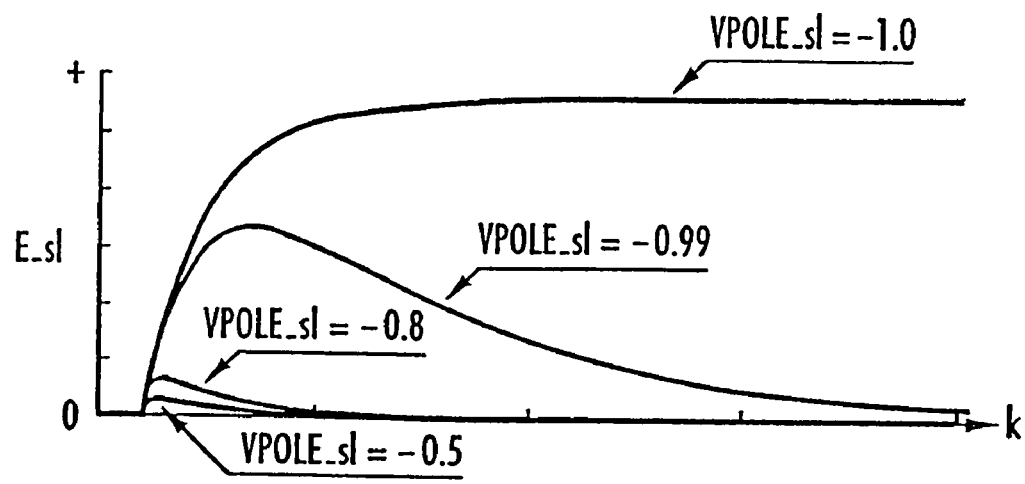
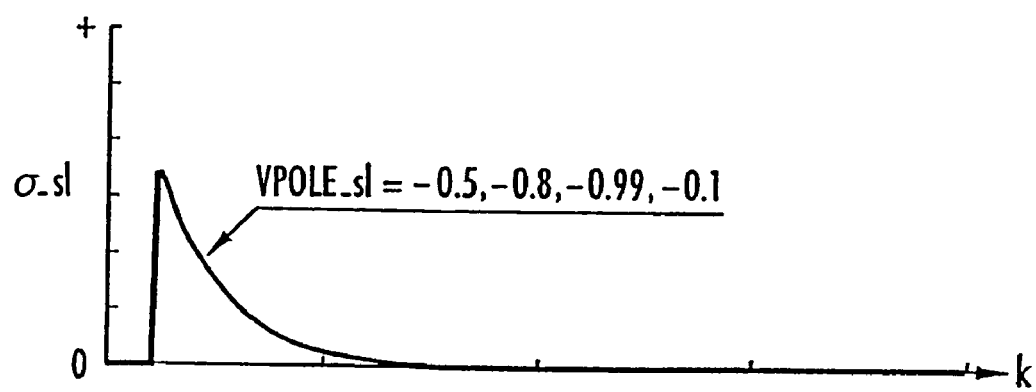
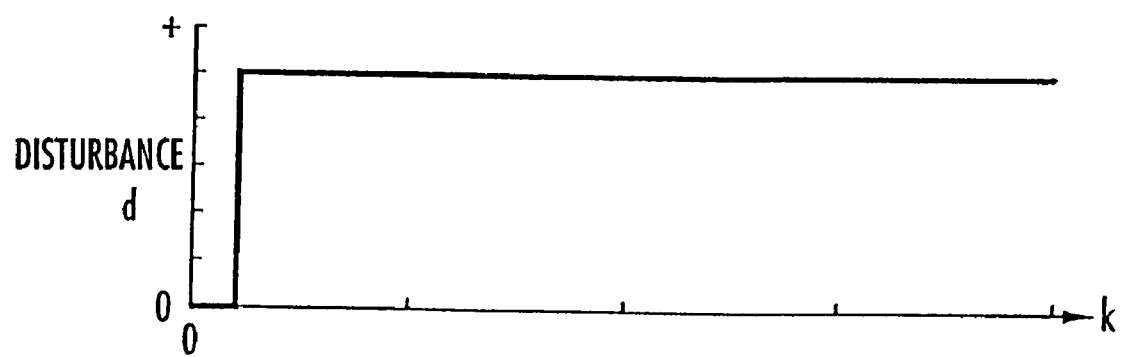

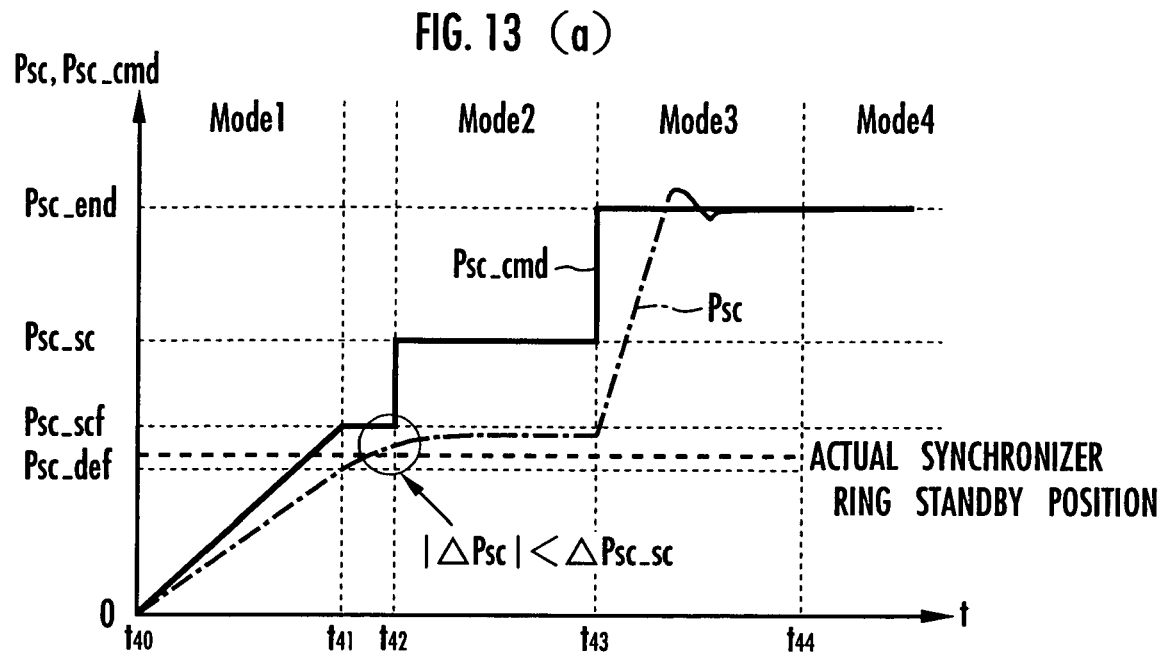
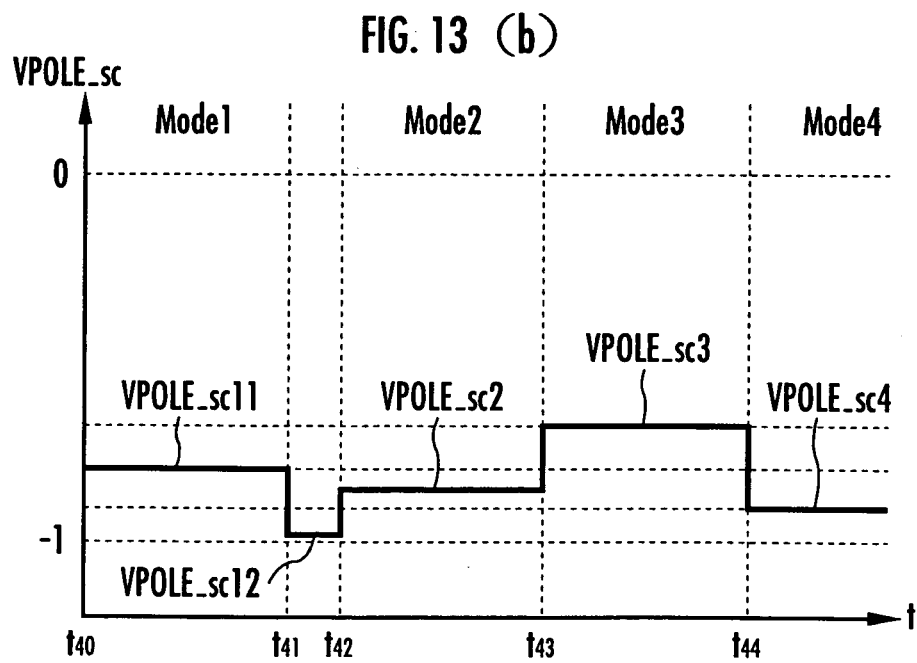

TRANSMISSION CONTROL SYSTEM

BACKGROUND OF THE INVENTION

1. Field of the Invention

The present invention relates to a transmission control system that controls the operation of a selection actuator for moving a shift arm of a transmission in a selecting direction.

2. Description of the Related Art

As a transmission mounted in a vehicle, there has been known, for example, an automatic/manual transmission (AMT) that includes actuators, such as motors, to perform a selecting operation and a shifting operation of a manual transmission (MT) that transmits motive power between an input shaft and an output shaft of a vehicle when a driver manually carries out the selecting and shifting operations.

The present inventors have proposed a control system for performing a shifting operation of an automatic/manual transmission by adopting response specifying control in the previous application, namely, Japanese Patent Laid-Open Publication No. 2004-211717. In the control system, a coupling sleeve, for example, that integrally rotates with an input shaft is moved into contact with a synchronized gear through the intermediary of a synchronizer ring, and the coupling sleeve and the synchronized gear are rotationally synchronized to perform the shifting operation.

In this case, the response specifying control is conducted by determining a manipulated variable for driving actuators so as to converge the value of a switching function to zero. The switching function is defined by a linear function based on the difference between a target position and an actual position of a coupling sleeve. A computing coefficient of the linear function is set to lower disturbance suppressing capability level so as to produce a compliance property, which is resiliency of, for example, rubber, thereby damping contact impacts when the coupling sleeve comes into contact with the synchronizer ring.

There has been also proposed a control system that has achieved improved stability of sliding mode control by limiting a model parameter identification range when identifying a model parameter in a model equation of a control object that changes due to deterioration with age or disturbance, thus restraining the occurrence of drift of a model parameter (refer to, for example, Japanese Patent Laid-Open Publication No. 2003-15703).

A conventional automatic/manual transmission control system calculates a target value Psl_cmd of a position in the selecting direction Psl and a target value Psc_cmd of a position in the shifting direction Psc of the shift arm involved in the selecting operation and the shifting operation in response to a speed change command to conduct positioning control by a selection controller that controls the operation of a selection actuator such that Psl agrees with Psl_cmd. Further, the positioning control is carried out by a shift controller that controls the operation of a shifting actuator such that Psc agrees with Psc_cmd.

FIG. 31A is a control block diagram showing a construction example of the selection controller. A selection controller 200 handles a selecting device 201 of an automatic/manual transmission according to a model represented by the following expression (1).

$$Psl(k+1) = a1\_sl \cdot Psl(k) + a2\_sl \cdot Psl(k-1) + b1\_sl \cdot Vsl(k) + b2\_sl \cdot Vsl(k-1) \tag{1}$$

where Psl(k): Position in the selecting direction of a selecting device 201 in a k-th control cycle; a1_sl, a2_sl, b1_sl, and b2_sl: Model parameters; and Vsl(k): Control input supplied to an actuator of the selecting device in the k-th control cycle.

The selection controller 200 determines a control value Vsl of a voltage to be applied to an actuator (not shown) of the selecting device 201 such that the position Psl of the selecting device 201 in the selecting direction agrees with its target value Psl_cmd. The selection controller 200 includes a subtracter 202 for calculating a difference E_sl between a selected position Psl and a target position Psl_cmd, a switching function value calculator 203 for calculating a value of a switching function σ_sl, an adaptation law input calculator 204 for calculating an adaptation law input Uadp_sl, a reaching law input calculator 205 for calculating a reaching law input Urch_sl, an equivalent control input calculator 206 for calculating an equivalent control input Ueq_sl, and an adder 207 for calculating a control value Vsl of an applied voltage by adding the adaptation law input Uadp_sl, the reaching law input Urch_sl, and the equivalent control input Ueq_sl.

The switching function calculator 203 calculates the switching function value σ_sl according to the following equation (3) from the difference E_sl(k) calculated by the subtracter 202 according to the following equation (2).

$$E\_sl(k) = Psl(k) - Psl\_cmd(k-1) \tag{2}$$

$$\sigma\_sl(k) = E\_sl(k) + VPOLE\_sl \cdot E\_sl(k-1) \tag{3}$$

where σ_sl(k): Switching function value in a k-th control cycle; and POLE_sl: Switching function setting parameter (−1<POLE_sl<0).

The equivalent control input calculator 206 calculates the equivalent control input Ueq_sl according to the following equation (4). The reaching law input calculator 205 calculates the reaching law input Urch_sl according to the following equation (5). The adaptation law input calculator 204 calculates the adaptation law input Uadp_sl according to the following equation (6).

$$Ueq\_sl(k) = \frac{1}{b1\_sl}\{(1 - VPOLE\_sl - a1\_sl) \cdot Psl(k) + \\ (VPOLE\_sl - a2\_sl) \cdot Psl(k-1) - b2\_sl \cdot Vsl(k-1) + \\ Psl\_cmd(k) + (VPOLE\_sl - 1) \cdot Psl\_cmd(k-1) - \\ VPOLE\_sl \cdot Psl\_cmd(k-2)\} \tag{4}$$

where Ueq_sl(k): Equivalent control input in a k-th control cycle.

$$Urch\_sl(k) = -\frac{Krch\_sl}{b1\_sl} \cdot \sigma\_sl(k) \tag{5}$$

where Urch_sl(k): Reaching law input in a k-th control cycle; and Krch_sl: Feedback gain.

$$Uadp\_sl(k) = -\frac{Kadp\_sl}{b1\_sl} \cdot \sum_{i=0}^{k} \sigma\_sl(i) \tag{6}$$

where Uadp_sl(k): Adaptation law input in a k-th control cycle; and Kadp_sl: Feedback gain.

The adder 207 calculates a control value Vsl(k) of a voltage to be applied to an actuator of the selecting device 201 according to the following equation (7).

$$Vsl(k)=Ueq\_sl(k)+Urch\_sl(k)+Uadp\_sl(k) \quad (7)$$

Referring to FIG. 31B, in the selecting device 201, a shift arm 211 is selectively positioned at points Psl_12, Psl_34, Psl_56, and Psl_r at which the shift arm 211 engages shift pieces 210a, 210b, 210c, and 210d for different speeds, which are attached to the shift arm. There are cases where the shift pieces 210 disposed are displaced due to backlashes or individual variations of the device or due to shocks, vibrations or the like. FIG. 31B shows a case where the shift piece 210b, for example, has been dislocated downward.

In such a state wherein the shift piece 210 has been dislocated, if a selecting operation is performed to make a shift from 5th/6th gear select position Psl_56 to 1st/2nd gear select position Psl_12, then the shift arm 211 comes in contact with a chamfered portion of the shift piece 210b, interfering with each other. At this time, the selection controller 200 is required to cancel the interference between the shift arm 211 and the shift piece 210b by canceling a chamfer direction component Fsc' of a force Fsc generated by the positioning control of the shift actuator by a chamber direction component Fsl' of a force Fsl generated by a selection actuator to move the shift arm 211 downward in the figure.

In the conventional selection controller 200 constructed as illustrated in FIG. 31A, disturbance compensation based on the adaptation law input Uadp_sl has been used to cope with the aforementioned problem occurring in the selecting operation. However, the disturbance compensation based on the adaptation law input Uadp_sl is calculated using an integral value of the switching function σ_sl(k) according to the above equation (6), so that if a large disturbance by Fsc is applied, then it takes much time until a compensation therefor is reflected in the adaptation law input Uadp_sl(k). This has been inconveniently leading to deteriorated performance of following a target value Psl_cmd of a position in the selecting direction of the shift arm 211.

Furthermore, in a conventional automatic/manual transmission control system, the response specifying control has been used to control the selection actuator by the selection controller to ensure maximized suppression of the occurrence of overshoot in the positioning in the selecting direction, thereby shortening the time required for the selecting operation.

However, there are cases where the dynamic characteristic of a selecting device of a transmission to be controlled deviates from a standard dynamic characteristic assumed beforehand because of changes in the torque characteristic of a shift actuator (motor or the like) attributable mainly to variations in the friction characteristic of the automatic/manual transmission, fluctuation in a supply voltage, or individual variations in mechanical components.

FIGS. 32A and 32B illustrate displacements of the shift arm during the selecting operation. The axis of ordinates indicates target position Psl_cmd and actual position Psl of the shift arm in the selecting direction, while the axis of abscissas provides a common time axis t. FIG. 32A shows the displacement of the shift arm when the characteristic of the selecting device remains within the standard characteristic range, while FIG. 32B shows the displacement of the shift arm when the dynamic characteristic of the selecting device is out of the standard characteristic range.

Referring to FIG. 32A, when the target position Psl_cmd in the selecting direction is changed from Psl_cmd60 to Psl_cmd61 at $t_{61}$ to begin the selecting operation, the shift arm moves to Psl_cmd61 without vibrations or overshooting. Then, the selecting operation is completed at $t_{62}$ when the conditions that determine the completion of the selecting operation, namely, (1) ΔPsl (=Psl−Psl_cmd)<D_Psl (a determination value of a rate of change) and (2)|Psl−Psl_cmd61|<E_Pslf (a determination value of difference) are satisfied.

Referring to FIG. 32B, when the selecting operation is begun at $t_{61}$, the shift arm overshoots, exceeding Psl_cmd61 and a vibration takes place. The vibration leads to a longer time for the conditions (1) and (2) for determining that the selecting operation is completed to be satisfied at $t_{63}$ and the selecting operation is completed, as compared with the case illustrated in FIG. 32A. This inconveniently delays the start of the shifting operation that follows the selecting operation, resulting in prolonged time required for speed change processing.

SUMMARY OF THE INVENTION

The present invention relates to an improvement in a transmission control system provided with a selection controller that controls an operation of a selection actuator for moving a shift arm, which is provided in a transmission to perform a selecting operation and a shifting operation and which is displaced from a neutral position by the shifting operation to establish a predetermined speed, in a selecting direction so as to position the shift arm in a selected speed position.

It is an object of the present invention to provide a transmission control system capable of promptly compensating a disturbance attributable to mechanical interference taking place in the selecting operation so as to quickly complete the selecting operation.

It is another object of the present invention to provide a transmission control system capable of quickly completing speed change processing even if a dynamic characteristic of a selecting device of a transmission is out of a standard dynamic characteristic of a selecting mechanism of a transmission.

The transmission control system according to one aspect of the present invention includes a disturbance estimator that estimates a disturbance applied to a selecting mechanism of the transmission during the selecting operation. The selection controller determines a control input to the selection actuator on the basis of an estimated disturbance value given by the disturbance estimator.

With this arrangement, the selection controller determines a control input to the selection actuator on the basis of the estimated disturbance value given by the disturbance estimator. Hence, when a disturbance is applied to the selecting mechanism of the transmission, a control input to the selection actuator based on the disturbance is promptly determined, allowing a selecting operation to be quickly performed, suppressing influences caused by the disturbance.

The disturbance estimator estimates a disturbance applied to the selecting mechanism of the transmission on the basis of a control input for the selection actuator and the position of the shift arm in the selecting direction.

With this arrangement, the performance of following a target position of the shift arm in the selecting direction when a control input is supplied to the selection actuator changes with the magnitude of disturbance applied to the selecting mechanism of the transmission. This enables the disturbance estimator to estimate the disturbance applied to the selecting mechanism of the transmission on the basis of the control input supplied to the selection actuator and the position of the shift arm in the selecting direction.

The selection controller calculates a control input to the selection actuator by using response specifying control in which a behavior and a speed for attenuating a difference between a target position and an actual position of the shift arm can be variably specified.

With this arrangement, calculating a control input supplied to the selection actuator using the response specifying control enables the shift arm to be moved to a target position in the selecting operation while suppressing the occurrence of overshooting or vibrations.

Furthermore, the selection controller calculates a control input to the selection actuator on the basis of an equivalent control input and a reaching law input calculated using the estimated disturbance value given by the disturbance estimator in the response specifying control.

With this arrangement, the selection controller compensates for a disturbance by calculating the equivalent control input using an estimated disturbance value supplied by the disturbance estimator rather than compensating for a disturbance on the basis of an adaptation law input in the response specifying control. This makes it possible to accomplish quicker compensation for a disturbance than a case where the adaptation law input is used, which requires more time for compensating a disturbance because it involves integral processing.

The disturbance estimator calculates, as an estimated disturbance value, an identification value of a model parameter of a disturbance component term in a model equation in which the selecting mechanism of the transmission has been modeled using a plurality of model parameters.

With this arrangement, the selection controller directly uses an identification value of a disturbance component term in the model equation to calculate an equation control input in the response specifying control. This makes it possible to enhance the capability of the shift arm to follow a target position when a disturbance occurs.

The selection controller carries out only processing for identifying the disturbance component term, while the remaining model parameters being fixed values.

With this arrangement, the selection controller absorbs a modeling error attributable to the plurality of model parameters by the model parameter identification processing. This makes it possible to reduce the amount of computation for the identification processing and also to shorten the time required for an estimated disturbance value to converge to a proper value, thus permitting quicker compensation for a disturbance to be achieved.

The disturbance estimator calculates an identification value of a model parameter of a disturbance component term in each control cycle on the basis of a difference between an estimated position of the shift arm calculated using a model parameter of a disturbance component term in a previous control cycle and an actual position of the shift arm.

With this arrangement, a model parameter of a disturbance component term in each control cycle can be easily calculated by using a model parameter of a disturbance component term in a previous control cycle.

The transmission control system further includes a partial parameter identifier for identifying an identification model parameter so as to minimize a difference between an output of a virtual plant that outputs an equation formed of a component term related to a non-identification model parameter not to be identified among model parameters and an output of a model equation of the virtual plant that is formed of a component term related to tan identification model parameter to be identified among the model parameters by using a model equation which models a selecting mechanism of the transmission, represents a position of the shift arm in a selecting direction in each predetermined control cycle by a positional component term related to a position of the shift arm in the selecting direction in a previous control cycle, a control input component term related to a control input to the selection actuator in the previous control cycle, and a disturbance component term, and uses a coefficient of the position component term, a coefficient of the control input component term, and the disturbance component term as model parameters, wherein the selection controller determines a control input to be supplied to the selection actuator on the basis of an identification model parameter identified by the partial parameter identifying means and the non-identification model parameter.

With this arrangement, the partial parameter identifier identifies only the identification model parameter among the model parameters of the model equation, and it does not identify the non-identification model parameter. It is theoretically known that the convergence time of a model parameter increases with the number of model parameters if model parameters are identified using, for example, the method of least squares.

Thus, limiting the number of model parameters to be identified allows the convergence time of model parameters to be reduced, so that a selecting operation can be quickly completed, while restraining the shift arm from overshooting a target position or vibrating during the selecting operation. Moreover, the partial parameter identifier can easily identify the identification model parameters by using the difference between an output of the virtual plant and an output of a model equation of the virtual plant formed of a component term related to an identification model parameter to be identified among the model parameters.

The identification model parameters are the coefficient of the control input component term and the disturbance component term, and the non-identification parameter is the coefficient of the positional component term.

Accordingly, among the model parameters of the model equation, the coefficient of the control input component term and the disturbance component term are highly interlocked with changes in the dynamic characteristic of the selecting mechanism of the transmission. Therefore, the coefficient of the control input component term and the disturbance component term are set as the identification model parameters to be identified, so that model parameters of the model equation can be efficiently identified in response to a change in the dynamic characteristic of the selecting mechanism.

The transmission control system further includes a non-identification parameter changer that changes the non-identification model parameter on the basis of the position of the shift arm.

With this arrangement, the transmission generally converts the rotation of a shift/selection shaft, to which the shift arm is attached, into substantially linear movement by a crank mechanism thereby to move the shift arm in the selecting direction. Thus, the movement of the shift arm in the selecting direction becomes nonlinear with respect to a rotational angle of the shift/selection shaft, and an effective inertia changes according to a bend of the crank mechanism. Hence, the non-identification parameter changer changes the non-identification model parameter according to the position of the shift arm, allowing a modeling error attributable to a nonlinear characteristic of the shift arm to be restrained when setting the non-identification model parameter.

The transmission control system further includes an identification parameter reference value setter for setting a reference value of the identification model parameter on the basis of a position of the shift arm, wherein the partial parameter identifier corrects the identification parameter reference value on the basis of a difference between an output of the virtual plant and a model equation of the virtual plant thereby to identify the identification model parameter.

With this arrangement, a modeling error of the identification model parameter attributable to the nonlinear characteristic of the shift arm is suppressed by setting the reference value of the identification model parameter according to the position of the shift arm, so that the time required for the identification model parameter to be identified can be shortened.

A transmission control system according to another aspect of the present invention includes a partial parameter identifier for identifying an identification model parameter so as to minimize a difference between an output of a virtual plant that outputs an equation formed of a component term related to a non-identification model parameter not to be identified among the model parameters and an output of a model equation of the virtual plant formed of a component term related to tan identification model parameter to be identified among the model parameters by using a model equation which models a selecting mechanism of the transmission, represents a position in a selecting direction of the shift arm in each predetermined control cycle by a positional component term related to a position of the shift arm in the selecting direction in a previous control cycle, a control input component term related to a control input to the selection actuator in the previous control cycle, and a disturbance component term, and uses a coefficient of the position component term, a coefficient of the control input component term, and the disturbance component term as model parameters, wherein the selection controller determines a control input to the selection actuator on the basis of an identification model parameter identified by the partial parameter identifier and the non-identification model parameter.

With this arrangement, the partial parameter identifier identifies only the identification model parameter among the model parameters of the model equation, and it does not identify the non-identification model parameter. Thus, by limiting the number of model parameters to be identified, the convergence time of a model parameter can be shortened. This makes it possible to promptly complete a selecting operation, while restraining the shift arm from overshooting a target position or the occurrence of vibrations during the selecting operation. The partial parameter identifier can easily identify the identification model parameter by using a difference between an output of the virtual plant and an output of a model equation of the virtual plant that is formed of a component term related to an identification model parameter to be identified among the model parameters.

BRIEF DESCRIPTION OF THE DRAWINGS

FIGS. 3A, 3B, 3C and 3D are operation explanatory diagrams of the transmission shown in FIG. 1;

FIG. 11 presents diagrams illustrating changes in a disturbance suppressing capability that take place when response specifying parameters are changed;

FIGS. 13A and 13B are graphs illustrating displacements of the shift arm in the shifting operation and set response specifying parameters;

DESCRIPTION OF THE PREFERRED EMBODIMENTS

Figure 1:
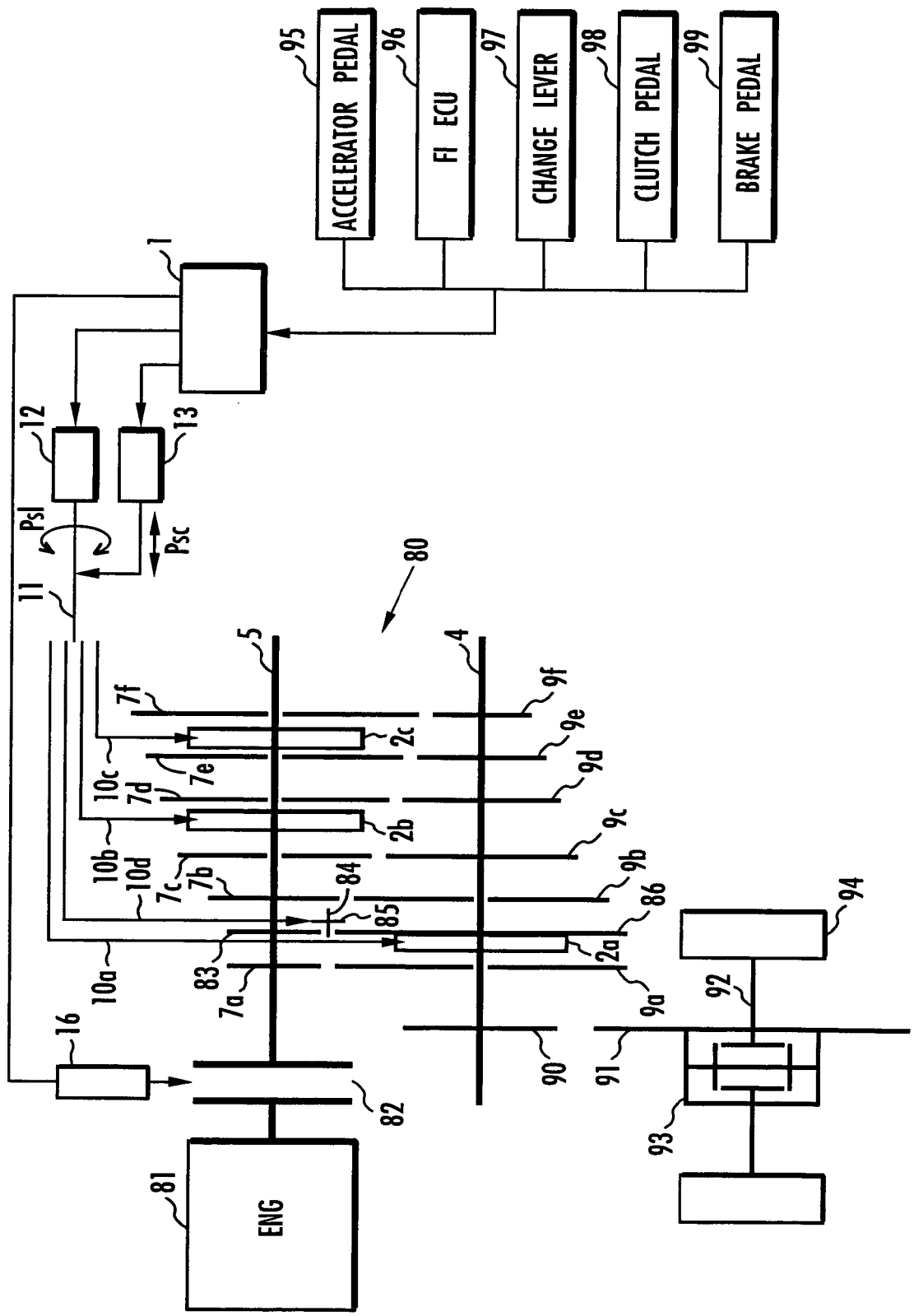
FIG. 1 is a block diagram of a transmission.
Figure 2:
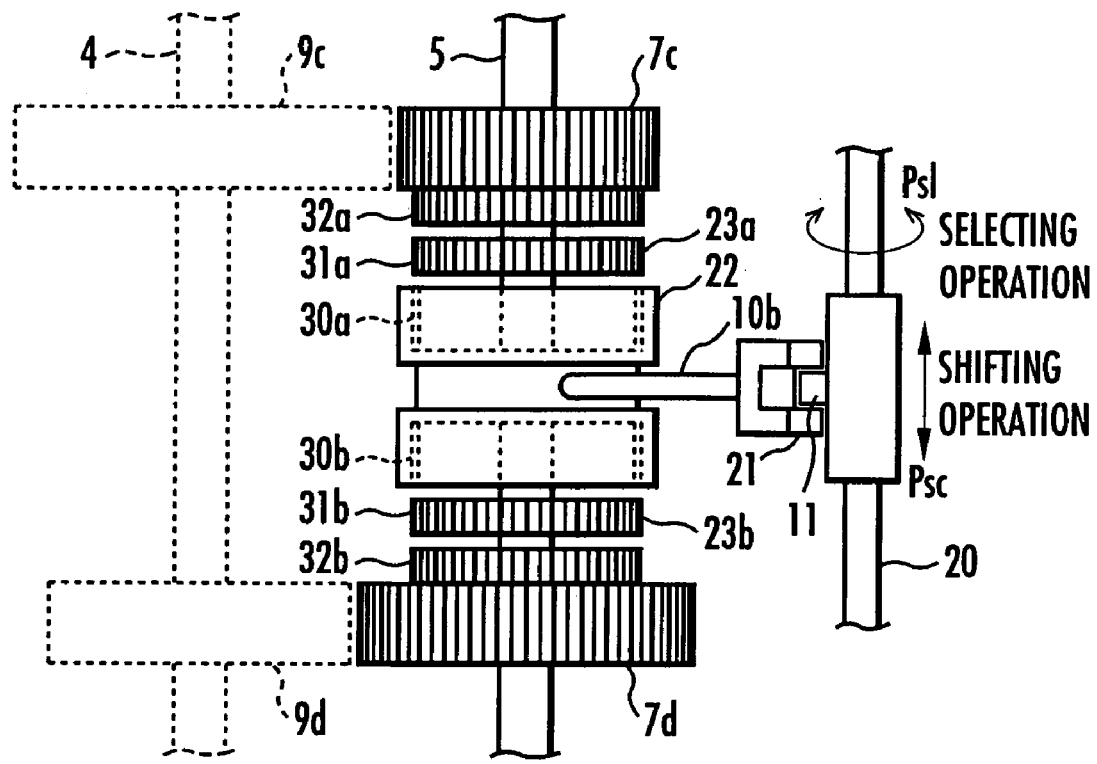
FIGS. 2A and 2B are detailed diagrams of a shifting/selecting mechanism of the transmission shown in FIG. 1.
Figure 2:
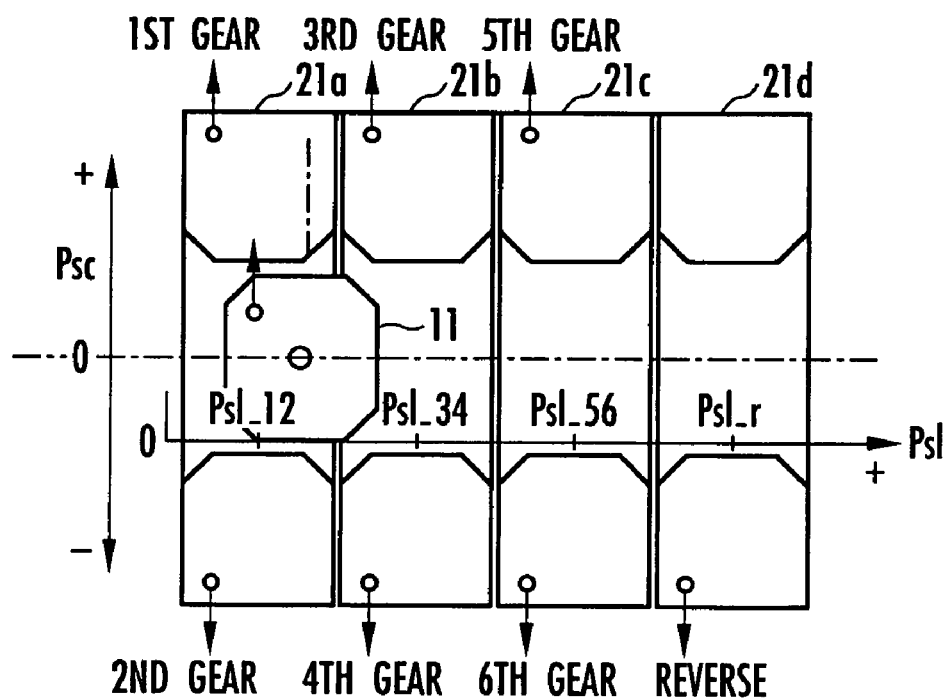
Figure 4:
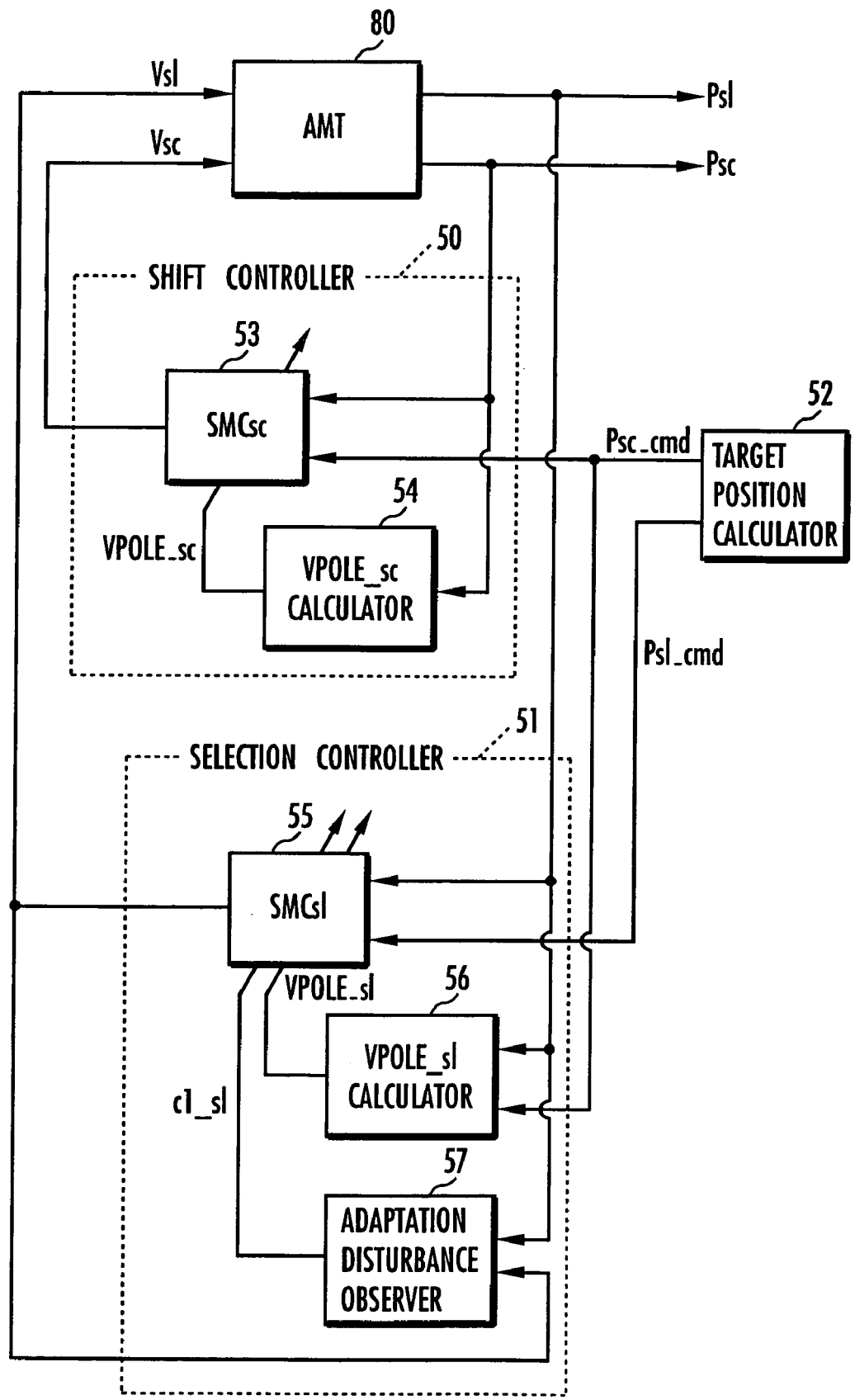
FIG. 4 is a block diagram of a first embodiment of a control unit shown in FIG. 1.
Figure 5:
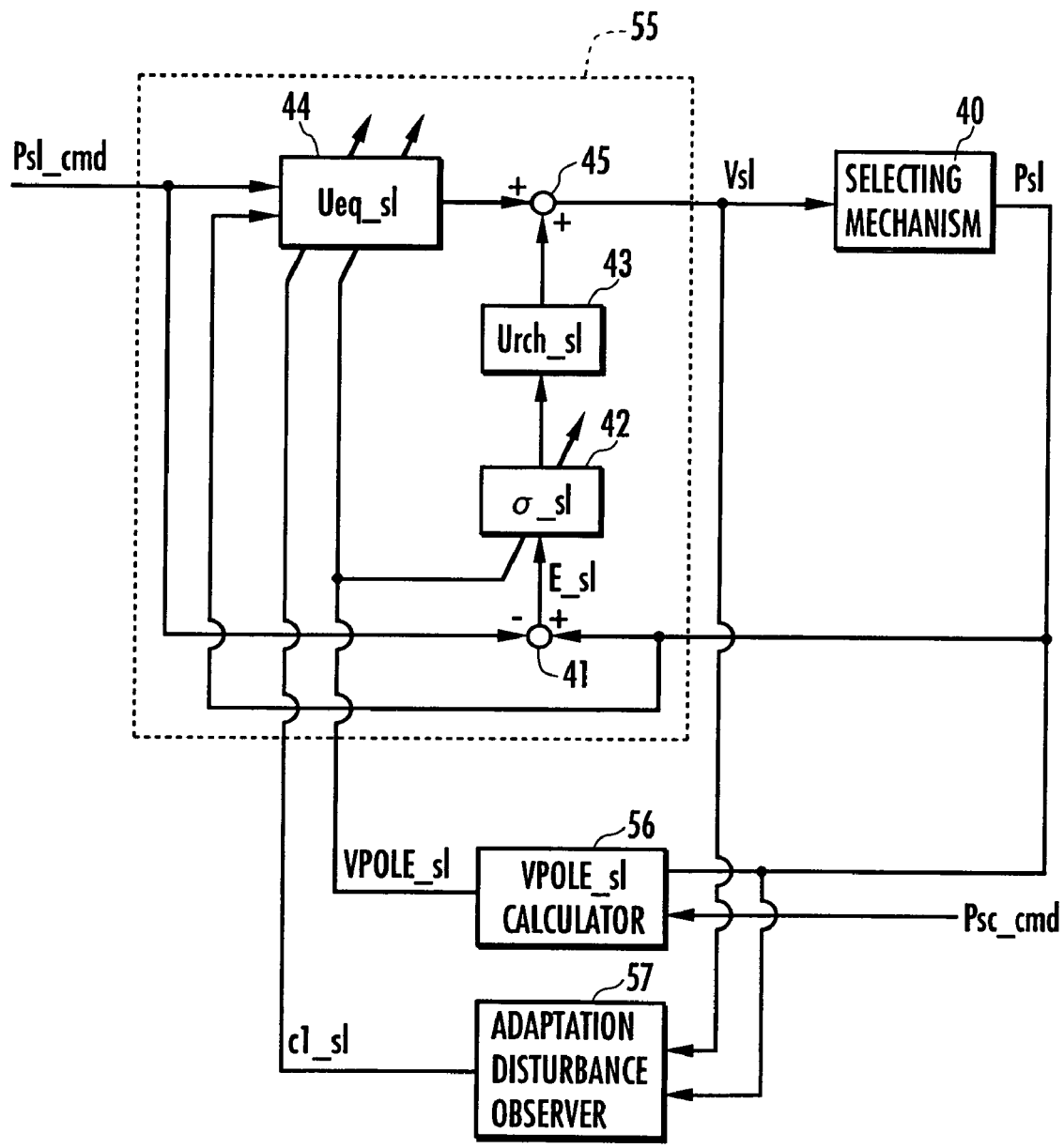
FIG. 5 is a block diagram showing a selection controller shown in FIG. 4.
Figure 6:
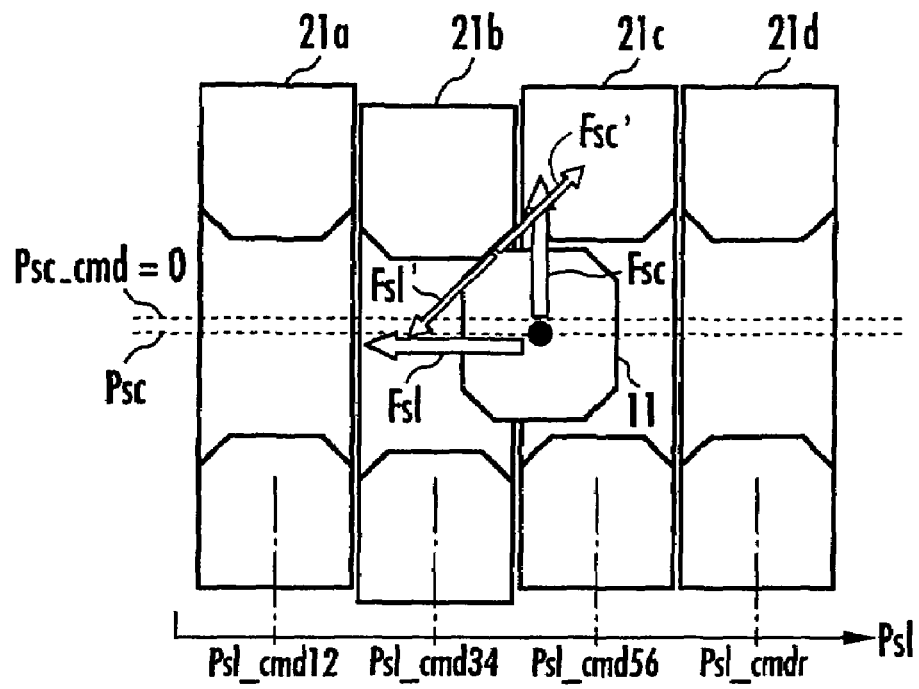
FIGS. 6A and 6B are explanatory diagrams of a selecting operation.
Figure 6:
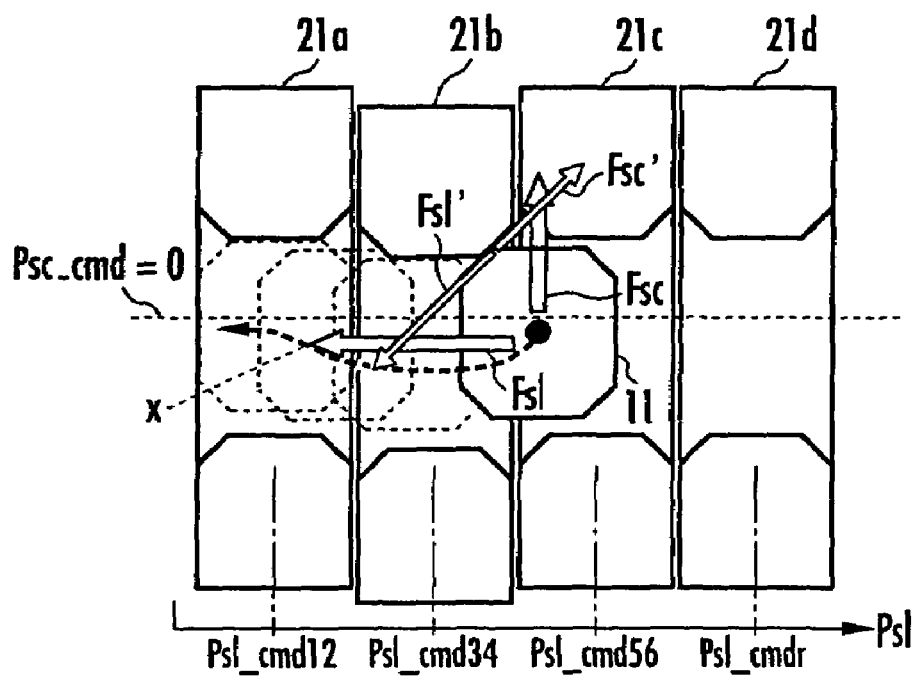
Figure 7:
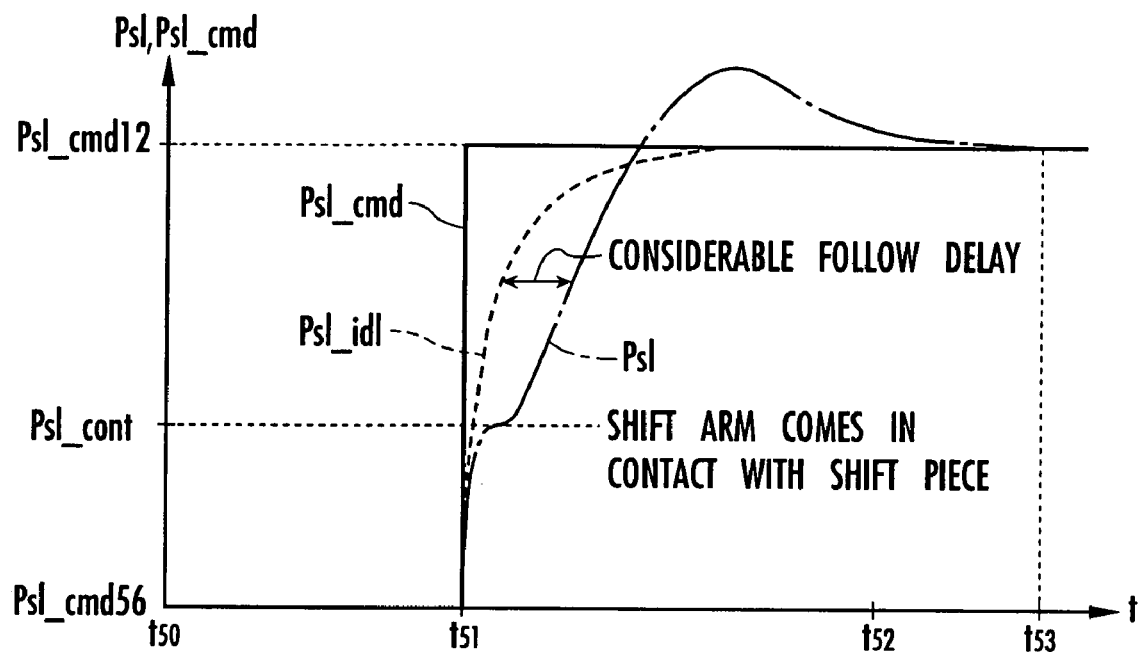
FIGS. 7A and 7B are graphs showing displacements of the shift arm in the selecting operation carried out by the selection controller shown in FIG. 4.
Figure 7:
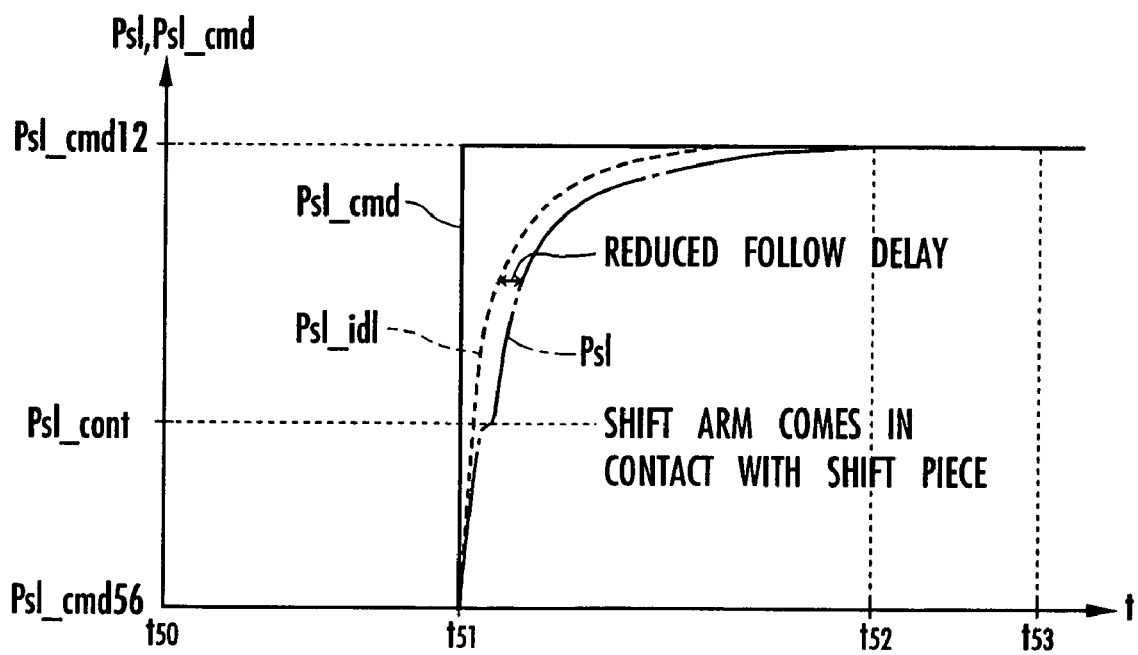
Figure 8:
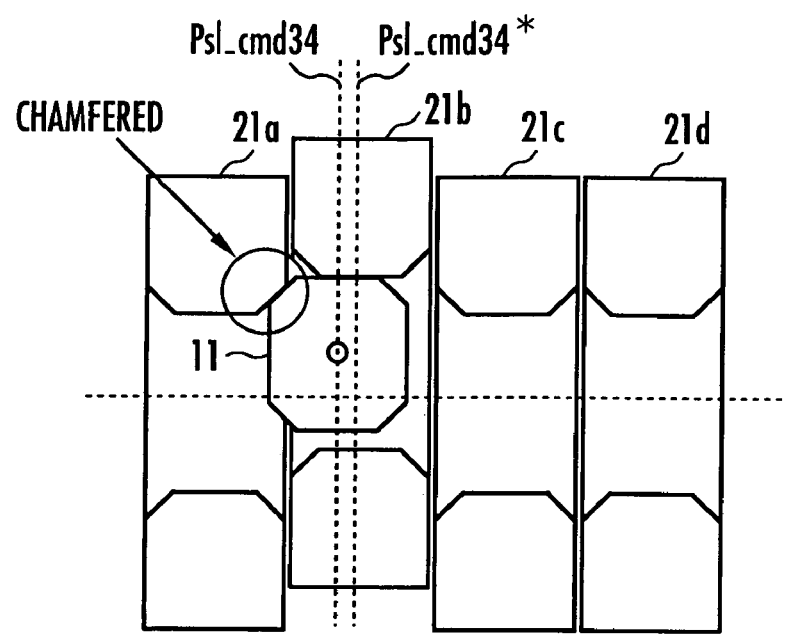
FIGS. 8A and 8B are graphs illustrating a shifting operation in a manual transmission.
Figure 8:
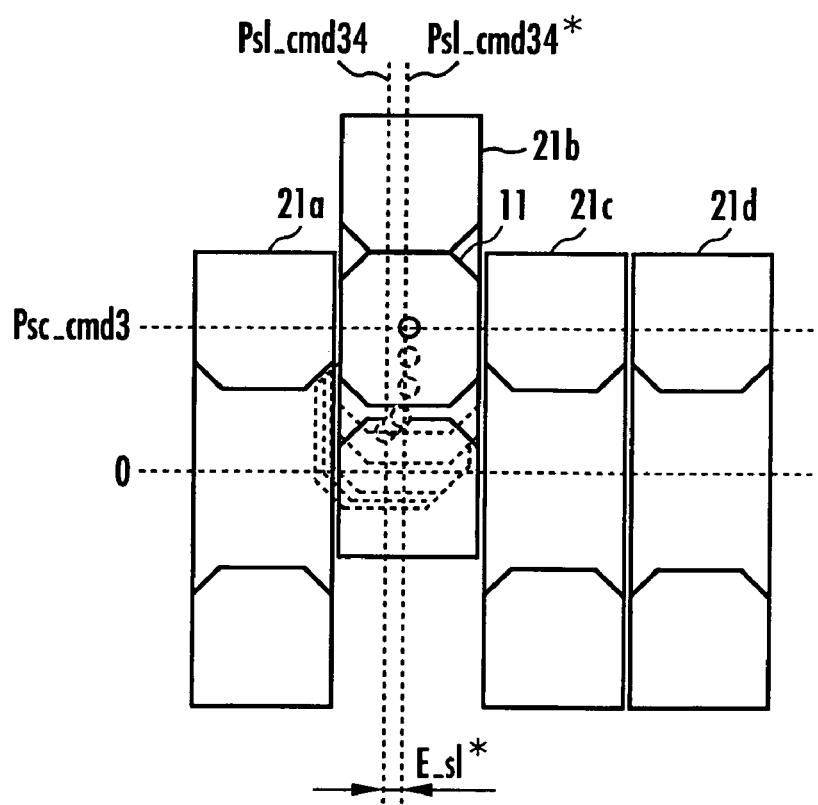
Figure 9:
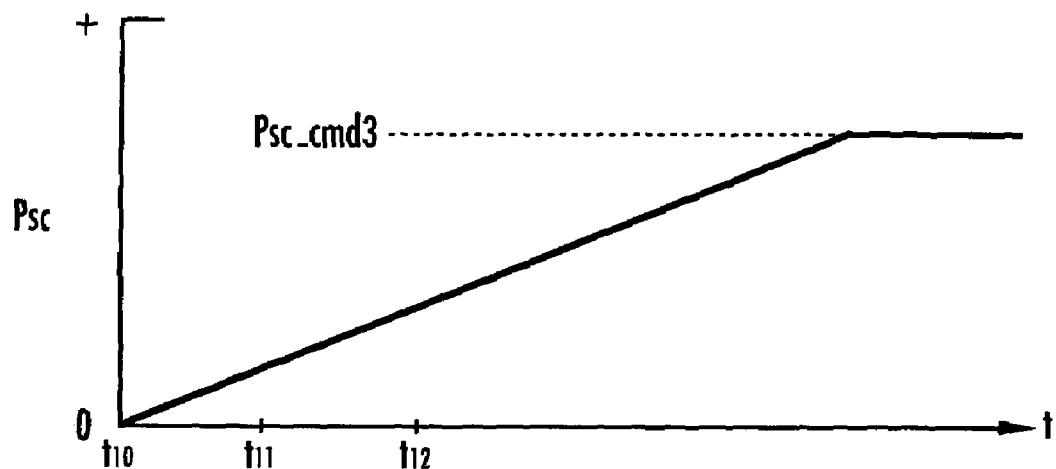
FIGS. 9A and 9B are graphs showing displacements of the shift arm in the shifting operation in the manual transmission.
Figure 9:
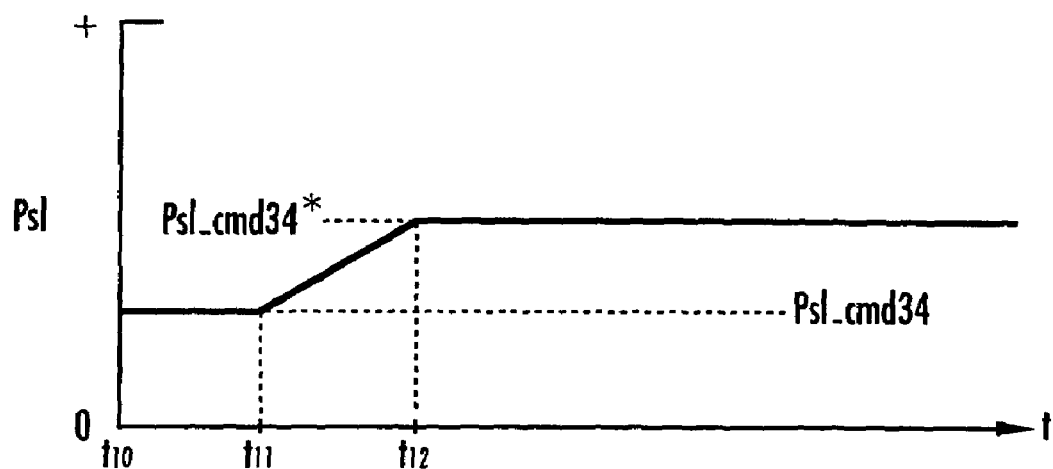
Figure 10:
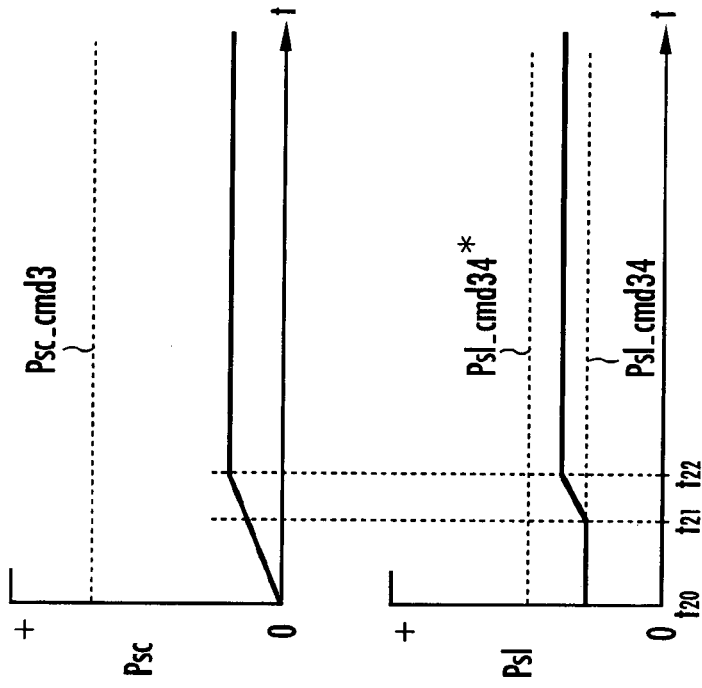
FIGS. 10A and 10B are explanatory diagrams of a shifting operation in an automatic/manual transmission.
Figure 10:
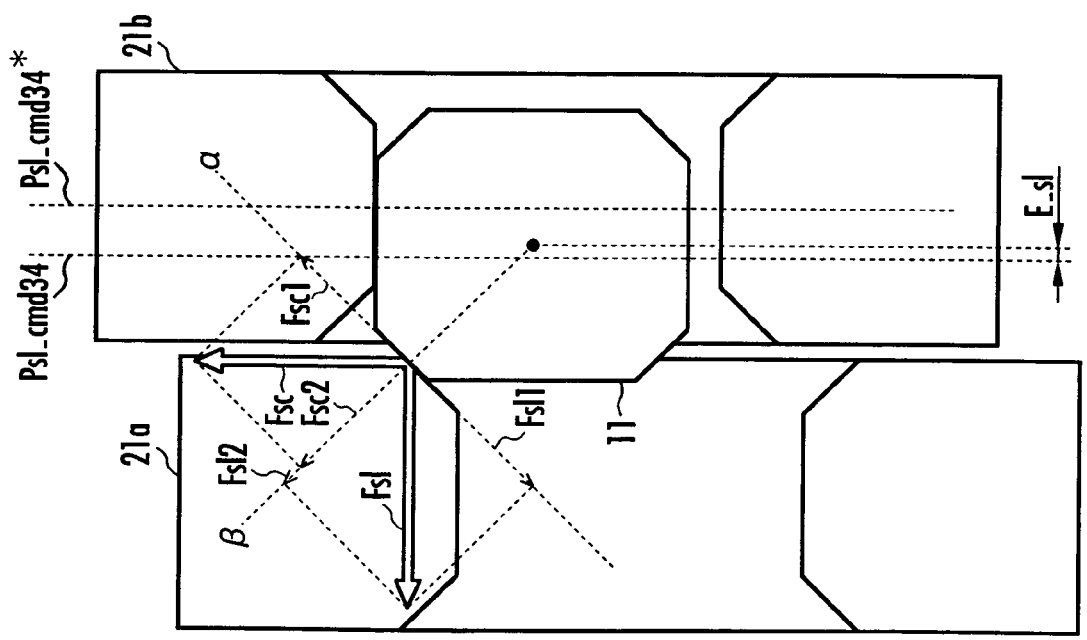
Figure 12:
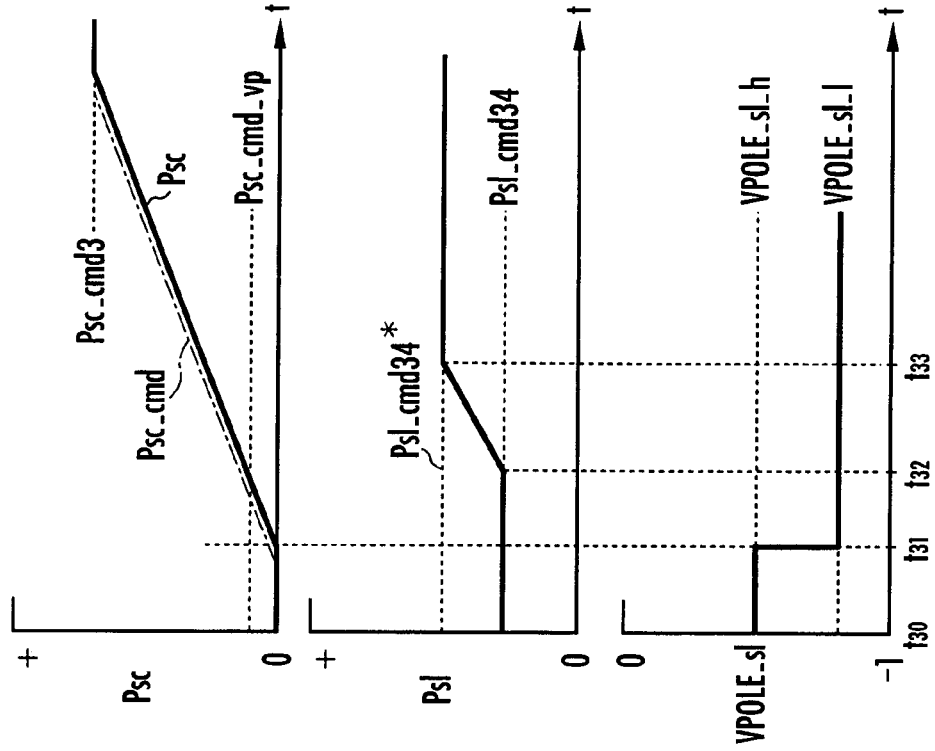
FIGS. 12A and 12B are explanatory diagrams illustrating the shifting operation for changing a response specifying parameter in the automatic/manual transmission.
Figure 12:
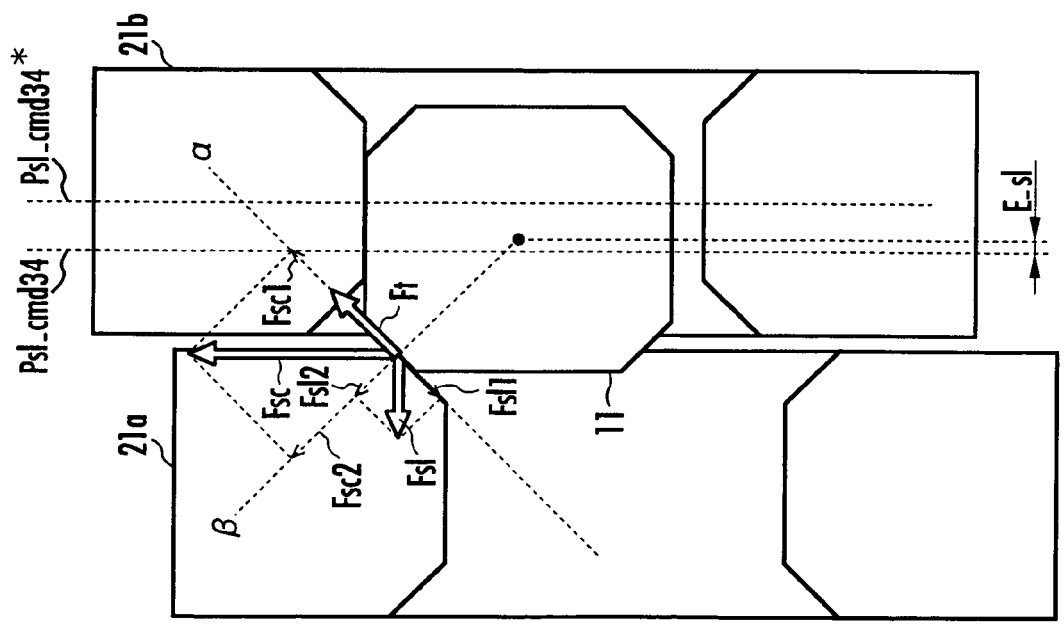
Figure 14:
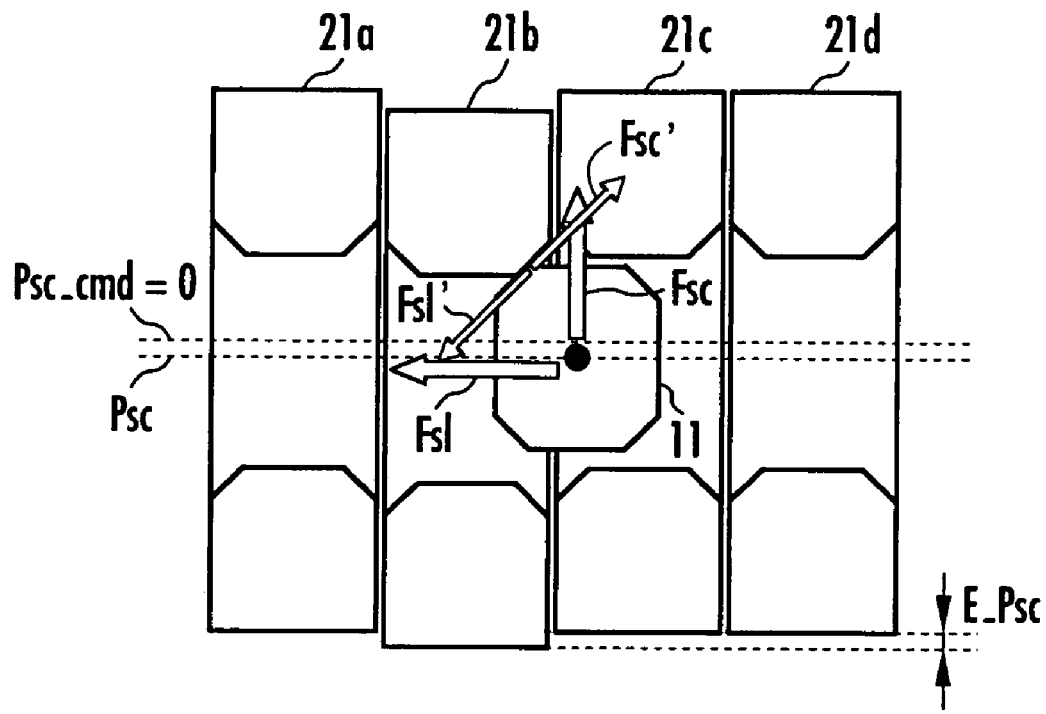
FIGS. 14A and 14B are explanatory diagrams of a selecting operation in the automatic/manual transmission.
Figure 14:
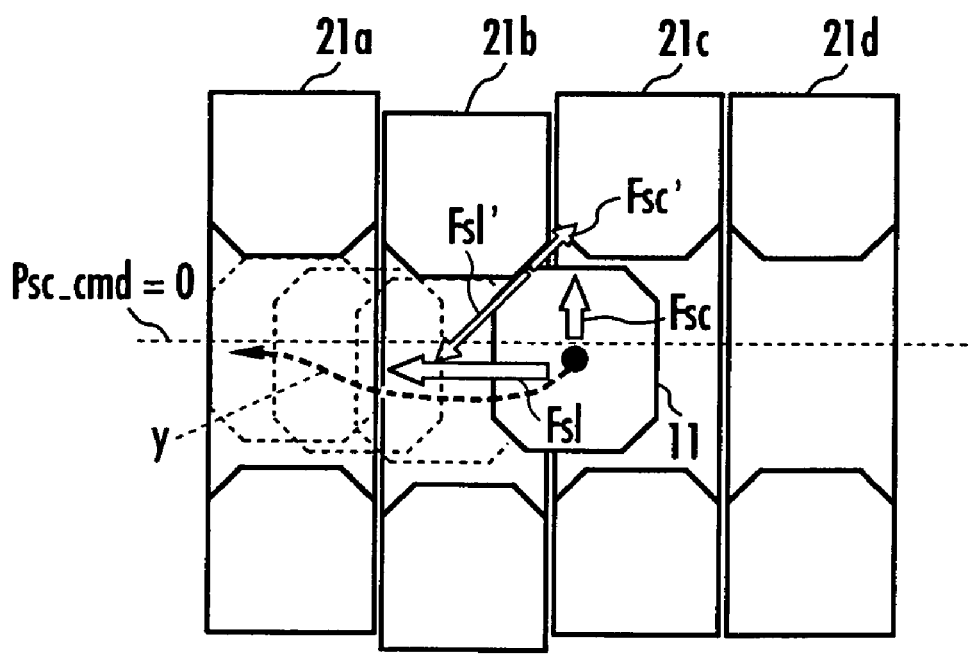
Figure 15:
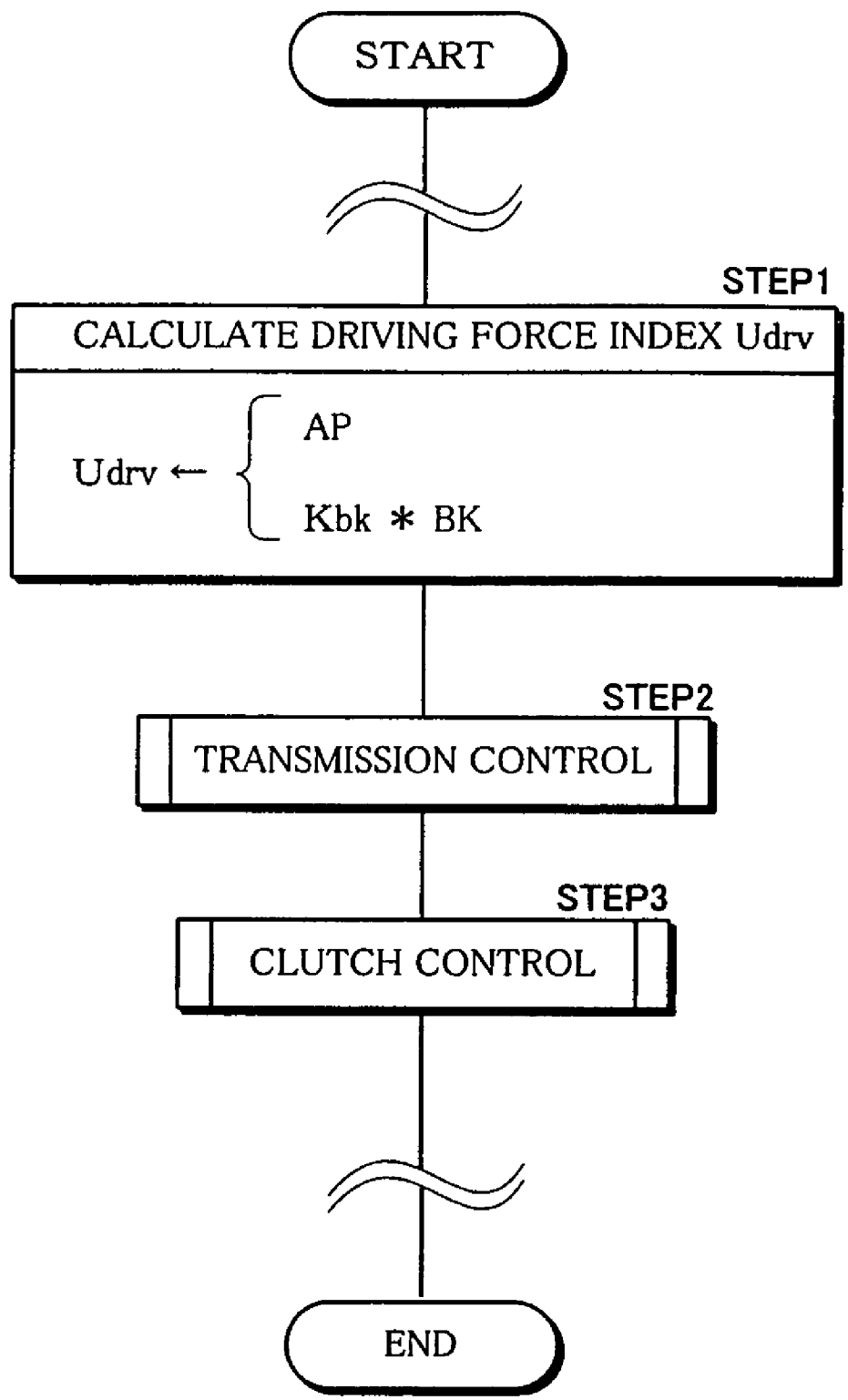
FIG. 15 shows a main flowchart of an operation performed by the controller.
Figure 16:
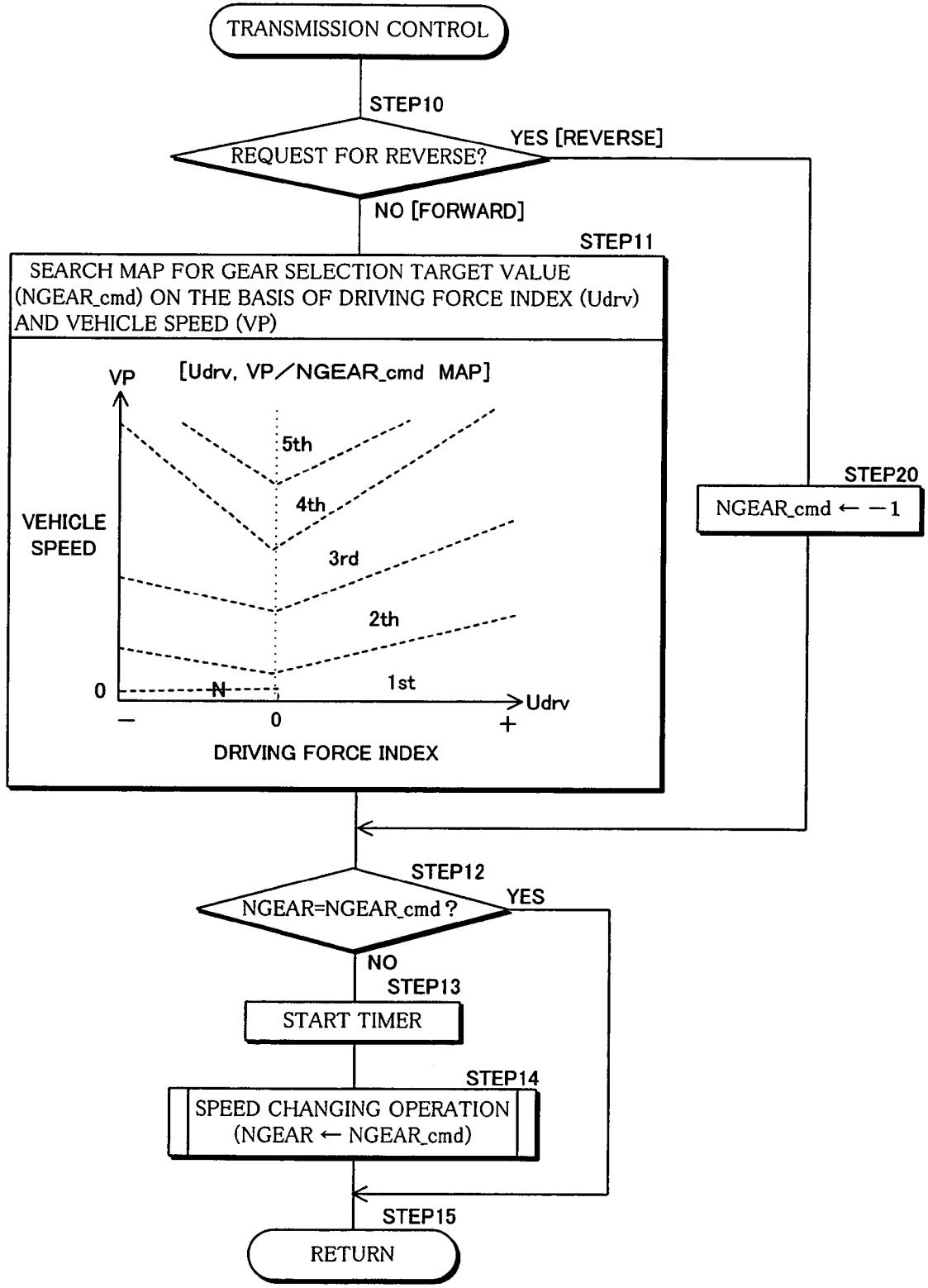
FIG. 16 shows a flowchart of transmission control.
Figure 17:
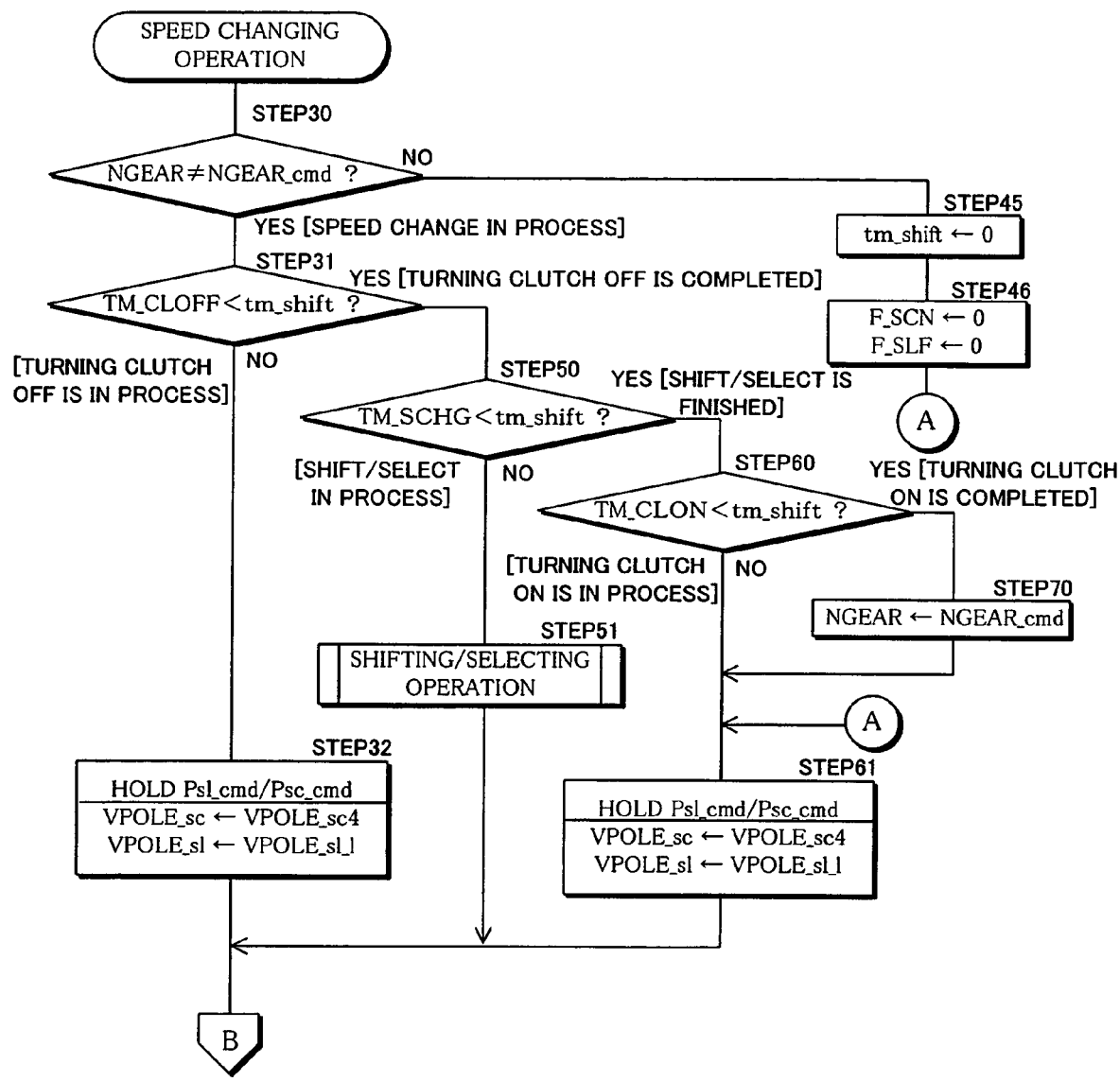
FIG. 17 shows a flowchart of a speed changing operation.
Figure 18:
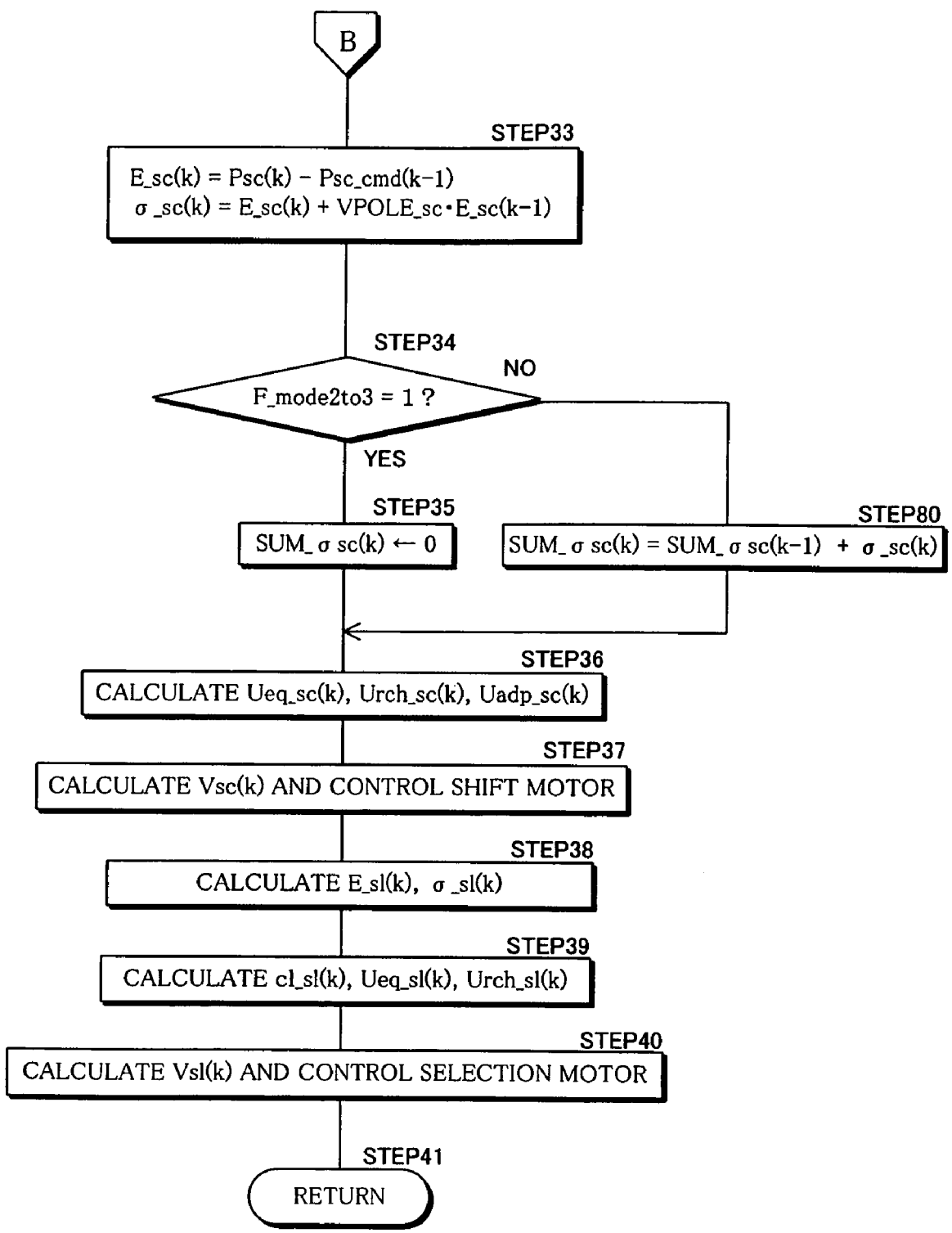
FIG. 18 shows a flowchart of the speed changing operation.
Figure 19:
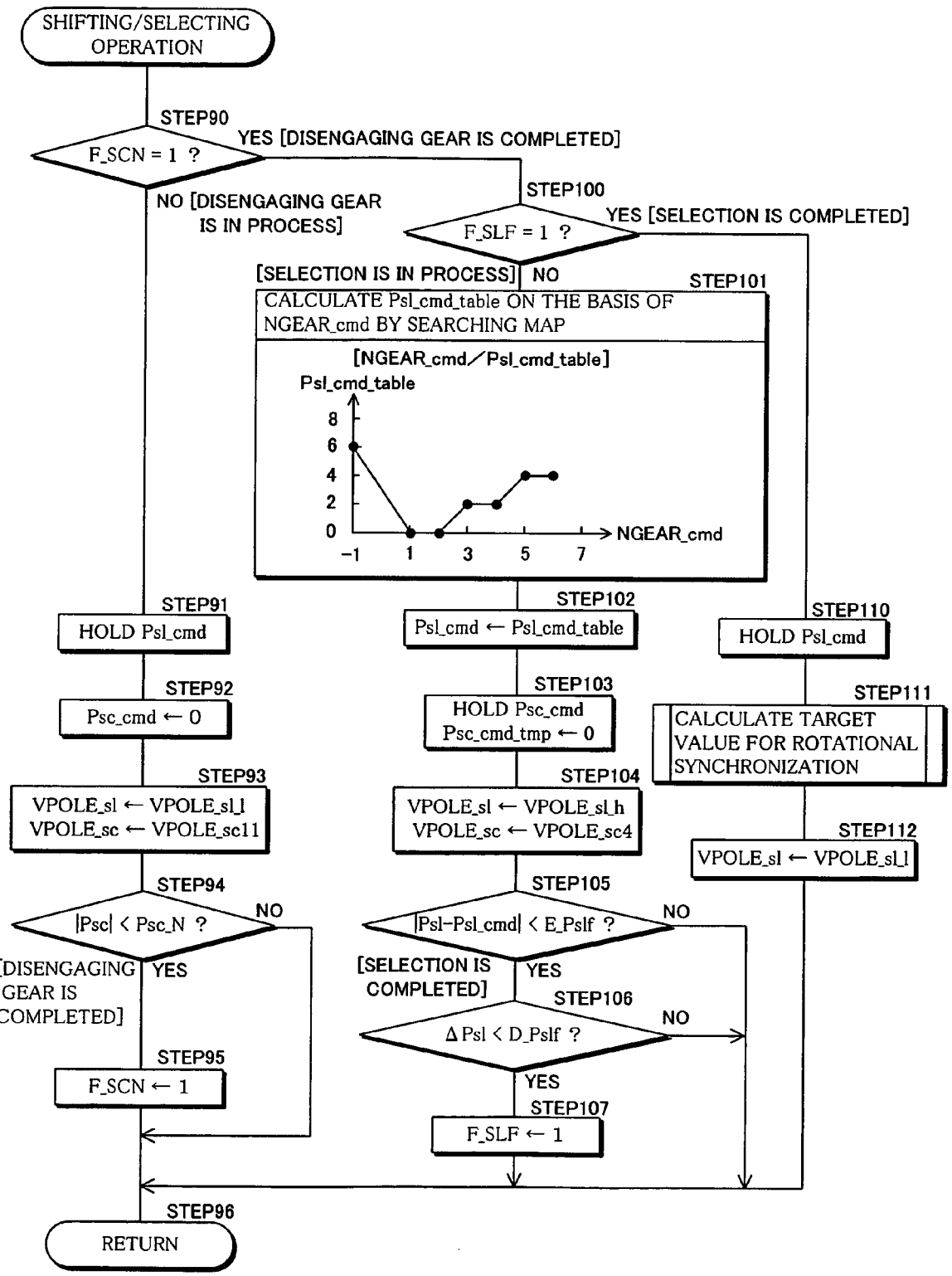
FIG. 19 shows a flowchart of shifting/selecting operations.
Figure 20:
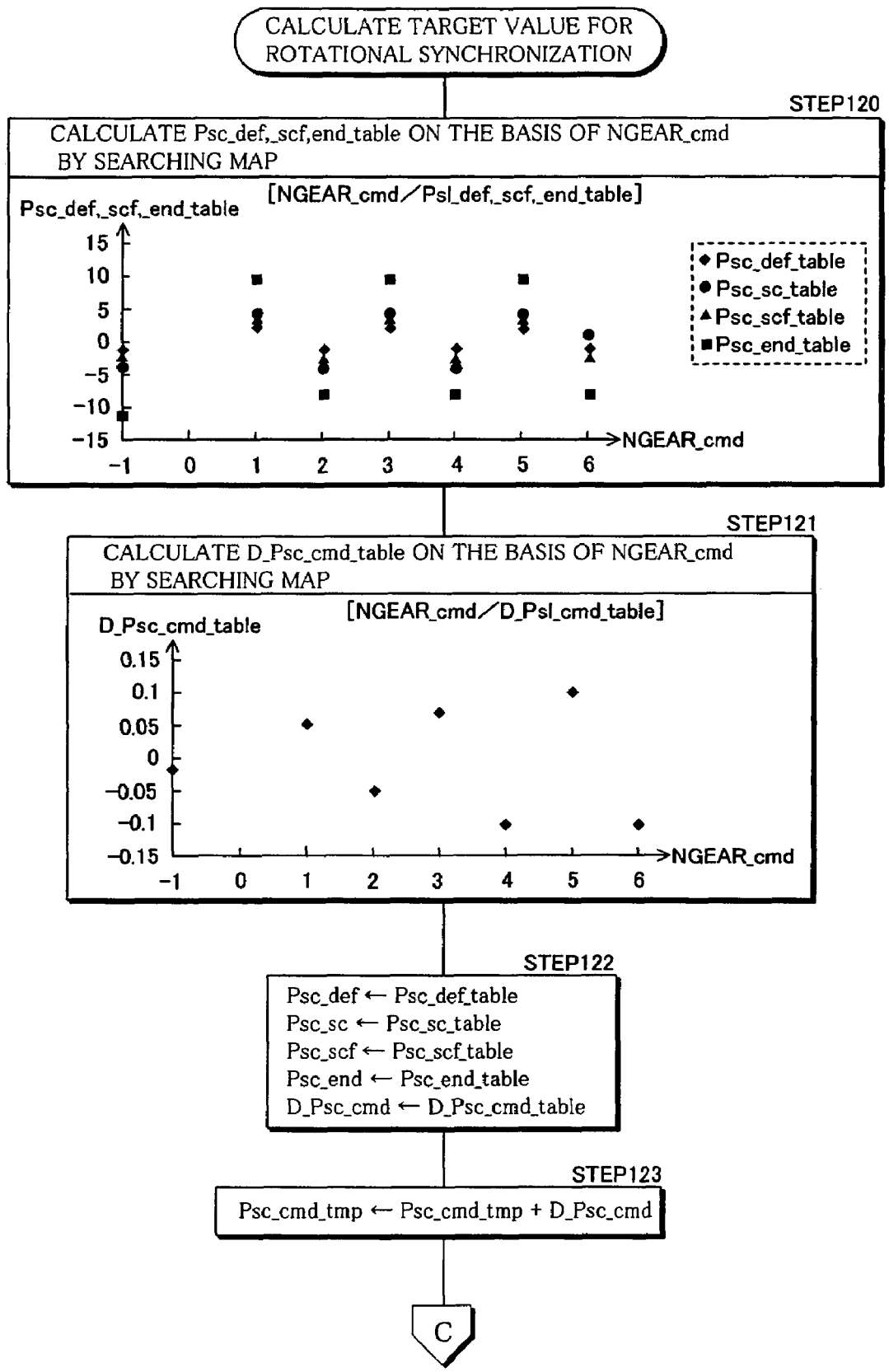
FIG. 20 shows a flowchart of an operation for calculating a target value for rotational synchronization.
Figure 21:
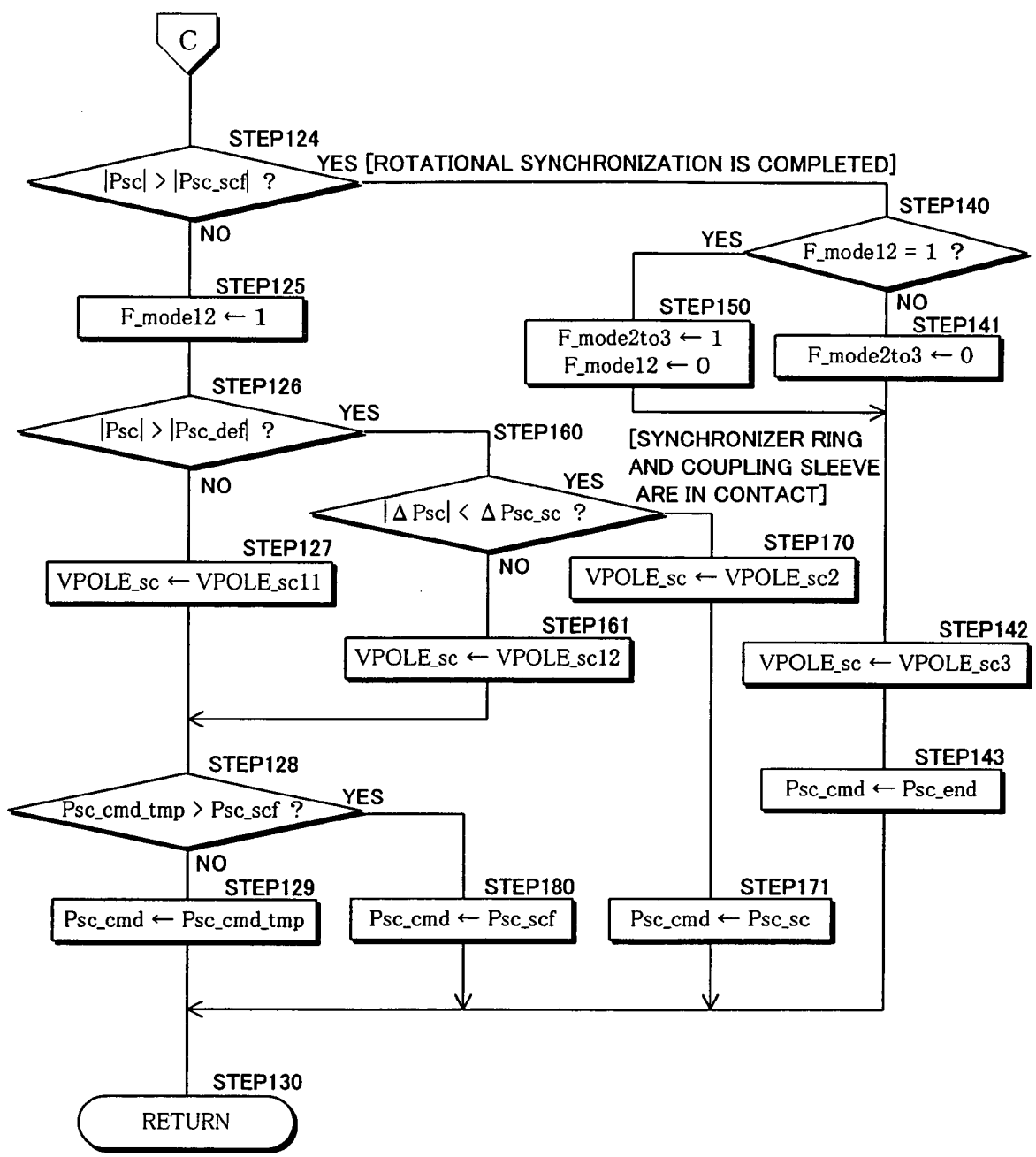
FIG. 21 shows another flowchart of the operation for calculating the target value for the rotational synchronization.
Figure 22:
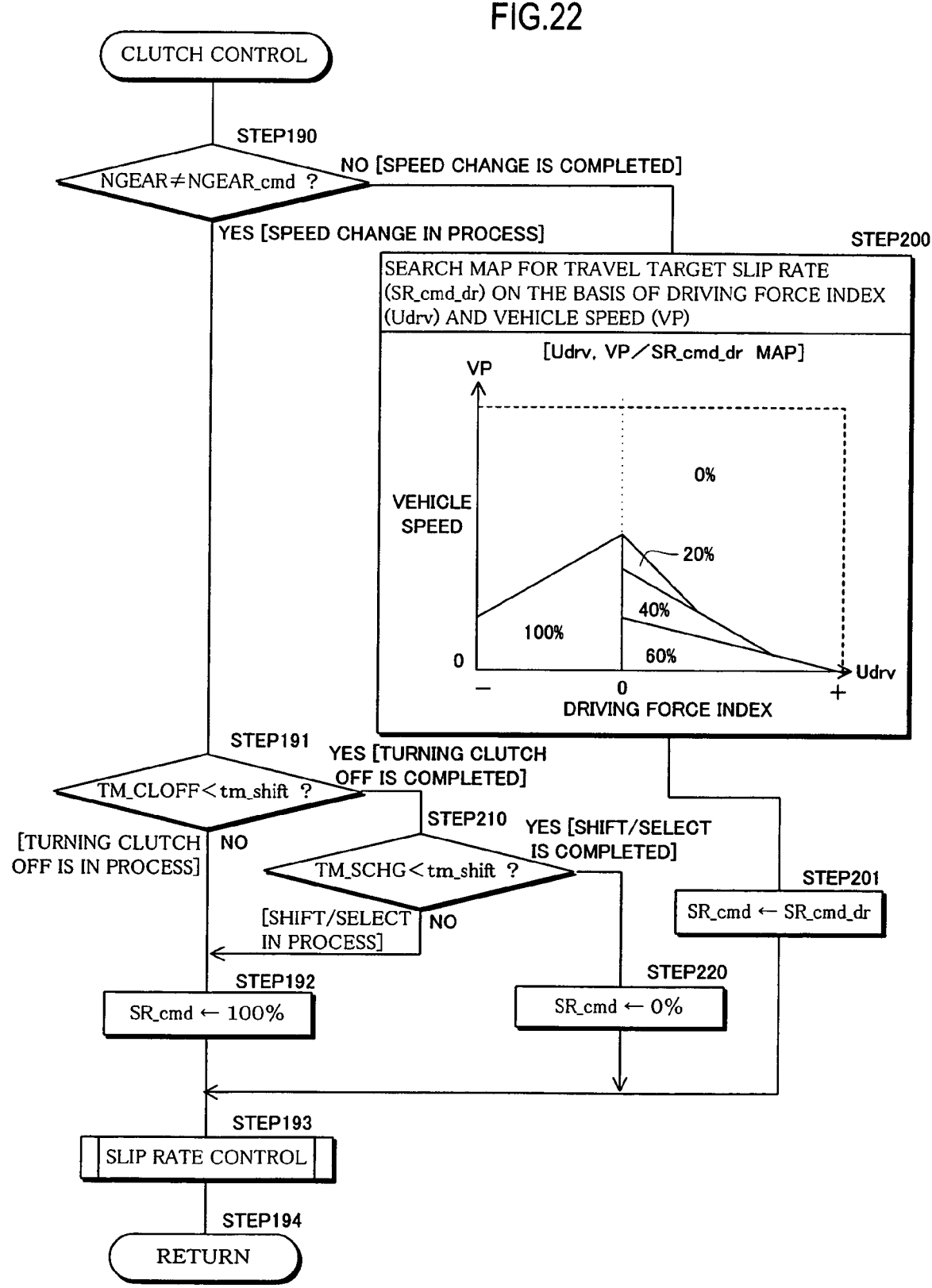
FIG. 22 shows a flowchart of clutch control.
Figure 23:
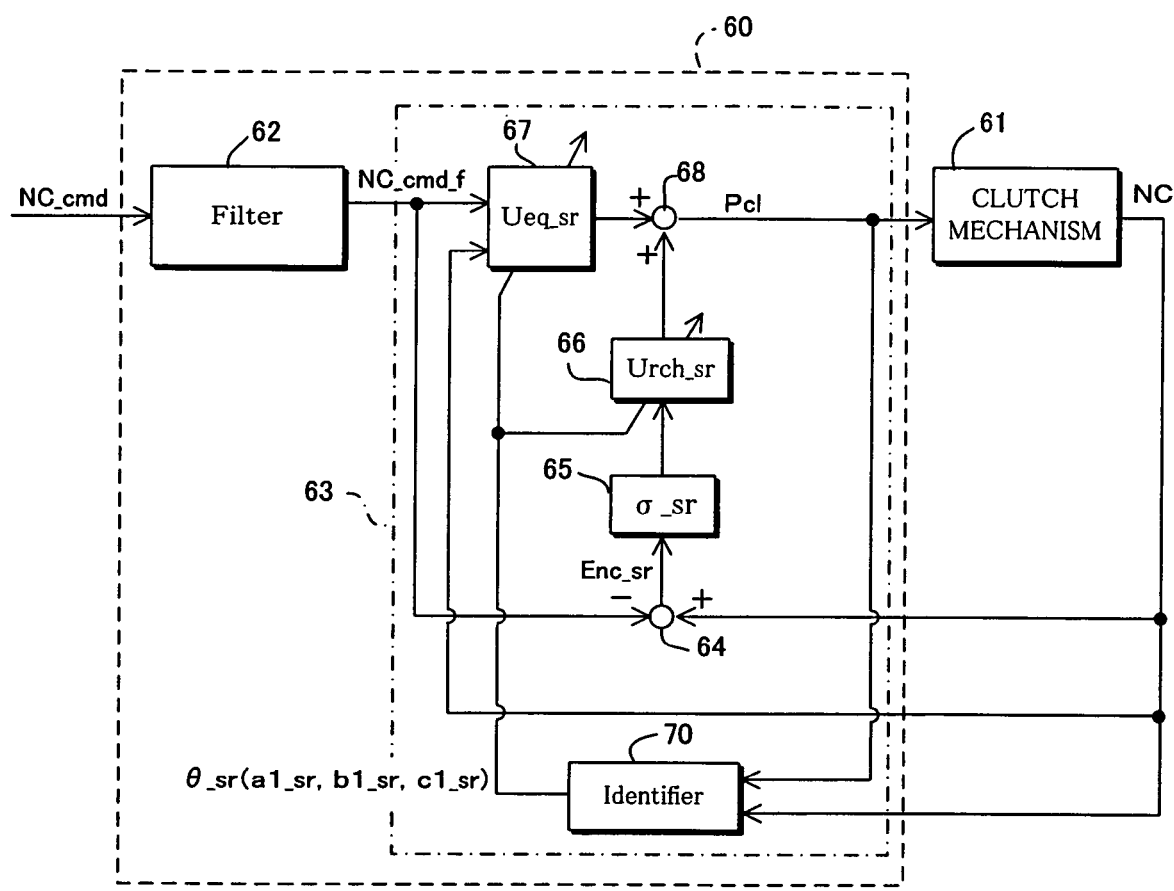
FIG. 23 is a block diagram of a clutch slip rate controller.
Figure 24:
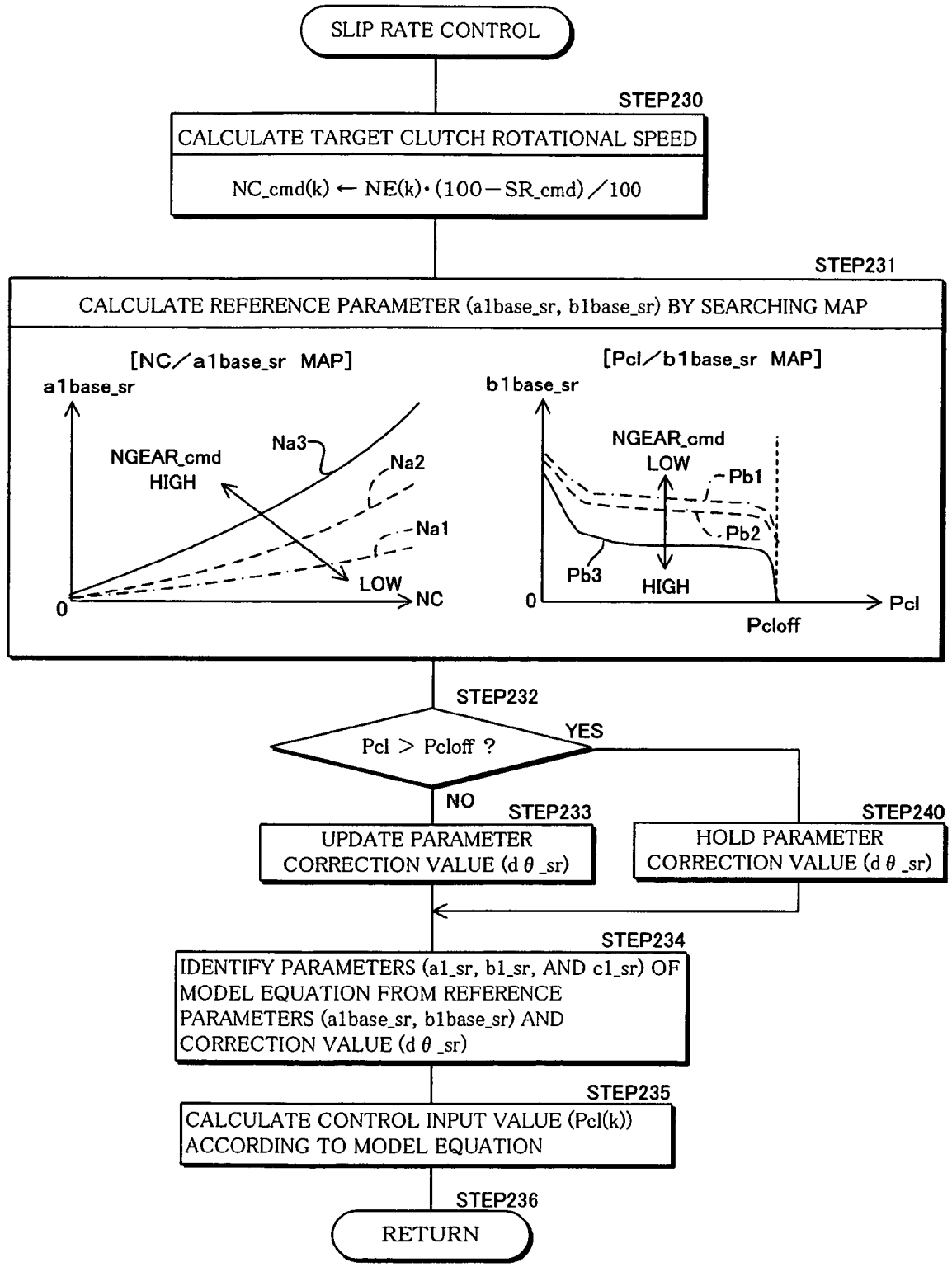
FIG. 24 is a flowchart of slip rate control.

An embodiment in accordance with the present invention will be described with reference to FIG. 1 through FIG. 23. FIG. 1 is a block diagram of a transmission, FIGS. 2A and 2B are detailed diagrams of a shifting/selecting mechanism of the transmission, FIGS. 3A, 3B, 3C and 3D are operation explanatory diagrams of the transmission, FIG. 4 is a block diagram of a first embodiment of a control unit shown in FIG. 1, FIG. 5 is a block diagram showing a selection controller shown in FIG. 4, FIGS. 6A and 6B are explanatory diagrams of a selecting operation, FIGS. 7A and 7B are graphs showing displacements of the shift arm in the selecting operation carried out by the selection controller shown in FIG. 4, FIGS. 8A and 8B are explanatory diagraphs illustrating a shifting operation in a manual transmission, FIGS. 9A and 9B are graphs showing displacements of the shift arm in the shifting operation in the manual transmission, FIGS. 10A and 10B are explanatory diagrams of a shifting operation in an automatic/manual transmission, FIG. 11 presents diagrams illustrating changes in a disturbance suppressing capability that take place when response specifying parameters are changed, FIGS. 12A and 12B are explanatory diagrams illustrating the shifting operation for changing a response specifying parameter in the automatic/manual transmission, FIGS. 13A and 13B are graphs illustrating displacements of the shift arm in the shifting operation and set response specifying parameters, FIGS. 14A and 14B are explanatory diagrams of a selecting operation in the automatic/manual transmission, FIG. 15 shows a main flowchart of an operation performed by the controller, FIG. 16 shows a flowchart of transmission control, FIGS. 17 and 18 show flowcharts of a speed changing operation, FIG. 19 shows a flowchart of shifting/selecting operations, FIGS. 20 and 21 show flowcharts of an operation for calculating a target value for rotational synchronization, FIG. 22 shows a flowchart of clutch control, FIG. 23 is a block diagram of a clutch slip rate controller, and FIG. 24 is a flowchart of slip rate control.

Figure 25:
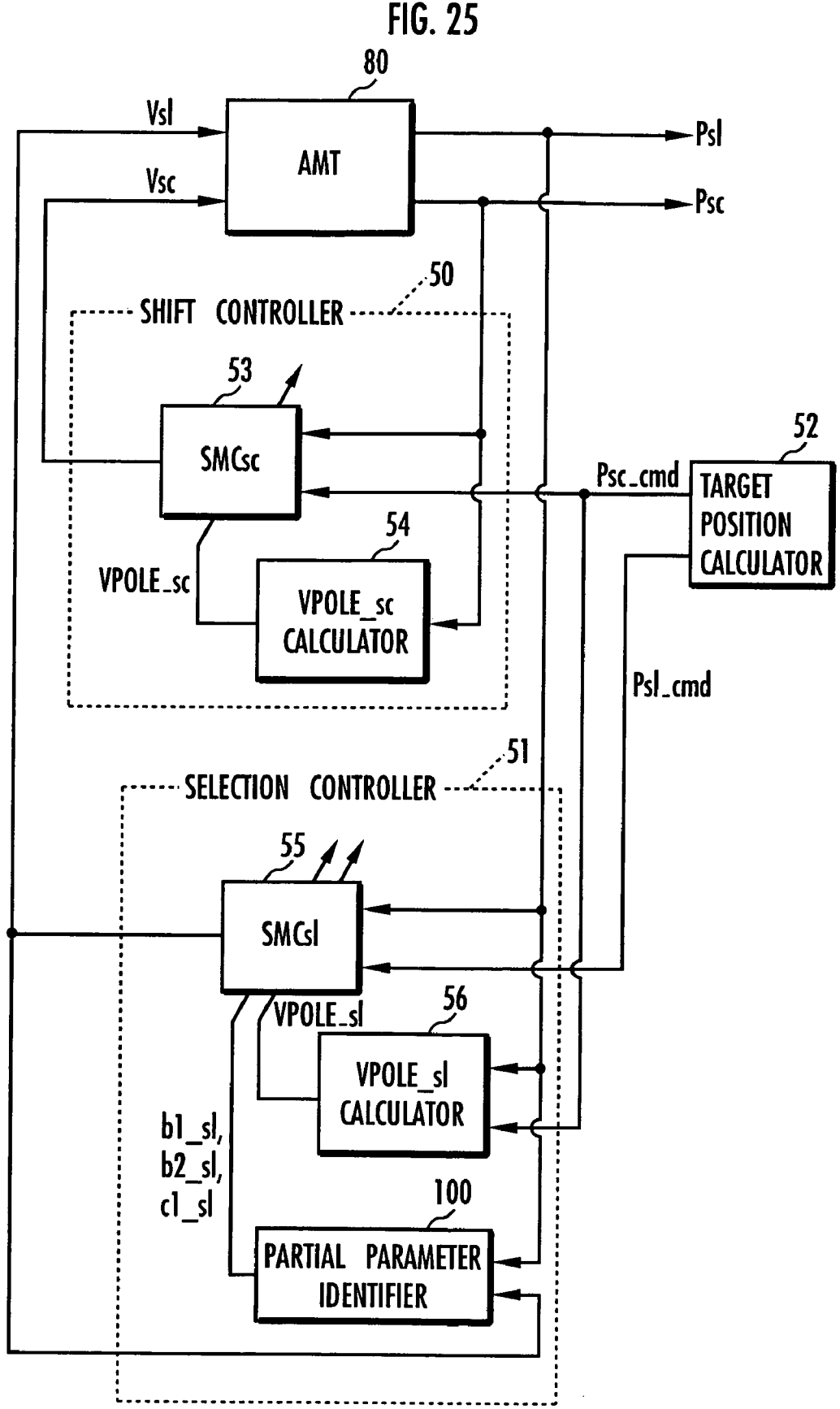
FIG. 25 is a block diagram showing a second embodiment of the control unit shown in FIG. 1.
Figure 26:
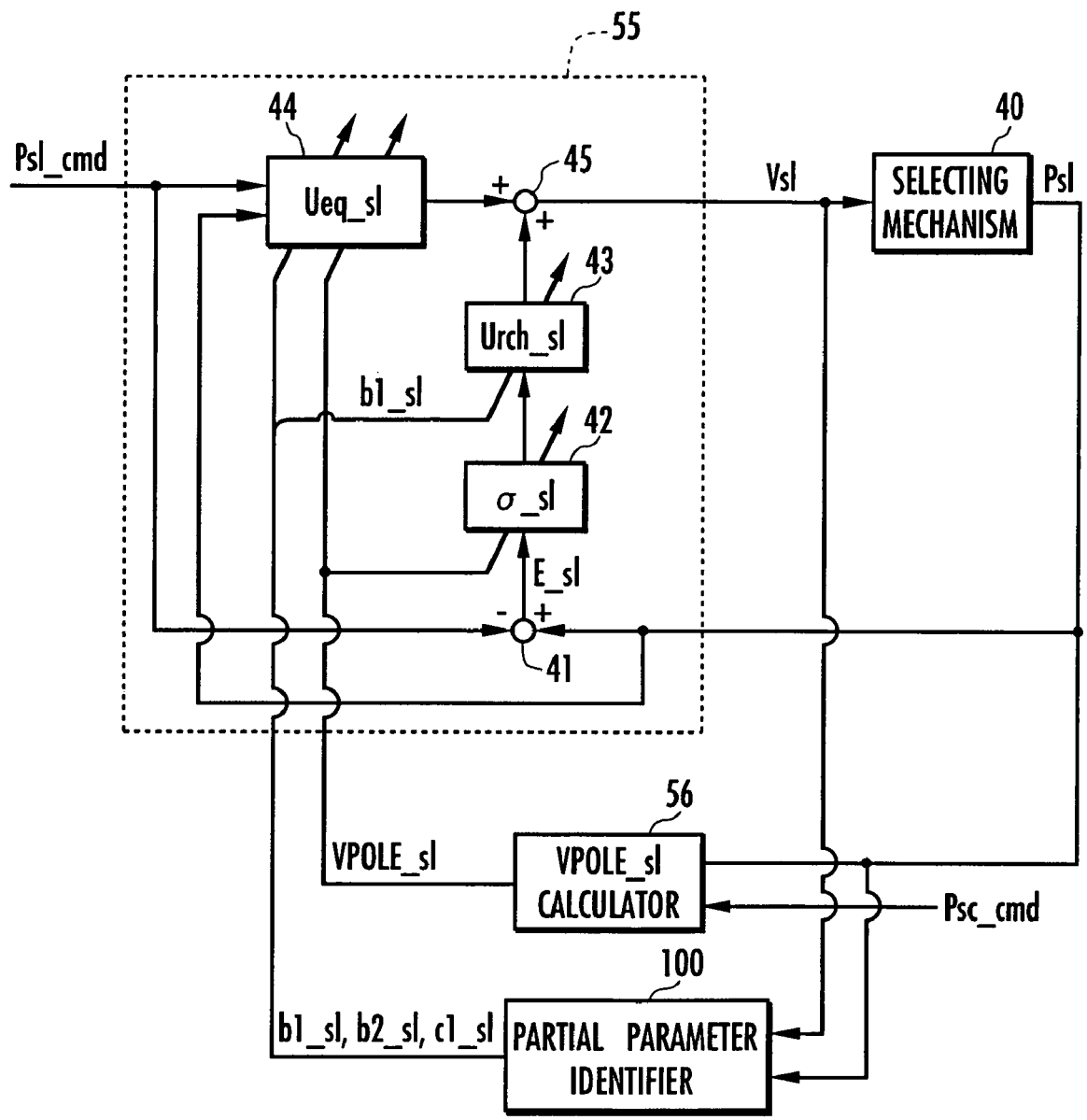
FIG. 26 is a block diagram of the selection controller shown in FIG. 25.
Figure 27:
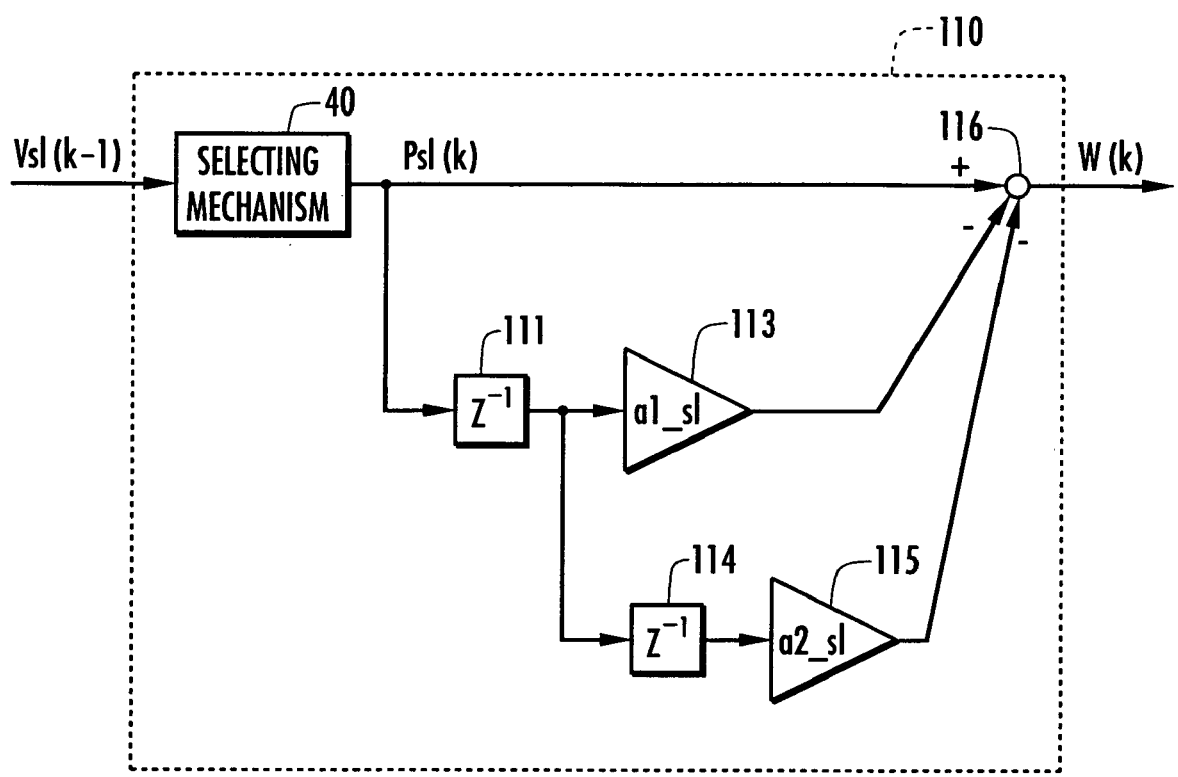
FIG. 27 is a block diagram of a virtual plant related to a method for identifying an identification model parameter.
Figure 28:
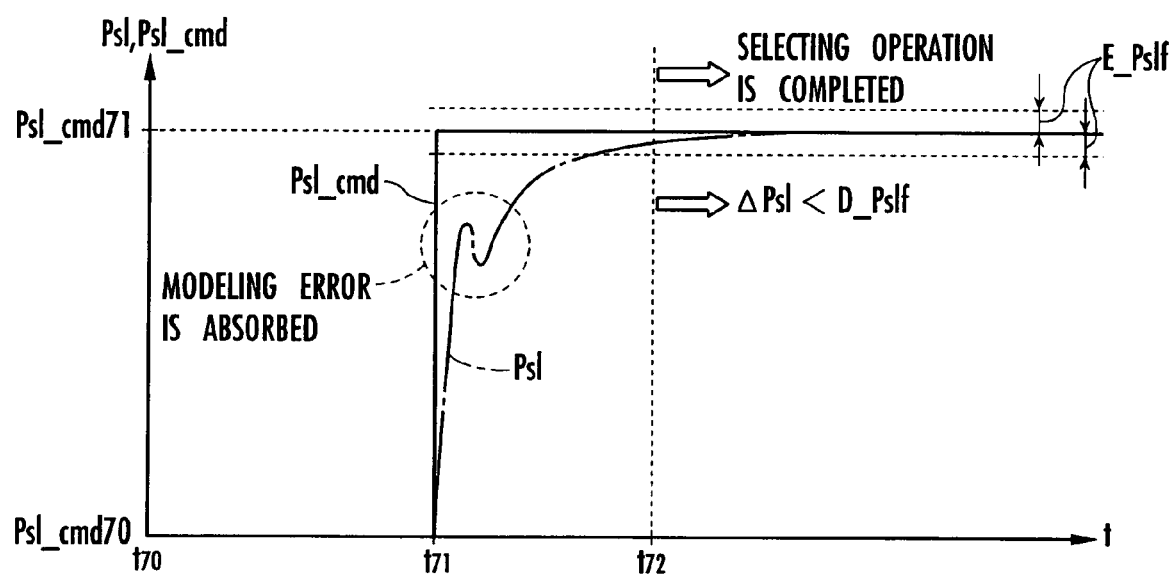
FIG. 28 is a graph showing displacements of the shift arm when the selecting operation is performed by the selection controller shown in FIG. 25.
Figure 29:
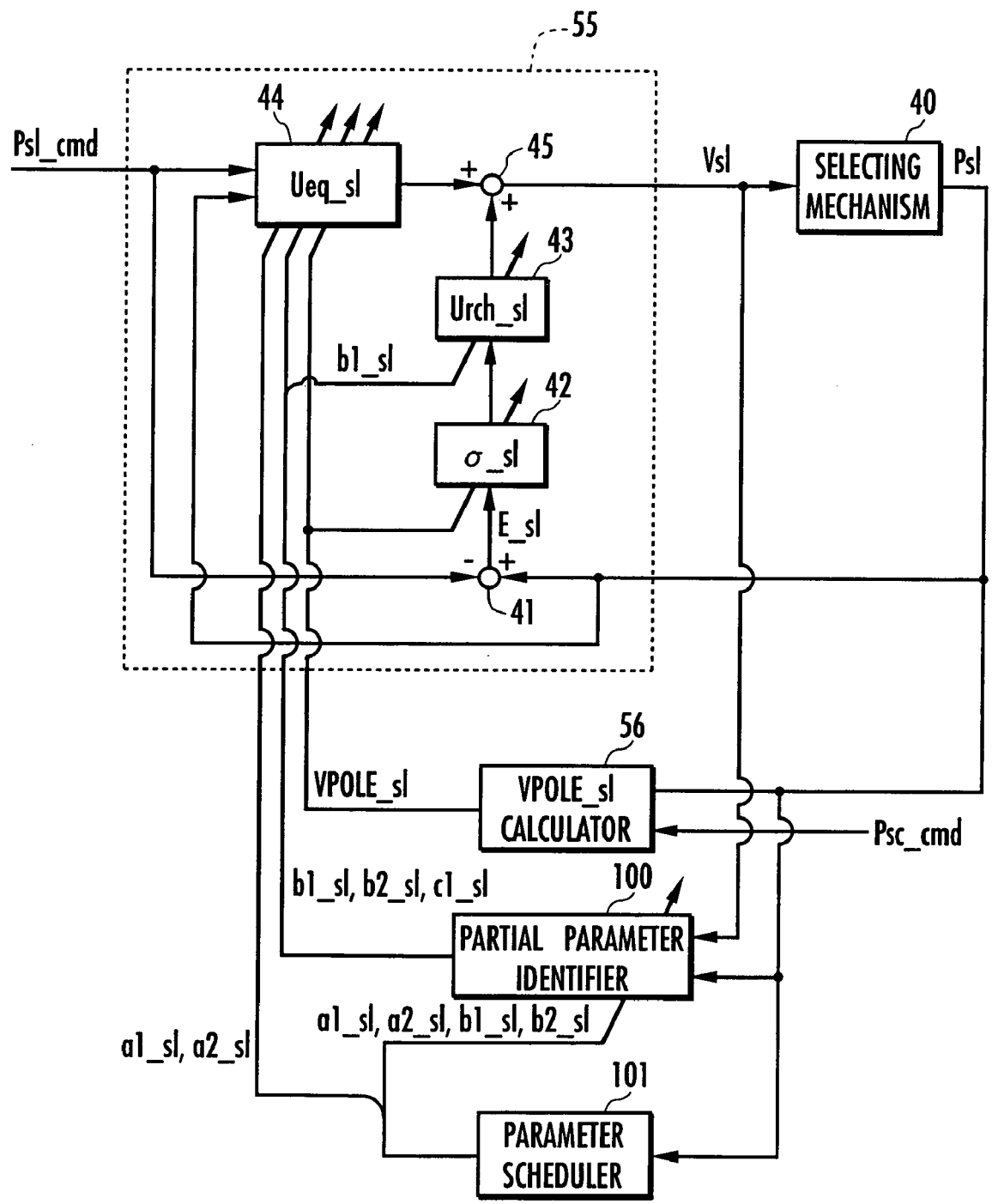
FIG. 29 is a block diagram of another construction of the selection controller according to the second embodiment.
Figure 30:
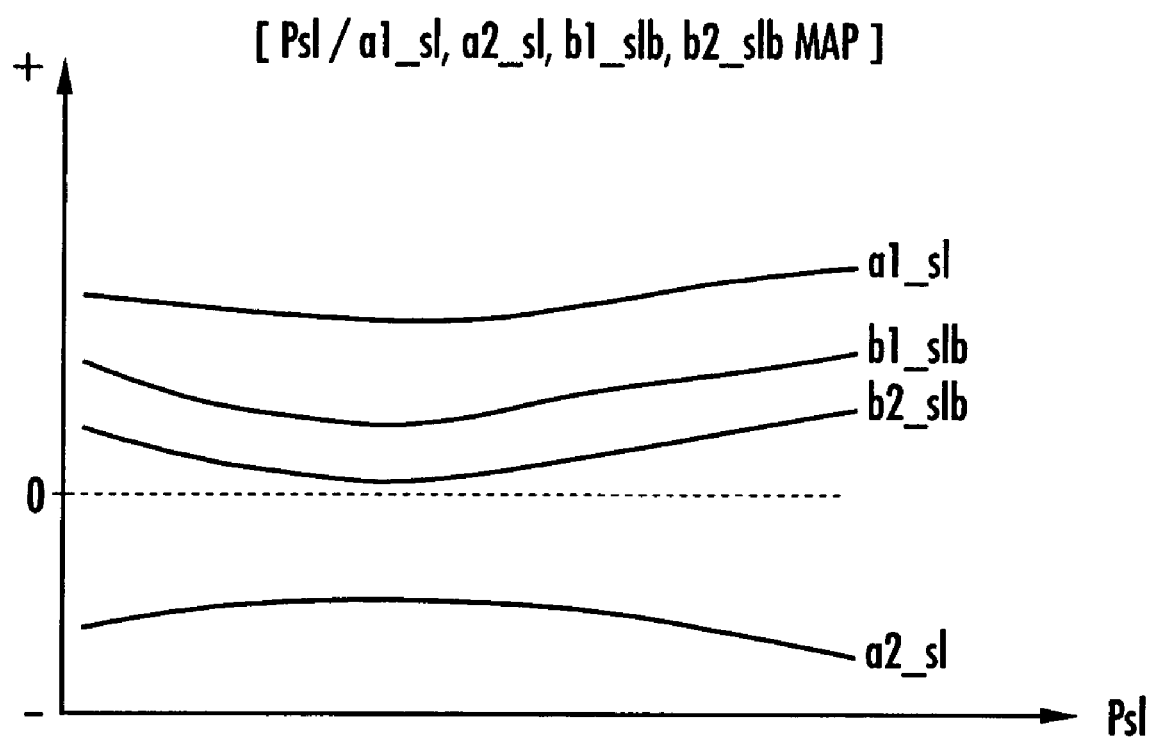
FIG. 30 is a model parameter setting map in the selection controller shown in FIG. 29.

FIG. 25 is a block diagram showing a second embodiment of the control unit shown in FIG. 1, FIG. 26 is a block diagram of the selection controller shown in FIG. 25, FIG. 27 is a block diagram of a virtual plant related to a method for identifying an identification model parameter, FIG. 28 is a graph showing displacements of the shift arm in the selecting operation, FIG. 29 is a block diagram of a selection controller according to another embodiment, and FIG. 30 is a model parameter setting map in the selection controller shown in FIG. 29.

Referring to FIG. 1, a transmission 80 is mounted in a vehicle to transmit outputs of an engine 81 through the intermediary of a clutch assembly 82 and a connecting gear 90. The connecting gear 90 meshes with a gear 91 of a differential 93, thereby causing outputs of the engine 81 to be transmitted to drive wheels 94 through the intermediary of a drive shaft 92.

The operation of the transmission 80 is controlled by a control unit 1 (corresponding to a control unit of the transmission in accordance with the present invention), which is an electronic unit composed of a microcomputer and memories, etc. The control unit 1 drives a selection motor 12 (corresponding to a selection actuator in the present invention), a shift motor 13, and a clutch actuator 16 according to the states of an accelerator pedal 95, a fuel supply control unit 96, a change lever 97, a clutch pedal 98, and a brake pedal 99 so as to control the speed changing operation of the transmission 80.

The transmission 80 has an input shaft 5, an output shaft 4, pairs of first through sixth forward gears 7a through 7f and 9a through 9f, and a reverse gear shaft 84 and reverse gear trains 83, 85 and 86. The input shaft 5, the output shaft 4, and the reverse gear shaft 84 are disposed to be parallel to each other.

The pairs of first to sixth forward gears 7a through 7f and 9a through 9f are set to different gear ratios from each other. The first forward gear 7a on an input side and the second forward gear 7b on the input side are provided integrally with the input shaft 5. The corresponding first forward gear 9a on an output side and a second forward gear 9b on the output side are composed of idle gears that are rotative with respect to the output shaft 4. A first/second gear synchronizer 2a switches between two modes, namely, a mode in which the first forward gear 9a on the output side and the second forward gear 9b on the output side are selectively connected to the output shaft 4 (speed change established mode) and a mode in which both gears 9a and 9b are disengaged from the output shaft 4 (neutral mode).

A third forward gear 7c on the input side and a fourth forward gear 7d on the input side are composed of idle gears rotative with respect to the input shaft 5. The corresponding third forward gear 9c on an output side and a fourth forward gear 9d on the output side are formed integrally with the output shaft 4. A third/fourth gear synchronizer 2b switches between two modes, namely, a mode in which the third forward gear 7c on the input side and the fourth forward gear 7d on the input side are selectively connected to the input shaft 5 (speed change established mode) and a mode in which both gears 7c and 7d are disengaged from the input shaft 5 (neutral mode).

Similarly, a fifth forward gear 7e on the input side and a sixth forward gear 7f on the input side are composed of idle gears rotative with respect to the input shaft 5. The corresponding fifth forward gear 9e on the output side and a sixth forward gear 7f on the output side are formed integrally with the output shaft 4. A fifth/sixth gear synchronizer 2c switches between two modes, namely, a mode in which the fifth forward gear 7e on the input side and the sixth forward gear 7f on the input side are selectively connected to the input shaft 5 (speed change established mode) and a mode in which both gears 7e and 7f are disengaged from the input shaft 5 (neutral mode).

The reverse gear trains 83, 85 and 86 are formed of a first reverse gear 85 mounted on a reverse gear shaft 84, a second reverse gear 83 provided integrally with the input shaft 5, and a third reverse gear 86 formed integrally with the first/second gear synchronizer 2a of the output shaft 4. The first reverse gear 85 is attached to the reverse gear shaft 84 by spline fitting. This causes the first reverse gear 85 to rotate integrally with the reverse gear shaft 84 and also to be free to slide in the axial direction of the reverse gear shaft 84 between a position where it meshes with both the second reverse gear 83 and the third reverse gear 86 and a position where its engagement with those gears is cleared (neutral position).

Furthermore, shift forks 10a, 10b, 10c, and 10d are connected to the synchronizers 2a, 2b, and 2c and the first reverse gear 85, respectively, and a shift piece (see FIG. 2) provided on a distal end of each shift fork is selectively engaged with a shift arm 11. The shift arm 11 is rotated by the selection motor 12, and the shift forks are provided substantially linearly in parallel in an arcuate direction (a selecting direction) in which the shift arm 11 turns. The shift arm 11 is selectively positioned at positions where it engages with any one of the shift pieces.

The shift arm 11 is moved in an axial direction parallel to the input shaft 5 (a shifting direction) by the shift motor 13, with the shift arm 11 being in engagement with any one of the shift pieces. The shift arm 11 is positioned at the neutral position and a position where each speed is established (a shift position).

FIG. 2A shows a construction of the synchronizer 2b shown in FIG. 1. The synchronizer 2c has the same construction as that of the synchronizer 2b. The synchronizer 2a is the same as the synchronizers 2b and 2c in basic construction and operations except that it is mounted on the output shaft 4.

The synchronizer 2b has a coupling sleeve 22 integrally rotates with the input shaft 5, a synchronizer ring 23a provided rotatively on the input shaft 5 between the coupling sleeve 22 and the third forward gear 7c on the input side and also movably in the axial direction of the input shaft 5, a synchronizer ring 23b provided rotatively on the input shaft 5 between the coupling sleeve 22 and the fourth forward gear 7d on the input side and also movably in the axial direction of the input shaft 5, and a shift fork 10b connected to the coupling sleeve 22.

A shift piece 21 fixed on a distal end of the shift fork 10b engages the shift arm 11 fixed to a shift/select shaft 20. The shift/select shaft 20 rotates as the selection motor 12 is actuated to perform the selecting operation, and it moves in the axial direction as the shift motor 13 is actuated to perform the shifting operation. Performing the shifting operation with the shift arm 11 being engaged with the shift piece 21 by the selecting operation causes the coupling sleeve 22 to be displaced from the neutral position toward the third forward gear 7c on the input side when the third gear is selected or toward the fourth forward gear 7d on the input side when the fourth gear is selected.

Both ends of the coupling sleeve 22 are hollow, splines 30a and 30b being formed on the inner peripheral surfaces of the hollow portions. The outer peripheral surface of the synchronizer ring 23a has a spline 31a engageable with a spline 30a of the coupling sleeve 22. The outer peripheral surface of the third forward gear 7c on the input side that opposes the synchronizer ring 23a also has a spline 32a engageable with the spline 30a of the coupling sleeve 22.

Similarly, the outer peripheral surface of the synchronizer ring 23b has a spline 31b engageable with the spline 30b of the coupling sleeve 22. The outer peripheral surface of the fourth forward gear 7d on the input side that opposes the synchronizer ring 23b also has a spline 32b engageable with the spline 30b of the coupling sleeve 22.

When the coupling sleeve 22, which has rotated together with the input shaft 5, is moved toward the third forward gear 7c on the input side by the shift fork 10b, the coupling sleeve 22 comes in contact with the synchronizer ring 23a, and then the synchronizer ring 23a is also brought into contact with the third forward gear 7c on the input side. At this time, the frictional force produced by the contact synchronizes the rotational speeds of the coupling sleeve 22 and the third forward gear 7c on the input side through the intermediary of the synchronizer ring 23a.

With the rotational speeds of the coupling sleeve 22 and the third forward gear 7c on the input side synchronized, the coupling sleeve 22 is further moved toward the third forward gear 7c on the input side causes the spline 30a formed on the coupling sleeve 22 to pass by the spline 31a formed on the synchronizer ring 23a and to engage the spline 32a formed on the third forward gear 7c on the input side. This sets an established speed change state in which motive power is transmitted between the input shaft 5 and the output shaft 4.

Similarly, moving the coupling sleeve 22, which has rotated together with the input shaft 5, toward the fourth forward gear 7d on the input side by the shift fork 10b synchronizes the rotational speeds of the coupling sleeve 22 and the fourth forward gear 7d on the input side through the intermediary of the synchronizer ring 23b. Then, the spline 30b formed on the coupling sleeve 22 passes by the spline 31b formed on the synchronizer ring 23b and engages the spline 32b formed on the fourth forward gear 7d on the input side.

FIG. 2B shows linearly disposed shift pieces 21a, 21b, 21c and 21d observed from the shift arm 11. In the selecting operation, the shift arm 11 is moved in a direction Psl, which is the selecting direction, shown in FIG. 2B. The shift arm 11 is positioned at a 1st/2nd gear select position Psl_12, a 3rd/4th gear select position Psl_34, a 5th/6th gear select position Psl_56, or a reverse select position Psl_r, and then engaged with the shift piece 21a, 21b, 21c or 21d. In the shifting operation, the shift arm 11 is moved in a direction Psc, which is the shifting direction in the figure, to establish a new speed (the first to sixth speed or reverse).

FIGS. 3A through 3D illustrate the operation of the shift arm 11 when a state wherein the second speed has been established is replaced by the third speed. Positioning of the shift arm 11 is carried out in the order of FIG. 3A, FIG. 3B, FIG. 3C, and FIG. 3D. FIG. 3A illustrates a state wherein the second speed has been established, the shift arm 11 being engaged with the shift piece 21a. The position Psl of the shift arm 11 in the selecting direction is set at the 1st/2nd gear select position Psl_12, while the position P_sc of the shift arm 11 in the shifting direction is set at the 1st speed shift position Psc_1.

In the step illustrated in FIG. 3B, the position Psc of the shift arm 11 in the shifting direction is set at the neutral position 0 to enable the selecting operation. In the step illustrated in FIG. 3C, the shift arm 11 is set at a 3rd/4th gear select position Psc_34 by the selecting operation. This causes the shift arm 11 to engage the shift piece 21b. In the step illustrated in FIG. 3D, the shift arm 11 is moved from the neutral position to a third speed shift position Psc_3 by the shifting operation so as to establish the third speed.

The following will describe a first embodiment and a second embodiment of the control unit 1 shown in FIG. 1.

First Embodiment

Referring now to FIG. 4, the control unit 1 has a target position calculator 52 for setting a target position Psc_cmd of the shift arm 11 in the shifting direction and a target position Psl_cmd of the shift arm 11 in the selecting direction, a shift controller 50 that controls a voltage Vsc to be applied to the shift motor 13 such that an actual position Psc of the shift arm 11 in the shifting direction agrees with the target position Psc_cmd, and a selection controller 51 that controls a voltage Vsl (corresponding to a control input to the selection actuator in the present invention) to be applied to the selection motor 12 such that an actual position Psl of the shift arm 11 in the selecting direction agrees with the target position Psl_cmd.

The shift controller 50 has a sliding mode controller 53 that employs sliding mode control to determine the voltage Vsc to be applied to the shift motor 13, and a VPOLE_sc calculator 54 that sets a response specifying parameter VPOLE_sc in the sliding mode controller 53.

The selection controller 51 includes a sliding mode controller 55 that employs sliding mode control (corresponding to the response specifying control in the present invention) to determine the voltage Vsl to be applied to the selection motor 12, and a VPOLE_sl calculator 56 that sets a response specifying parameter VPOLE_sl in the sliding mode control, and an adaptation disturbance observer 57 (corresponding to the disturbance estimator in the present invention) that calculates a disturbance component term c1_sl (corresponding to an estimated disturbance value in the present invention) in the sliding mode control.

Referring to FIG. 5, the sliding mode controller 55 provided in the selection controller 51 models a selector 40 of the transmission 80 for moving the shift arm 11 in the selecting direction according to an equation (8) given below.

$$Psl(k+1)=a1\_sl \cdot Psl(k)+a2\_sl \cdot Psl(k-1)+b1\_sl \cdot Vsl(k)+b2_{13}sl \cdot Vsl(k-1)+c1_{13}sl(k) \qquad (8)$$

where a1_sl, a2_sl, b1_sl, and b2_sl: Model parameters; and c1_sl(k): Disturbance component term in a k-th control cycle.

The sliding mode controller 55 includes a subtracter 41 for calculating a difference E_sl between the actual position Psl and a target position Psl_cmd of the shift arm 11 in the selecting direction, a switching function value calculator 42 for calculating a value of the switching function σ_sl, a reaching law input calculator 43 for calculating a reaching law input Urch_sl, an equivalent control input calculator 44 for calculating an equivalent control input Ueq_sr, and an adder 45 for calculating a control value Vsl of a voltage to be applied to the selection motor 12 of the selecting mechanism 40 by adding the equivalent control input Ueq_sr and the reaching law control input Urch_sr.

The switching function value calculator 42 calculates a switching function value σ_sl(k) according to the following equation (10) from the difference E_sl(k) calculated by the subtractor 41 according to the following equation (9).

$$E\_sl(k)=Psl(k)-Psl\_cmd(k-1) \qquad (9)$$

where E_sl(k): Difference between an actual position and a target position of the shift arm in the selecting direction in a k-th control cycle.

$$\sigma\_sl(k)=E\_sl(k)+VPOLE\_sl \cdot E\_sl(k-1) \qquad (10)$$

where σ_sl(k): Switching function value in a k-th control cycle; and POLE_sl: Switching function setting parameter (−1<POLE_sl<0).

The reaching law input calculator 43 calculates the reaching law input Urch_sl(k) according to the following equation (11). The reaching law input Urch_sl(k) is an input for placing error state amounts (E_sl(k), E_sl(k−1)) on a switching straight line having the switching function σ_sl set to zero (σ_sl(k)=0).

$$Urch\_sl(k) = -\frac{Krch\_sl}{b1\_sl} \cdot \sigma\_sl(k) \qquad (11)$$

where Urch_sl(k): Reaching law input in a k-th control cycle; and Krch_sl: Feedback gain.

The equivalent control input calculator 44 calculates the equivalent control input Ueq_sl(k) according to the following equation (12). The equation (12) sets σ_sl(k+1)=σ_sl(k) to calculate, as the equivalent control input Ueq_sl(k), the control value Vsl(k) of the voltage to be applied to the selection motor 12 when the above equations (9) and (8) are introduced.

$$Ueq\_sl(k) = \frac{1}{b1\_sl}\{(1 + VPOLE\_sl - a1\_sl) \cdot Psl(k) + \\ (VPOLE\_sl - a2\_sl) \cdot Psl(k-1) - b2\_sl \cdot Vsl(k-1) + \qquad (12)$$

-continued
$$Psl\_cmd(k) + (VPOLE\_sl - 1) \cdot Psl\_cmd(k-1) - \\ VPOLE\_sl \cdot Psl\_cmd(k-1) - c1\_sl(k)\}$$

where Ueq_sl(k): Equivalent control input in a k-th control cycle; and Keq_sl: Feedback gain.

The adder 45 calculates the control value Vsl of the voltage to be applied to the selection motor 12 of the selecting mechanism 40 according to the following equation (13).

$$Vsl(k)=Ueq\_sl(k)+Urch\_sl(k) \qquad (13)$$

The adaptation disturbance observer 57 calculates the disturbance component term c1_sl(k) in the above equation (8) as an estimated value of the disturbance applied to the selecting mechanism 40 for each control cycle of the selection controller 51. The adaptation disturbance observer 57 calculates the disturbance component term c1_sl(k) in a k-th control cycle according to the following equations (14) through (18).

The adaptation disturbance observer 57 uses a disturbance component term c1_sl(k−2) in last but one control cycle to calculate an estimated position Psl_hat(k) of the shift arm 11 in the selecting direction in the present control cycle according to the following equation (16) on the basis of the vector θ_sl defined according to the following equation (14) and the vector ξ_sl defined according to the following equation (15).

$$\theta\_sl^T(k)=[a1\_sl\ a2\_sl\ b1\_sl\ b2\_sl\ c1\_sl(k-1)] \qquad (14)$$

$$\zeta\_sl^T(k)=[Psl(k-1)Psl(k-2)Vsl(k-1)Vsl(k-2)\ 1] \qquad (15)$$

$$Psl\_hat(k)=\theta\_sl^T(k-1) \cdot \zeta\_sl(k) \qquad (16)$$

where Psl_hat(k): Estimated position of the shift arm in the selecting direction in a k-th control cycle.

Further, the adaptation disturbance observer 57 calculates a difference e_dov(k) between an actual position Psl(k) and an estimated position Psl_hat(k) of the shift arm 11 in the selecting direction in each control cycle according to the following equation (17), and calculates the disturbance component term c1_sl(k) in the present control cycle according to the following equation (18).

$$e\_dov(k)=Psl(k)-Psl\_hat(k) \qquad (17)$$

$$c1\_sl(k) = c1\_sl(k-1) + \frac{Pdov}{1 + Pdov} \cdot e\_dov(k) \qquad (18)$$

In the transmission 80, there are cases where the arrayed shift pieces are dislocated due to mechanical backlashes or variations in individual parts, or vibrations, impacts, or the like. FIG. 6A illustrates a case where the shift arm 11 was moved from the 5th/6th gear select position Psl_cmd56 to the 1st/2nd gear select position Psl_cmd12 in the selecting operation, with the shift piece 21b dislocated downward in the figure, causing the shift arm 11 to come in contact with a chamfered portion of the shift piece 21b.

In this case, a force Fsc in the shifting direction is produced by a driving force of the shift motor 13 when the shift controller 50 conducts the control of positioning to the neutral position (Psc_cmd=0). In addition, a force Fsl in the selecting direction is produced by a driving force of the selection motor 12 when the selection controller 51 conducts the control of positioning from the 5th/6th gear select position Psl_cmd56 to the 1st/2nd gear select position Psl_cmd12.

When a component Fsc' of Fsc in the direction of the chamfer and a component Fsl' of Fsl in the direction of the chamfer are balanced, the travel of the shift arm 11 toward the 1st/2nd gear select position Psl_cmd12 is prevented, disabling the selecting operation. To avoid this problem, the aforesaid adaptation disturbance observer 57 is provided to calculate the influence of Fsc' produced from the contact with the shift piece 21b in terms of an estimated value c1_sl of the disturbance to be applied to the selecting mechanism 40.

The adaptation disturbance observer 57 calculates an estimated disturbance value c1_sl(k) according to the above equations (16) to (18) for each control cycle of the selection controller 51. The sliding mode controller 55 of the selection controller 51 uses the estimated disturbance value c1_sl(k) to calculate an equivalent control input Ueq_sl(k) according to the above equation (12) for each control cycle of the selection controller 51, and also calculate a control value Vsl of a voltage to be applied to the selection motor 12 in each control cycle according to the above equation (13).

Thus, Vsl is determined so as to compensate for the influence of Fsc'. This increases the output of the selection motor 12, so that the force Fsl in the selecting direction increases. As a result, Fsl' becomes larger than Fsc', allowing the shift arm 11 to move downward in the figure along the chamfered portion to reach the 1st/2nd gear select position Psl_cmd12 via a path indicated by x, as shown in FIG. 6B.

FIG. 7 shows graphs illustrating the comparison between a case where the selecting operation is performed by the conventional selection controller 200 (refer to FIG. 31A) that uses the adaptation law input Uadp_sl explained in "Description of the Related Art" above and a case where the selecting operation is performed by the selection controller 51 that carries out disturbance compensation using an estimated disturbance value c1_sl rather than the adaptation law input Uadp_sl in the present embodiment.

Figure 31:
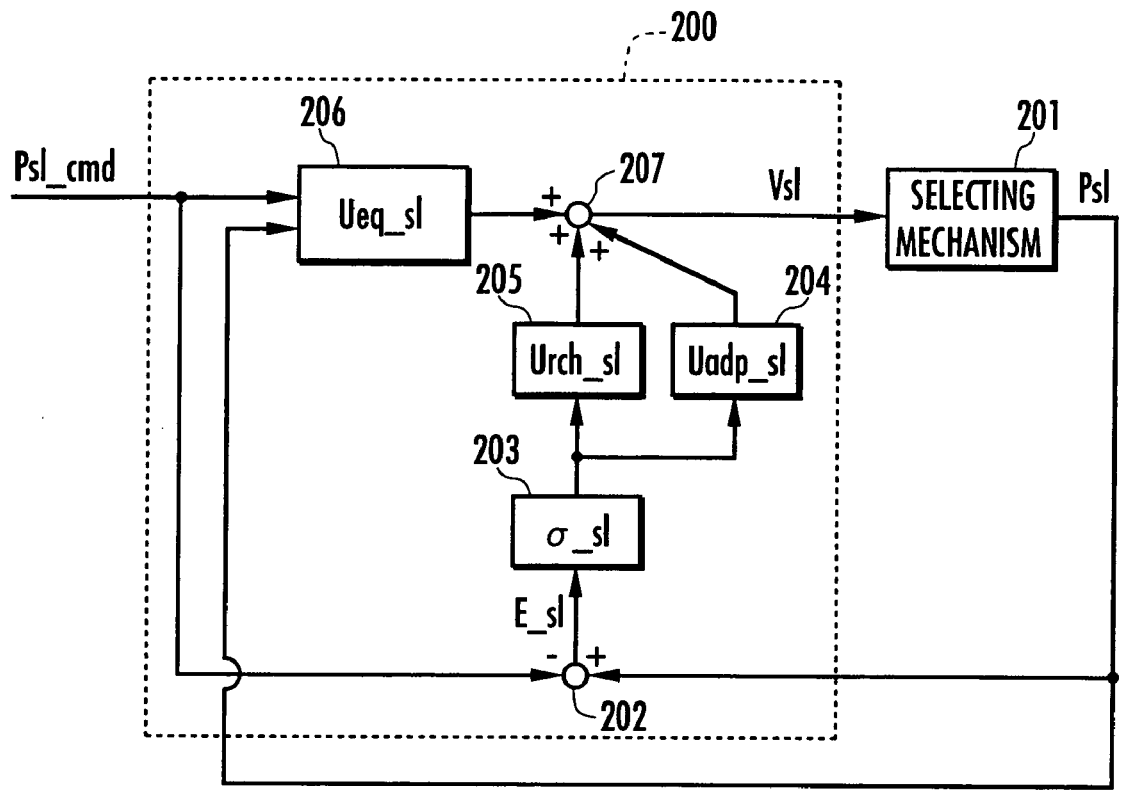
FIG. 31A is a block diagram of a conventional selection controller and FIG. 31B is an explanatory diagram of a selecting operation performed by the selection controller.
Figure 31:
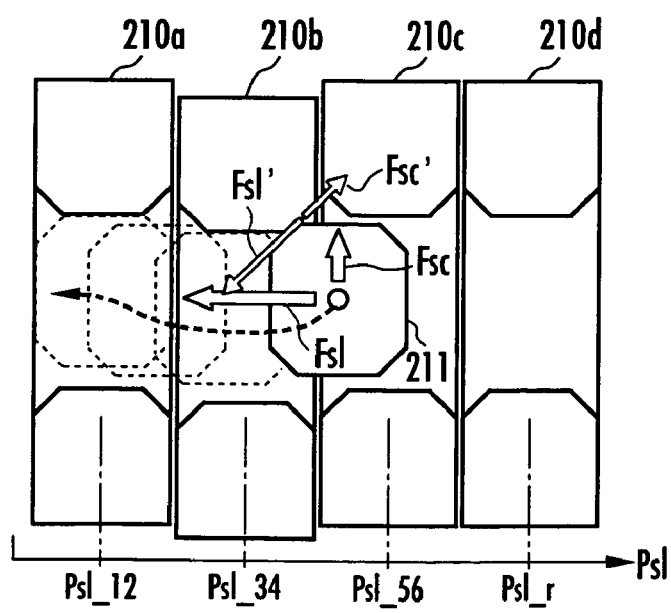
Figure 32:
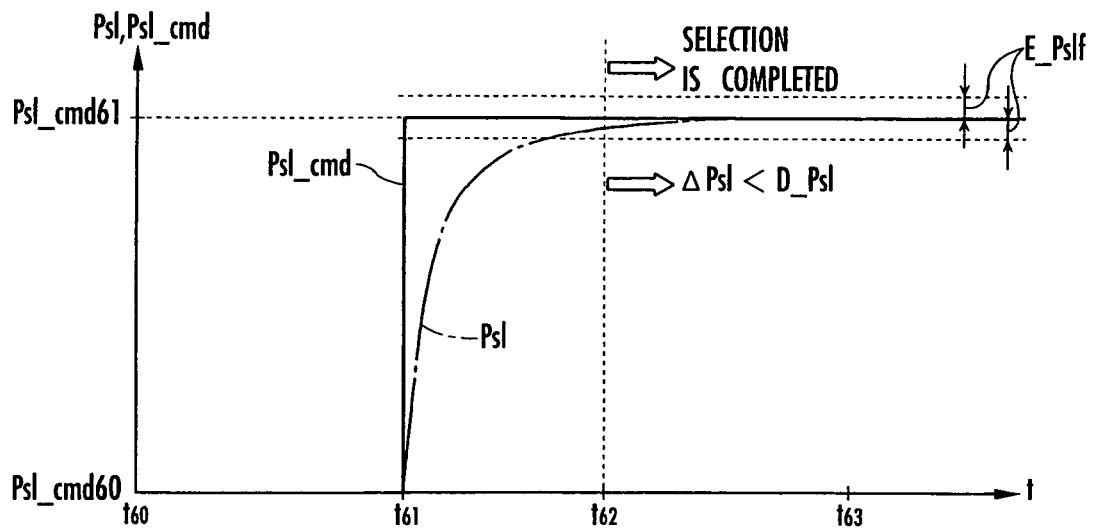
FIGS. 32A and 32B are graphs illustrating displacements of the shift arm in the selecting operation in a conventional transmission control system.
Figure 32:
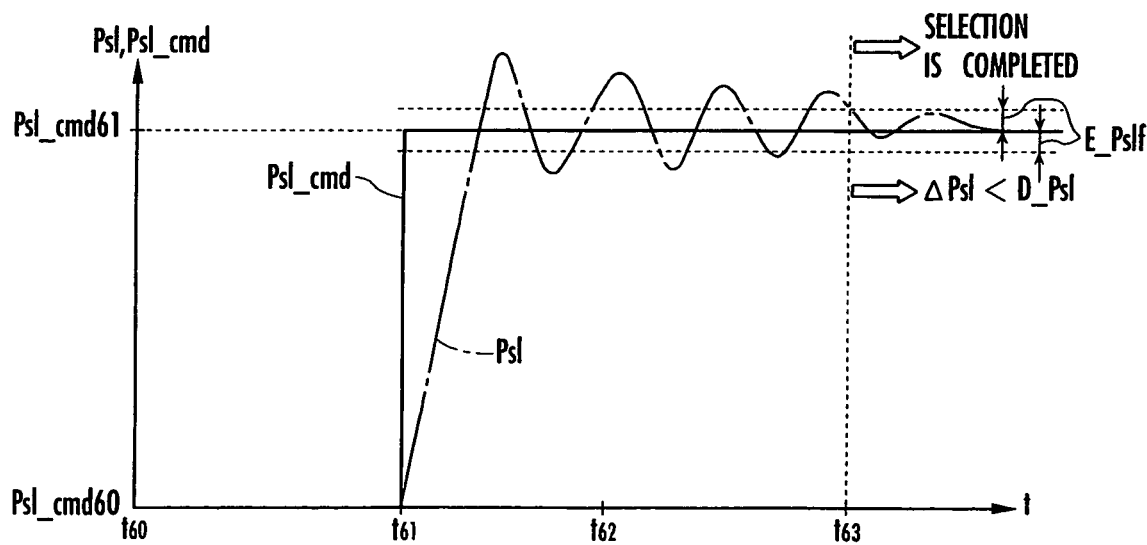

FIG. 7A illustrates the case of the conventional selection controller 200 shown in FIG. 31A. FIG. 7B illustrates the case of the selection controller 51 in accordance with the present embodiment. The axes of ordinates indicate the target position Psl_cmd and the actual position Psl of the shift arm 11, while the axes of abscissas indicate the common time t.

Referring to FIGS. 7A and 7B, at $t_{51}$, the target position in the selecting direction is changed from the 5th/6th gear select position Psl_cmd56 to the 1st/2nd gear select position Psl_cmd12, starting the selecting operation of the shift arm 11. The shift arm 11 reaches Psl_cont, it comes in contact with the shift piece 21b.

In this case, the conventional selection controller 200 calculates the adaptation law input Uadp_sl according to the above equation (6), which involves integral processing, and performs disturbance compensation based on the calculated adaptation law input Uadp_sl. Hence, the disturbance compensation takes time, leading to an increased delay in following the actual position Psl relative to an ideal travel curve Psl_idl of the shift arm 11 obtained by sliding mode control, as shown in FIG. 7A. Furthermore, an overshoot after the actual position Psl of the shift arm 11 reaches the target position Psl_cmd12 also increases, resulting in a prolonged time ($t_{51}$ to $t_{53}$) required for the actual position of the shift arm 11 to converge to the target position Psl_cmd12 at $t_{53}$ after the selecting operation begins at $t_{51}$.

In the selection controller 51 according to the present embodiment, the estimated disturbance value c1_sl is calculated by the adaptation disturbance observer 57 for each control cycle, and the equivalent control input Ueq_sl is calculated using the estimated disturbance value c1_sl according to the above equation (12), thereby directly compensating for the disturbance. This allows the compensation for a disturbance to be promptly accomplished when the shift arm 11 comes in contact with the shift piece 21b, resulting in a reduced delay in following the actual position Psl relative to the ideal travel curve Psl_idl of the shift arm 11 obtained by sliding mode control, as shown in FIG. 7B.

Moreover, the overshoot of the actual position Psl relative to the target position Psl_cmd12 of the shift arm 11 shown in FIG. 7A is also restrained. This makes it possible to shorten the time ($t_{51}$ to $t_{52}$) required for the actual position of the shift arm 11 to converge to the target position Psl_cmd12 after the selecting operation is begun at $t_{51}$, as compared with the case illustrated by FIG. 7A where the conventional selection controller 200 is used.

The sliding mode controller 53 provided in the shift controller 50 shown in FIG. 4 models a configuration for positioning the shift arm 11 in the shifting direction according to an equation (19) given below and calculates a control value V_sc(k) of a voltage to be applied to the shift motor 13 according to the following equations (20) through (26), thereby conducting the positioning control on the shift arm 11 in the shifting direction.

$$Psc(k+1)=a1\_sc \cdot Psc(k)+a2\_sc \cdot Psc(k-1)+b1\_sc \cdot Vsc(k)+b2_{13}sc \cdot Vsc(k-1) \quad (19)$$

where a1_sc, a2_sc, b1_sc, and b2_sc: Model parameters.

A difference E_sc(k) between an actual position Psc(k) of the shift arm 11 in the shifting direction in a k-th control cycle and a target position Psc_cmd(k−1) in a k−1(th) control cycle is determined according to the following equation (20) by the sliding mode controller 53. A switching function σ_sc(k) for restricting the converging behavior for the difference E_sc(k) in the sliding mode is given by the following equation (21).

$$E\_sc(k)=Psc(k)-Psc\_cmd(k-1) \quad (20)$$

where E_sc(k): Difference in the shifting direction in a k-th control cycle; Psc(k): Actual position of the shift arm 11 in the shifting direction in the k-th control cycle; and Psc_cmd(k): Target position of the shift arm 11 in the shifting direction in a k−1(th) control cycle.

$$\sigma\_sc(k)=E\_sc(k)+VPOLE\_sc \cdot E\_sc(k-1) \quad (21)$$

where VPOLE_sc: Switching function setting parameter (−1<VPOLE_sc<1).

A switching function integral value SUM_σsc(k) is calculated according to the following equation (22).

$$SUM\_\sigma sc(k)=SUM\_\sigma sc(k-1)+\sigma\_sc(k) \quad (22)$$

where SUM_σsc(k): Switching function integral value in a k-th control cycle.

The switching function in the above equation (23) is expressed as σ_sc(k+1)=σ_sc(k), and introducing the above equations (19) and (20) yields an equivalent control input Ueq_sc(k) of the following equation (23).

$$Ueq\_sc(k) = \frac{1}{b1\_sc}\{(1 - VPOLE\_sc - a1\_sc) \cdot Psc(k) + \quad (23)$$
$$(VPOLE\_sc - a2\_sc) \cdot Psc(k - 1) - b2\_sc \cdot Vsc(k - 1) +$$

-continued $$Psc\_cmd(k) + (VPOLE\_sc - 1) \cdot Psc\_cmd(k-1) - VPOLE\_sc \cdot Psc\_cmd(k-1)\}$$

where Ueq_sc(k): Equivalent control input in a k-th control cycle.

A reaching law input Urch_sc(k) is calculated according to equation (24) given below, an adaptation law input Uadp_sc(k) is calculated according to equation (25) given below, and a control value Vsc(k) of a voltage applied to the shift motor 13 is calculated according to the following equation (26).

$$Urch\_sc(k) = -\frac{Krch\_sc}{b1\_sc} \cdot \sigma\_sc(k) \quad (24)$$

where Urch_sc(k): Reaching law input in a k-th control cycle; and Krch_sc: Feedback gain.

$$Uadp\_sc(k) = -\frac{Kadp\_sc}{b1\_sc} \cdot SUM\_\sigma sc(k) \quad (25)$$

where Uadp_sc(k): Adaptation law input in a k-th control cycle; and Kadp_sc: Feedback gain.

$$Vsc(k) = Ueq\_sc(k) + Urch\_sc(k) + Uadp\_sc(k) \quad (26)$$

where Vsc(k): Control value of a voltage to be applied to the shift motor 13 in a k-th control cycle.

In the transmission 80, there are some cases where a difference occurs between the target value Psl_cmd of each preset speed selection position and a target value Psl_cmd* corresponding to a true selected position because of mechanical play, individual variations of parts, or the like. FIGS. 8A and 8B illustrate a case where such a difference takes place at the 3rd/4th gear select position.

Referring to FIG. 8A, a target value Psl_cmd34 of the 3rd/4th gear select position is shifted toward the shift piece 21a with respect to a true target value Psl_cmd34*. Thus, if the shift arm 11 positioned at Psl_cmd34 is shifted from the neutral position to the 3rd speed shift position, then the shift arm 11 and the shift piece 21a interfere with each other, preventing the shifting operation from being accomplished.

The shift arm 11 and all shift pieces 21a through 21d are chamfered. Therefore, in the case of manual transmission (MT) in which the shifting operation and the selecting operation are performed by drivers' operating force rather than an actuator, such as a motor, the driver who feels the interference against the shift arm 11 slightly reduces his or her holding force in the selecting direction. This causes the shift arm 11 to be shifted toward the true target value Psl_cmd34 along the chamfered portion, as illustrated in FIG. 8B, thus allowing the shifting operation to be accomplished.

FIGS. 9A and 9B are graphs showing a transition of the actual position Psc in the shifting direction and the actual position Psl in the selecting direction of the shift arm 11 during the shifting operation in the MT described above. In the graph of FIG. 9A, the axis of ordinates indicates Psc in the shifting direction, while the axis of abscissas indicates time t. In the graph of FIG. 9B, the axis of ordinates indicates the actual position Psl in the selecting direction, while the axis of abscissas indicates time t, as in the graph of FIG. 9A.

The shifting operation is begun at $t_{10}$ in the graphs of FIGS. 9A and 9B, and the shift arm 11 starts moving toward a target value Psc_cmd3 indicating the 3rd speed shift position, as shown in FIG. 9A. At $t_{11}$, the shift arm 11 and the shift piece 21a interfere with each other, and the shift arm 11 is shifted to the true target value Psl_cmd34* from the target value Psl_cmd34 of the 3rd/4th gear select position from $t_{11}$ through $t_{12}$, as illustrated in FIG. 9B. This allows the shift arm 11 to move to the target value Psc_cmd3 of the 3rd shift position, as shown in FIG. 9A, while avoiding the interference between the shift arm 11 and the shift piece 21a.

In an automated manual transmission (AMT) according to the present embodiment in which the shifting operation and the selecting operation are performed by a shift motor 13 and a selection motor 12, if an attempt is made to position and hold the shift arm 11 at the target value Psl_cmd34 of the 3rd/4th gear select position, then the shift arm 11 cannot be shifted in the selecting direction when the shift arm 11 and the shift piece 21a interfere with each other. This prevents the shifting operation from being accomplished.

FIG. 10A illustrates a case where the shift arm 11 has been slightly shifted in the selecting direction because of its interference with the shift piece 21a when the shift arm 11 at the target value Psl_cmd34 of the 3rd/4th gear select position in the AMT is moved to the target value Psc_cmd3 of the 3rd speed shift position. In this case, the selection controller 51 determines an output voltage Vsl to be applied to the selection motor 12 such that the position of the shift arm 11 in the selecting direction is set back to Psl_cmd34 by eliminating the shift E_sl. This causes a force Fsl to be produced in the selecting direction.

Here, a component of Fsl in the direction of a tangent α on chamfered portions of the shift arm 11 and the shift piece 21a is denoted as Fsl1, a component in the direction of the normal line β of the tangent α is denoted as Fsl2, a component in a direction of the tangent α of a force Fsc in the shifting direction generated by the shifting operation is denoted as Fsc1, and a component in the direction of the normal line β is denoted as Fsc2. The shifting operation stops at the moment Fsc1 and Fsl1 are balanced.

FIG. 10B shows displacement of the shift arm 11 during the shifting operation described above. The axis of ordinates of the upper graph indicates the actual position Psc of the shift arm 11 in the shifting direction, the axis of ordinates of the lower graph indicates the actual position Psl of the shift arm 11 in the selecting direction, and the axes of abscissas provide common time axes t. At $t_{20}$, the shifting operation is begun. The target value Psl_cmd34 of the 3rd/4th gear select position has been shifted from the true target value Psl_cmd34*, so that the shift arm 11 and the shift piece 21a start to interfere with each other at $t_{21}$.

The chamfered portion causes the shift arm 11 to be slightly shifted in the selecting direction, but to stop moving in the selecting direction at $t_{22}$ when Fsc1 and Fsl1 are balanced and also to stop moving in the shifting direction. This interrupts the shifting operation, preventing the shift arm 11 from reaching the target value Psc_cmd3 of the 3rd speed shift position.

At this time, the shift controller 50 increases the control value Vsc of the voltage applied to the shift motor 13 to move the shift arm 11 to the target value Psc_cmd3 of the 3rd speed shift position. The selection controller 51 increases the control value Vsl of the voltage applied to the selection motor 12 to move the shift arm 11 to the target value Psl_cmd34 of the 3rd/4th speed selection position. This causes the voltages to be applied to the shift motor 13 and the selection motor 12 to become excessively high, which may damage the shift motor 13 and the selection motor 12.

To avoid the danger, the selection controller 51 uses different switching function setting parameters VPOLE_sl in the above equation (10) for the selecting operation and the shifting operation, respectively, so as to change a disturbance suppressing capability level. The graphs in FIG. 11 illustrate response specifying characteristics of the sliding mode controller 55 of the selection controller 51. The graphs in FIG. 11 show responses of a control system observed when VPOLE_sl is set to −0.5, −0.8, −0.99, and −1.0, respectively, with a step disturbance d being applied under a condition wherein the switching function σ_sl=0 in the above equation (10) and the difference E_sl=0 in the above equation (9). In FIG. 11, the axes of ordinates indicate the difference E_sl, the switching function σ_sl, and disturbance d, respectively, from the top, while the axes of abscissas all indicate time k.

As is obvious from FIG. 11, as an absolute value of VPOLE_sl is set to be smaller, the influences exerted on the difference E_sl by the disturbance d are reduced. Conversely, as an absolute value of VPOLE_sl is increased toward 1, the difference E_sl permitted by the sliding mode controller 55 increases. At this time, the behavior of the switching function σ_sl is the same regardless of the value of VPOLE_sl, so that it can be seen that the capability level of suppressing the disturbance d can be specified by setting the value of VPOLE_sl.

A VPOLE_sl calculator 56 of the selection controller 51 calculates different values of VPOLE_sl for the shifting operation and a non-shifting operation (the selecting operation), respectively, as shown in the following equation (27).

$$VPOLE\_sl = \begin{cases} VPOLE\_sl\_l: & \text{Shifting mode} \\ VPOLE\_sl\_h: & \text{Non-shifting mode} \end{cases} \quad (27)$$

where e.g., VPOLE_sl_l=−0.95 and VPOLE_sl_h=−0.7 are set so that |VPOLE_sl_l|>|VPOLE_sl_h|.

The selection controller 51 determines that the shifting operation is being performed if the relationships expressed by the following two equations (28) and (29) hold.

$$|Psc\_cmd| > Psc\_cmd\_vp (\approx 0.3 \text{ mm}) \quad (28)$$

where Psc_cmd: Target value in the shifting direction; and Psc_cmd_vp: Preset reference value (e.g., 0.3 mm) of the amount of displacement from a neutral position (Psc_cmd=0).

$$|\Delta Psl| < dpsl\_vp (\approx 0.1 \text{ mm/step}) \quad (29)$$

where ΔPsl: Amount of displacement in the selecting direction from the preceding control cycle; and dpsl_vp: Preset reference value (e.g., 0.1 mm/step) of displacement amount in a control cycle.

FIG. 12A shows the displacement of the shift arm 11 when the disturbance suppressing capability level is set to be lower than that used for the selecting operation according to the above equation (27), VPOLE_sl in the shifting operation being set as VPOLE_sl_l, and the shift arm 11 is shifted to the target value Psc_cmd3 of the 3rd speed shift position, as in the case shown in FIG. 10A.

In FIG. 12A, the disturbance suppressing capability level in the sliding mode controller 55 of the selection controller 51 has been set to be low, so that the interference between the shift arm 11 and the shift piece 21a causes the shift arm 11 to be shifted in the selecting direction from the target position Psl_cmd34 of the 3rd/4th gear select position. When the difference E_sl from the Psl_cmd34 is produced, the voltage Vsl applied to the selection motor 12 is reduced to cancel the difference E_sl.

As a result, the force Fsl in the selecting direction produced by the drive of the selection motor 12 is reduced, and the component Fsc1 in the direction of the tangent α of the force Fsc in the shifting direction that is generated by the drive of the shift motor 13 becomes larger than the component Fsl1 in the direction of the tangent α of Fsl. This causes a force Ft in the direction of the tangent α to be generated. The force Ft moves the shift arm 11 in the direction of the tangent α, thus displacing the position of the shift arm 11 in the selecting direction from Psl_cmd to Psl_cmd*. This makes it possible to prevent the shift arm 11 and the shift piece 21a from interfering with each other, permitting the shift arm 11 to move in the shifting direction.

The graphs in FIG. 12B show displacement of the shift arm 11 in FIG. 12A explained above. The axes of ordinates indicate the actual position Psc of the shift arm 11 in the shifting direction, the actual position Psl thereof in the selecting direction, and the switching function setting parameter VPOLE_sl from the top. The axes of abscissas all indicate time t.

When the shifting operation is begun at $t_{31}$, the setting of VPOLE_sl in the sliding mode controller 55 is switched from VPOLE_sl_h to VPOLE_sl_l by the VPOLE_sl calculator 56 of the selection controller 51, so that the disturbance suppressing capability level of the sliding mode controller 55 is lowered.

When the shift arm 11 and the shift piece 21a interfere with each other at $t_{32}$, the shift arm 11 shifts in the selecting direction from the 3rd/4th gear target position Psl_cmd34. At $t_{33}$, the position of the shift arm 11 in the selecting direction reaches the true 3rd/4th gear target position Psl_cmd34*. Thus, shifting the shift arm 11 in the selecting direction prevents the shift piece 21a from interfering with the shifting operation, thus displacing the shift arm 11 in the shifting direction from the neutral position to the 3rd speed shift target position Psc_cmd3.

Referring now to FIG. 13, the shift controller 50 establishes each speed by implementing the following four modes (Mode1 through Mode4) in the shifting operation. The shift controller 50 changes the switching function setting parameter VPOLE_sc according to the following equation (30) in each mode. Thus, changing the switching function setting parameter VPOLE_sc makes it possible to change the disturbance suppressing capability level of the shift controller 50, as in the case of the aforesaid selection controller 51.

$$VPOLE\_sc = \begin{cases} VPOLE\_sc11(=-0.8): & Mode1(|Psc(k)| < |Psc\_def|) \\ VPOLE\_sc12(=-0.98): & Mode1(|Psc(k)| \geq |Psc\_def|) \\ VPOLE\_sc2(=-0.85): & Mode2(|Psc\_def| \leq |Psc(k)| \leq |Psc\_scf|) \\ VPOLE\_sc3(=-0.7): & Mode3(|Psc(k)| > |Psc\_scf|) \\ VPOLE\_sc4(=-0.9): & Mode4 \end{cases} \quad (30)$$

where Psc_def: Standby position of a synchronizer ring; and Psc_scf: Position where the coupling sleeve and the synchronizer ring comes in contact.

FIG. 13A shows a graph in which the axis of ordinates indicates the actual position Psc and the target position Psc_cmd of the shift arm 11 in the shifting direction, and the axis of abscissas indicates time t. FIG. 13B shows a graph in which the axis of ordinates indicates the switching function setting parameter VPOLE_sc, and the axis of abscissas indicates time t, which also applies to the graph of FIG. 13A.

(1) Mode1 ($t_{40}$ to $t_{42}$: Target Value Follow-Up & Compliance Mode)

The VPOLE_sc calculator 54 of the shift controller 50 shown in FIG. 4 sets and holds VPOLE_sc at VPOLE_sc11 (=−0.8) until the actual position Psc of the shift arm 11 (refer to FIG. 2A) reaches the standby position Psc_def of the synchronizer ring 23 (Psc<Psc_def) after the shifting operation is begun from the neutral position. This enhances the disturbance suppressing capability level of the shift controller 50, resulting in enhanced capability of the shift arm 11 to follow the target position Psc_cmd.

At $t_{41}$ when the actual position Psc of the shift arm 11 reaches the standby position Psc_def of the synchronizer ring 22, the VPOLE_sc calculator 54 sets VPOLE_sc to VPOLE_sc12 (=−0.98) so as to lower the disturbance suppressing capability level of the shift controller 50. This provides a shock absorbing effect when the sleeve ring 22 and the synchronizer ring 23 come into contact, making it possible to restrain the occurrence of percussive noises or restrain the coupling sleeve 22 from being forcibly pushed into the synchronizer ring 23.

(2) Mode2 ($t_{42}$ to $t_{43}$: Rotational Synchronization Control Mode)

After conditions Psc_def≦Psc≦Psc_scf and ΔPsc<ΔPsc_sc (ΔPsc_sc: Determination value of the contact between the coupling sleeve 22 and a synchronizer ring 22b) are satisfied, the target value Psc_cmd is set to Psc_sc, and VPOLE_sc is set to VPOLE_sc2 (=−0.85) to apply an appropriate pressing force to the synchronizer ring 22b. Thus, the rotational speeds of the coupling sleeve 22 and the third forward gear 7c on the input side are synchronized.

(3) Mode3 ($t_{43}$ to $t_{44}$: Static Mode)

When a condition Psc_scf<Psc is satisfied at $t_{43}$, the target value Psc_cmd is set to a shift completion target value Psc_end. Furthermore, in order to prevent Psc from overshooting Psc_cmd (if an overshoot happens, a noise from a collision against a stopper member (not shown) is produced), the switching function integral value SUM_σsc is reset, and VPOLE_sc is set to VPOLE_sc3 (=−0.7) to increase the disturbance suppressing capability. This causes the coupling sleeve 22 to pass by the synchronizer ring 22b and engage the third forward gear 7c on the input side.

(4) Mode4 ($t_{44}$ and after: Hold Mode)

After completion of the shifting operation and during the selecting operation, VPOLE_sc is set to VPOLE_sc4 (=−0.9) to lower the level of the disturbance suppressing performance in the shift controller 50 to reduce electric power supplied to the shift motor 13 so as to save electric power. As illustrated in FIG. 14A, if the selecting operation is performed by moving the shift arm 11 from the 5th/6th gear select position to the 1st/2nd gear select position with a positional shift E_Psc present between the shift piece 21b and the shift piece 21c, then the chamfered portions of the shift arm 11 and the shift piece 21b come in contact.

At this time, if the disturbance suppressing capability of the shift controller 50 is maintained at a high level, then a component Fsl' in the tangential direction of a chamfered portion of the force Fsl in the selecting direction produced by the drive of the selection motor 12 interferes with a component Fsc' in the tangential direction of a chamfered portion of the force Fsc in the shifting direction produced by the drive of the shift motor 13, causing the shifting operation of the shift arm 11 to be interrupted. Furthermore, conducting the control for positioning the shift arm 11 at a target position by the shift controller 50 and the selection controller 51 will increase the voltage applied to the selection motor 12 and the shift motor 13, generating an abnormal rise in the temperatures of the selection motor 12 and the shift motor 13. This may lead to considerably deteriorated performance for the next speed change due to a decreased motor torque.

In the selecting operation, therefore, VPOLE_sc is set to VPOLE_sc4 (=−0.9) to lower the level of disturbance suppressing capability of the shift controller 50 so as to decrease the force Fsc in the shifting direction, as shown in FIG. 14B. With this arrangement, the shift arm 11 easily shifts in the shifting direction, as indicated by a path y in FIG. 14B, so that the shift arm 11 can be promptly moved to the 1st/2nd gear select position, avoiding the interference with the shift piece 21b due to the synergistic effect with the disturbance compensation provided by the aforesaid adaptation disturbance observer 57.

Referring now to the flowcharts shown in FIG. 15 through FIG. 22, and FIG. 24, the procedure for carrying out the control over the transmission 80 by the control unit 1 will be explained.

FIG. 15 shows a main flowchart of the control unit 1. When the driver of the vehicle operates the accelerator pedal 95 (refer FIG. 1) or the brake pedal 99 in STEP1, the control unit 1 determines, depending on which is operated, a driving force index Udrv for determining the driving force to be applied to the drive wheels 94 according to the following equation (31).

$$Udrv = \begin{cases} AP & \text{(When the accelerator pedal is depressed)} \\ Kbk \times BK & \text{(When the brake pedal is depressed)} \end{cases} \quad (31)$$

where Udrv: Driving force index; AP: Degree of opening of the accelerator pedal; BK: Brake depressing force; and Kbk: Coefficient used to convert a brake depressing force (0 to maximum) into a degree of opening of the accelerator pedal (0 to −90 degrees).

Then, based on the driving force index Udrv, the control unit 1 determines in STEP2 whether to perform speed changing operation of the transmission 80. If it is determined to perform the speed changing operation, then the transmission control is carried out to perform the speed changing operation by deciding a target speed. In the subsequent STEP3, the control unit 1 carries out the clutch control to control the slip rate of the clutch assembly 82 (refer to FIG. 1).

Referring now to the flowcharts shown in FIG. 16 through FIG. 18, the procedure for carrying out the transmission control by the control unit 1 will be explained. The control unit 1 first checks in STEP10 of FIG. 16 whether the driver of the vehicle has issued a request for reverse. If the request for reverse has been issued, then the control unit 1 proceeds to STEP20 wherein it sets the gear selection target value NGEAR_cmd to −1, which denotes reverse, and then proceeds to STEP12.

If it is determined in STEP10 that no request for reverse has been issued, then the control unit 1 proceeds to STEP11 wherein it applies the driving force index Udrv and the vehicle speed VP of the vehicle to the Udrv, VP/NGEAR_cmd map shown in FIG. 16 so as to determine the gear selection target value NGEAR_cmd. Table 1 below shows the relationship between the gear selection target value NGEAR_cmd and selected gear positions.

TABLE 1

Correspondence between gear selection target value NGEAR_cmd and selected gear position

| NGEAR_cmd | −1 | 1 | 2 | 3 | 4 | 5 | 0 |
|---|---|---|---|---|---|---|---|
| Gear position | Reverse | 1st gear | 2nd gear | 3rd gear | 4th gear | 5th gear | Neutral |

In the subsequent STEP12, the control unit 1 determines whether a current gear select position NGEAR of the transmission 80 coincides with a gear selection target value NGEAR_cmd. If it is determined that the gear select position NGEAR coincides with the gear selection target value NGEAR_cmd, then the control unit 1 proceeds to STEP15 to terminate the transmission control without carrying out the speed changing operation on the transmission 80.

If it is determined in STEP12 that the gear select position NGEAR of the transmission 80 does not coincide with the gear selection target value NGEAR_cmd, then the control unit 1 proceeds to STEP13 wherein the control unit 1 starts a speed changing operation reference timer for determining the timing of each processing in the speed changing operation to be performed in the next STEP14. Thus, the control unit 1 executes the speed changing operation in STEP14 and then proceeds to STEP13 where it terminates the transmission control.

The speed changing operation of the transmission is performed by three steps, namely, a clutch OFF step in which the clutch assembly 82 (refer to FIG. 1) is set to a clutch OFF state to enable the shifting/selecting operation of the transmission 80, a gear position changing step in which the shifting/selecting operation of the transmission 80 is performed to change the gear selection position NGEAR to the gear selection target value NGEAR_cmd in the clutch OFF state, and a clutch ON step in which the clutch assembly 82 is set back to the clutch ON state after the gear position changing step is finished.

To grasp the timings from the moment the speed changing operation reference timer is started in STEP13 to the moment each step is completed, clutch OFF completion time TM_CLOFF, gear position change completion time TM_SCHG, and clutch ON completion time TM_CLON are preset (TM_CLOFF<TM_SCHG<TM_CLON).

The moment the control unit 1 starts the speed changing operation reference timer in STEP13, it starts the clutch OFF processing and turns the clutch assembly 82 off. When counting time tm_shift of the speed changing operation reference timer exceeds the clutch OFF completion time TM_CLOFF, the gear position changing step is begun. When the counting time tm_shift of the speed changing operation reference timer reaches the gear position change completion time TM_SCHG, the control unit 1 beings the clutch ON step to turn the clutch assembly 82 on.

The flowcharts shown in FIG. 17 and FIG. 18 illustrate the procedure for implementing the speed changing operation of the transmission 80 carried out by the control unit 1 after the clutch OFF processing is begun. The control unit 1 first determines in STEP30 of FIG. 17 whether a current gear selection position NGEAR of the transmission 80 coincides with the gear selection target value NGEAR_cmd.

If it is determined that the gear selection position NGEAR coincides with the gear selection target value NGEAR_cmd and that the speed changing operation is completed, then the control unit 1 proceeds to STEP45 wherein it clears clocking time tm_shift on a speed changing operation reference timer. In the next STEP46, the control unit 1 resets a gear disengagement completion flag F_SCN (F_SCN=0) set upon completion of gear disengagement processing in the transmission 80, and resets a select completion flag F_SLF (F_SLF=0) set upon completion of the selecting operation in the transmission 80.

The control unit 1 then proceeds to STEP61 wherein the control unit 1 maintains a current gear selection position by holding the target position Psc_cmd of the shift arm 11 in the shifting direction by the shift controller 50 and the target position Psl_cmd of the shift arm 11 in the selecting direction by the selection controller 51 at current values. The control unit 1 then proceeds to STEP33 of FIG. 18.

At this time, the VPOLE_sc calculator 54 of the shift controller 50 sets the response specifying parameter VPOLE_sc in the sliding mode controller 53 of the shift controller 50 to VPOLE_sc4 (=−0.9). This lowers the level of disturbance suppressing capability of the shift controller 50, thus saving electric power of the shift motor 13.

Furthermore, the VPOLE_sl calculator 56 of the selection controller 51 sets the response specifying parameter VPOLE_sl in the sliding mode controller 55 of the selection controller 51 to VPOLE_sl_1 (=−0.95). This lowers the level of disturbance suppressing capability of the shift controller 50, thus saving electric power in the selection motor 12.

If, on the other hand, it is determined in STEP30 that a current gear selection position NGEAR of the transmission 80 does not coincide with the gear selection target value NGEAR_cmd and that the speed changing operation of the transmission 80 is in process, then the control unit 1 proceeds to STEP31.

In STEP31, the control unit 1 determines whether the clocking time tm_shift on the speed changing operation reference timer has exceeded a clutch OFF time TM_CLOFF. If it is determined that the clocking time tm_shift on the speed changing operation reference timer has not exceeded the clutch OFF completion time TM_CLOFF and the clutch OFF step has not been completed, then the control unit 1 proceeds to STEP32 wherein it carries out the same processing as that in STEP61 to maintain a current gear selection position.

If, on the other hand, it is determined in STEP31 that the clocking time tm_shift on the timer has exceeded the clutch OFF completion time TM_CLOFF and the clutch OFF step has been completed, then the control unit 1 proceeds to STEP50 wherein the control unit 1 determines whether the clocking time tm_shift on the timer has exceeded a gear position change completion time TM_SCHG.

In STEP50, if it is determined that the clocking time tm_shift on the timer has not exceeded the gear position change completion time TM_SCHG and the gear position change step is being implemented, then the control unit 1 proceeds to STEP51 to perform the shifting/selecting operation, and then proceeds to STEP33 of FIG. 18.

If, on the other hand, it is determined in STEP50 that the clocking time tm_shift on the timer has exceeded the gear position change completion time TM_SCHG and the gear position change step has been completed, then the control unit 1 proceeds to STEP60 wherein the control unit 1 determines whether the clocking time tm_shift on the timer has exceeded a clutch ON completion time TM_CLON.

In STEP60, if it is determined that the clocking time tm_shift on the timer has not exceeded the clutch ON completion time TM_CLON and the clutch ON step is being implemented, then the control unit 1 performs the processing in the aforesaid STEP61, and then proceeds to STEP33 of FIG. 18.

If, on the other hand, it is determined in STEP60 that the clocking time tm_shift on the timer has exceeded the clutch ON completion time TM_CLON (TM_CLON<tm_shift) and the clutch ON step has been completed, then the control unit 1 proceeds to STEP70 wherein the control unit 1 sets the current gear selection position NGEAR to the gear selection target value NGEAR_cmd. The control unit 1 then proceeds to STEP61 to implement the aforesaid processing of STEP61, and then proceeds to STEP33 of FIG. 18.

Processing of STEP33 through STEP37 and STEP80 shown in FIG. 18 is carried out by the sliding mode controller 53 of the shift controller 50. In STEP33, the sliding mode controller 53 calculates E_sc(k) according to the above equation (20) and also calculates σ_sc(k) according to the above equation (21).

If it is found in the subsequent STEP34 that a move-to-Mode3 flag F_Mode2 to 3, which is set when moving from Mode2 to Mode3, has been set (F_Mode2 to 3=1), then the control unit 1 proceeds to STEP35 to reset the switching function integral value SUM_σsc(k) calculated according to the above equation (22)(SUM_σsc=0). On the other hand, if it is found in STEP34 that the move-to-Mode3 flag F_Mode2 to 3 has been reset (F_Mode2 to 3=0), then the control unit 1 proceeds to STEP80 to update the switching function integral value SUM_σsc(k) according to the above equation (22), and then proceeds to STEP36.

The sliding mode controller 53 calculates the equivalent control input Ueq_sc(k), the reaching law input Urch_sc(k), and the adaptation law input Uadp_sc(k) in STEP36 according to the above equations (23) to (25), and further calculates a control value Vsc(k) of the voltage to be applied to the shift motor 13 according to the above equation (26) in STEP37 so as to control the shift motor 13.

In the subsequent STEP38 through STEP40, processing is carried out by the sliding mode controller 55 and the adaptation disturbance observer 57 of the selection controller 51. In STEP38, the sliding mode controller 55 calculates E_sl(k) according to the above equation (2), and further calculates σ_sl(k) according to the above equation (3).

In the subsequent STEP39, the adaptation disturbance observer 57 calculates a disturbance component term c1_sl(k) according to the above equations (16) through (18). The sliding mode controller 55 calculates the reaching law input Urch_sl(k) according to the above equation (11), and the equivalent control input Ueq_sl(k) using the disturbance component term c1_sl(k) according to the above equation (12).

In the next STEP40, the sliding mode controller 55 calculates a control value Vsl(k) of a voltage to be applied to the selection motor 12 according to the above equation (13). Thus, the selection controller 51 quickly compensates for a disturbance applied to the shift arm 11 during the selecting operation, and controls the selection motor 12. The control unit 1 then proceeds to the next STEP41 to terminate the speed changing operation.

FIG. 19 shows a flowchart of the shifting/selecting operation in STEP51 of FIG. 17. In STEP90, if it is determined that the gear disengagement completion flag F_SCN has been reset (F_SCN=0) and the gear disengagement is in process, then the control unit 1 proceeds to STEP91.

Processing in STEP91 and STEP92 is carried out by the target position calculator 52 shown in FIG. 4. The target position calculator 52 holds the target position Psl_cmd of the shift arm 11 in the selecting direction at a current position in STEP91, and sets the target position Psc_cmd of the shift arm 11 in the shifting direction to zero, which indicates the neutral position, in STEP92. Processing in STEP93 is carried out by the VPOLE_sc calculator 54 shown in FIG. 4 and the VPOLE_sl calculator 56. The VPOLE_sl calculator 56 sets VPOLE_sl to VPOLE_sl_1 (−0.95), and the VPOLE_sc calculator 54 sets VPOLE_sc to VPOLE_scl1 (=−0.8).

With this arrangement, the level of disturbance suppressing capability of the selection controller 51 is lowered, expanding the permissible range of the shift of the shift arm 11 in the selecting direction. Thus, the shift arm 11 can be smoothly moved in the shifting direction, minimizing the influences of interference between the shift arm 11 and a shift piece 21.

In the subsequent STEP94, if the position (in an absolute value) of the shift arm 11 in the shifting direction is below a preset neutral determination value Psc_N (e.g., 0.15 mm), then it is determined that the gear disengagement processing is finished, and the control unit 1 proceeds to STEP95 to set the gear disengagement completion flag F_SCN (F_SCN=1) before it proceeds to STEP96 wherein it terminates the shifting/selecting operation.

Meanwhile, if it is determined in STEP90 that the gear disengagement completion flag F_SCN (F_SCN=1) has been set, indicating the end of the gear disengagement processing, then the control unit 1 proceeds to STEP100. Processing steps in STEP100 through STEP103 and STEP110 are implemented by the target position calculator 52. The target position calculator 52 determines in STEP100 whether a selection completion flag F_SLF has been set.

If it is determined in STEP100 that the selection completion flag F_SLF has been reset (F_SLF=0), meaning that the selecting operation is in process, then the target position calculator 52 proceeds to STEP101 to search a NGEAR_cmd/Psl_cmd_table map shown in FIG. 19 to acquire a set value Psl_cmd_table of each gear in the selecting direction that corresponds to NGEAR_cmd.

In the subsequent STEP103, the target position calculator 52 holds the target value Psc_cmd of the shift arm 11 in the shifting direction at a current value, and sets Psc_cmd_tmp specifying an increase width of a target value in the shifting direction to zero. In the next STEP104, processing is carried out by a VPOLE_sc calculator 54 and the VPOLE_sl calculator 56. The VPOLE_sl calculator 56 sets VPOLE_sl to VPOLE_sl_h (=−0.7), and the VPOLE_sc calculator 54 sets VPOLE_sc to VPOLE_sc4 (=−0.9).

Thus, the disturbance suppressing capability of the shift controller 50 is lowered, and the shift arm 11 easily shifts in the shifting direction during the selecting operation, allowing the selecting operation to be smoothly accomplished even if the shift arm 11 and a shift piece 21 interfere with each other, as described above with reference to FIG. 14B.

If an absolute value |Psl−Psl_cmd| of a difference between the current position and a target position of the shift arm 11 in the selecting direction reduces below a selection completion determination value E_Pslf (e.g., 0.15 mm) in STEP105, and if a moving speed ΔPsl of the shift arm 11 in the selecting direction reduces below a selection speed convergence determination value D_Pslf (e.g., 0.1 mm/step) in STEP106, then the control unit 1 determines that the selecting operation is completed and proceeds to STEP107. The control unit 1 then sets the selection completion flag F_SLF (F_SLF=1) and proceeds to STEP96 wherein it terminates the shifting/selecting operation.

Meanwhile, if it is determined in STEP100 that the selection completion flag F_SLF has been set, indicating the end of the selecting operation, then the control unit 1 proceeds to STEP110. The processing in STEP110 and STEP111 is implemented by the target position calculator 52. The target position calculator 52 holds the target position Psl_cmd of the shift arm 11 in the shifting direction at a current value in STEP110, and then calculates a rotational synchronization target value, which will be discussed hereinafter, in STEP111.

Processing in the next STEP112 is carried out by a VPOLE_sl calculator 56. The VPOLE_sl calculator 56 sets VPOLE_sl to VPOLE_sl_l (=−0.95). Thus, the disturbance suppressing capability of the selection controller 51 is lowered, and the shifting operation of the shift arm 11 can be smoothly accomplished even if the shift arm 11 and a shift piece 21 interfere with each other, as described above with reference to FIG. 12. The control unit 1 then proceeds from STEP112 to STEP96 wherein it terminates the shifting/selecting operation.

FIG. 20 is a flowchart of the calculation of a rotational synchronization target value in STEP111 of FIG. 19. The calculation of the rotational synchronization target value is carried out mainly by the target position calculator 52.

In STEP120, the target position calculator 52 searches an NGEAR_cmd/Psc_def,_scf,_end,_table map shown in FIG. 20 to acquire a standby position Psc_def of a synchronizer ring in each of synchronizers 2a to 2c and each of the reverse gear trains 83, 85, and 86 that correspond to the gear selection target value NGEAR_cmd, a position Psc_scf where the rotational synchronization begins between the coupling sleeve and synchronized gears (the 1st forward gear 9a on the output side, the 2nd forward gear 9b on the output side, the 3rd forward gear 7c on the input side, the 4th forward gear 7d on the input side, the 5th forward gear 7e on the input side, the 6th forward gear 7f on the input side, the 2nd reverse gear 83, and the 3rd reverse gear 86) through the intermediary of the synchronizer rings, a position Psc_sc where the rotational synchronization ends, and a position Psc_end where the shifting operation ends.

In the subsequent STEP121, the target position calculator 52 acquires a displacement speed D_Psc_cmd_table of the shifting operation based on the gear selection target value NGEAR_cmd. Shift shocks at a low gear and the occurrence of noises of contact between a synchronizer ring and the coupling sleeve are restrained by changing the displacement speed D_Psc_cmd_table according to a selected speed.

In the next STEP122, the target position calculator 52 sets Psc_def_table, Psc_scf_table, Psc_sc_table, Psc_end_table, and D_Psc_cmd_table acquired by the aforesaid map search to corresponding target values Psc_def, Psc_scf, Psc_sc, Psc_end, and D_Psc_cmd, respectively. In the following STEP123, a halfway target position Psc_cmd_tmp of the shift arm 11 in the shifting operation is set.

After STEP124 of FIG. 21, processing of Model through Mode4 described above is carried out. If it is determined in STEP124 that the position Psc of the shift arm 11 in the shifting direction has not exceeded Psc_scf and the rotational synchronization of the coupling sleeve and a synchronizer ring is not completed, then the control unit 1 proceeds to STEP125.

In STEP125, the control unit 1 sets a Mode 1·2 flag F_mode12 indicating that the processing of Mode1 or Mode2 is being implemented (F_mode12=1). In the next STEP126, if it is determined that the position Psc of the shift arm 11 in the shifting direction has not exceeded Psc_def, that is, if the shift arm 11 has not exceeded a standby position of a synchronizer ring, then the control unit 1 proceeds to STEP127.

In STEP127, the processing of Model is implemented. The VPOLE_sc calculator 54 of the shift controller 50 sets VPOLE_sc to VPOLE_sc_11 (=−0.8). This increases the level of disturbance suppressing capability of the shift controller 50, leading to improved capability of following the target position Psc_cmd.

If it is determined in STEP126 that the position Psc of the shift arm 11 in the shifting direction has exceeded Psc_def and the shift arm 11 has reached the standby position of the synchronizer ring, then the control unit 1 proceeds to STEP160 wherein it determines whether a change amount ΔPsc of the position of the shift arm 11 in the shifting direction has exceeded a determination value ΔPsc_sc of contact between the coupling sleeve and the synchronizer ring.

If it is determined in STEP160 that ΔPsc is still below ΔPsc_sc, indicating that the coupling sleeve and the synchronizer ring are not yet in contact, then the control unit 1 proceeds to STEP161. If it is determined in STEP160 that ΔPsc has exceeded ΔPsc_sc, indicating that the coupling sleeve and the synchronizer ring are in contact, then the control unit 1 proceeds to STEP170.

In STEP161, processing of Model is carried out. The VPOLE_sc calculator 54 sets VPOLE_sc to VPOLE_sc12 (=−0.98). This lowers the level of disturbance suppressing capability of the shift controller 50, making it possible to reduce an impact when the coupling sleeve and the synchronizer ring comes into contact.

In STEP170, processing of Mode2 is carried out. The VPOLE_sc calculator 54 sets VPOLE_sc to VPOLE_sc2 (=−0.85). This increases the level of disturbance suppressing capability of the shift controller 50, making it possible to apply an appropriate pressing force to the synchronizer ring so as to synchronize the rotational speed of the coupling sleeve and a synchronized gear.

In STEP171, the target position calculator 52 sets Psc_sc to the target position Psc_cmd of the shift arm 11 in the shifting direction, and proceeds to STEP130 wherein the processing for calculation of rotational synchronization target value is terminated.

Meanwhile, if it is determined in STEP124 that the position Psc of the shift arm 11 in the shifting direction has exceeded Psc_scf, that is, if the synchronization of the rotational speeds of the coupling sleeve and the synchronized gear is completed, then the control unit 1 proceeds to STEP140. The control unit 1 determines in STEP140 whether the Mode 1·2 flag F_mode12 has been set.

If it is determined in STEP140 that the Mode 1·2 flag F_mode12 has been set (F_mode12=1), that is, if the Mode1 or Mode2 is being implemented, then the control unit 1 proceeds to STEP150 wherein it sets the shift-to-mode3 flag F_mode2to3 (F_mode2 to 3=1) and resets the Mode 1·2 flag F_mode 1·2 (F_mode1·2=0). The control unit 1 then proceeds to STEP142. If it is determined in STEP140 that the Mode 1·2 flag has been reset (F_mode12=0), that is, if Mode2 has already been finished, then the control unit 1 proceeds to STEP141 wherein it resets the shift-to-mode3 flag F_mode2to3 (F_mode2 to 3=0) before proceeding to STEP142.

In STEP142, the VPOLE_sc calculator 54 of the shift controller 50 sets VPOLE_sc to VPOLE_sc3 (=−0.7). In the next STEP143, the target position calculator 52 sets the target value Psc_cmd of the shift arm 11 in the shifting direction to Psc_end. This increases the level of disturbance suppressing capability of the shift controller 50 to prevent the shift arm 11 from overrunning a shift completion position Psc_end. The control unit 1 then proceeds from STEP143 to STEP130 wherein it ends the processing for calculating a rotational synchronization target value.

FIG. 22 shows a flowchart of the clutch control in STEP3 of FIG. 15. The control unit 1 first determines in STEP190 whether the current gear selection position NGEAR coincides with a gear selection target value NGEAR_cmd.

If it is determined in STEP190 that the current gear selection position NGEAR does not coincide with the gear selection target value NGEAR_cmd, that is, if the transmission 80 is in the process of a speed change or during the shifting/selecting operation, then the control unit 1 proceeds to STEP191 to determine whether the clocking time tm_shift of the speed changing operation reference timer has exceeded the clutch OFF completion time TM_CLOFF.

If the clocking time tm_shift of the timer is below the clutch OFF completion time TM_CLOFF and the clutch assembly 82 is being turned off, then the control unit 1 proceeds from STEP191 to STEP192 wherein the control unit 1 sets a clutch slip rate target value SR_cmd at 100%. The control unit 1 then proceeds to STEP193 to carry out the slip rate control, and proceeds to STEP194 to terminate the clutch control.

If, on the other hand, it is determined in STEP191 that the clocking time tm_shift on the timer exceeds the clutch OFF completion time TM_CLOFF, i.e., if the clutch OFF step has been completed, then the control unit 1 proceeds to STEP210 to determine whether the clocking time tm_shift on the timer exceeds a speed change time TM_SCHG.

If it is determined in STEP210 that the clocking time tm_shift on the timer exceeds the speed change time TM_SCHG, that is, if it is determined that the shifting/selecting operation of the transmission 80 has been finished, then the control unit 1 proceeds to STEP220 to set the clutch slip rate SR_cmd to 0%. The control unit 1 then proceeds to STEP193 to carry out the slip rate control, and proceeds to STEP194 to terminate the clutch control.

If, on the other hand, it is determined in STEP190 that the current gear selection position NGEAR agrees with the gear selection target value NGEAR_cmd, indicating that the speed changing operation on the transmission 80 has been completed, then the control unit 1 proceeds from STEP190 to STEP200 to acquire a travel target slip rate SR_cmd_dr by applying a driving force index Udrv and a vehicle speed VP to the Udrv, VP/SR_cmd_dr map shown in FIG. 22.

In the subsequent STEP201, the control unit 1 sets the travel target slip rate SR_cmd_dr at the target slip rate SR_cmd, and then proceeds to STEP193 to carry out the slip rate control. The control unit 1 then proceeds to STEP194 to terminate the clutch control.

The control unit 1 has the construction shown in FIG. 23 to carry out the slip rate control. Referring to FIG. 23, a slip rate controller 60 controls a clutch mechanism 61 composed of a clutch actuator 16 shown in FIG. 1 and the clutch assembly 82. The slip rate controller 60 determines a clutch stroke Pcl of the clutch assembly 82, which is changed by the clutch actuator 16, such that a clutch rotational speed NC of the clutch mechanism 61 coincides with a clutch rotational speed target value NC_cmd.

The slip rate SR between clutch discs (not shown) in the clutch assembly 82 changes according to the clutch stroke Pcl, and the driving force transmitted from the engine 81 shown in FIG. 1 to the input shaft 5 through the intermediary of the clutch assembly 82 increases or decreases accordingly. Hence, the clutch rotational speed NC can be controlled by changing the clutch stroke Pcl.

The slip rate controller 60 includes a target value filter 62 that performs filtering computation on the clutch rotational speed target value NC_cmd to calculate a filtering target value NC_cmd_f, and a response specifying control unit 63 that determines a clutch stroke Pcl, which is a control input value for the clutch mechanism 61, by using the response specifying control.

The response specifying control unit 63 models the clutch mechanism 61 according to equation (32) given below and includes an equivalent control input calculator 67 for calculating an equivalent control input Ueq_sr, a subtracter 64 for calculating a difference Enc between the filtering target value NC_cmd_f and the clutch rotational speed NC, a switching function value calculator 65 for calculating a value of a switching function σ_sr, a reaching law input calculator 66 for calculating a reaching law input Urch_sr, and an adder 68 for calculating the clutch stroke Pcl by adding the equivalent control input Ueq_sr and the reaching law input Urch_sr.

$$NC(k+1)=a1\_sr(k)\cdot NC(k)+b1\_sr(k)\cdot Pcl(k)+c1\_sr(k) \quad (32)$$

where a1_sr(k), b1_sr(k), and c1_sr(k): Model parameters in a k-th control cycle.

A target value filter 62 carries out filtering computation according to the following equation (33) using the clutch rotational speed target value NC_cmd so as to calculate the filtering target value NC_cmd_f.

$$NC\_cmd\_f(k)=POLE\_F\_sr\cdot NC\_cmd\_f(k-1)+(1+POLE\_F\_sr)\cdot NC\_cmd(k) \quad (33)$$

where k: Control cycle number; NC_cmd_f(k): Filtering target value in a k-th control cycle; and POLE_F_sr: Target value filter coefficient.

The above equation (33) applies to a first-order lag filer. The filtering target value NC_cmd_f takes a value that converges, with a response delay, to the clutch rotational speed target value NC_cmd after a change when the change takes place in the clutch rotational speed target value NC_cmd. The degree of the response delay of the filtering target value NC_cmd_f with respect to the clutch rotational speed target value NC_cmd changes with a set value of the target value filter coefficient POLE_F_sr. If the clutch rotational speed target value NC_cmd remains constant, then the filtering target value NC_cmd_f will be equal to the clutch rotational speed target value NC_cmd.

The switching function value calculator 65 calculates the switching function value σ_sr according to the following equation (35) from a difference Enc_sr calculated by the subtracter 64 according to the following equation (34).

$$Enc\_sr(k)=NC(k)-NC\_cmd\_f(k) \qquad (34)$$

$$\sigma\_sr(k)=Enc\_sr(k)+POLE\_sr \cdot Enc\_sr(k-1) \qquad (35)$$

where σ_sr(k): Switching function value in a k-th control cycle; and POLE_sr: Switching function setting parameter (−1<POLE_sr<0).

The equivalent control input calculator 64 calculates an equivalent control input Ueq_sr according to an equation (36) given below. Equation (36) calculates the clutch stroke Pcl as an equivalent control input Ueq_sr(k) by applying σ_sr(k+1)=σ_sr(k) and the above equations (35), (32), and (33).

$$Ueq\_sr(k) = \frac{1}{b1\_sr(k)}\{(1-a1\_sr(k)+POLE\_sr) \cdot \qquad (36)$$
$$NC(k)+POLE\_sr \cdot NC(k-1) -$$
$$c1\_sr(k)+NC\_cmd\_f(k+1)+(POLE\_sr-1) \cdot$$
$$NC\_cmd\_f(k) -$$
$$POLE\_sr \cdot NC\_cmd\_f(k-1)\}$$

where POLE_sr: Switching function setting parameter (−1<POLE_sr<0); and a1_sr(k), b1_sr(k), c1_sr(k): Model parameters in a k-th control cycle.

A reaching law input calculator 66 calculates the reaching law input Urch_sr(k) according to an equation (37) given below. A reaching law input Urch_sr(k) is an input for placing a difference state amount (Enc_sr(k), Enc_sr(k−1)) on a switching straight line having the switching function σ_sr set as 0 (σ_sr(k)=0).

$$Urch\_sr(k) = -\frac{Krch\_sr}{b1\_sr(k)} \cdot \sigma\_sr(k) \qquad (37)$$

where Urch_sr(k): Reaching law input in a k-th control cycle; and Krch_sr: Feedback gain.

An adder 68 calculates the clutch stroke Pcl, which is a control input supplied to the clutch mechanism 61, according to the following equation (38).

$$Pcl(k)=Ueq\_sr(k)+Urch\_sr(k) \qquad (38)$$

As shown in an equation (39) given below, an absolute value of the switching function setting parameter POLE_sr (a computing coefficient that determines the convergent speed of a difference between the filtering target value NC_cmd_f and the actual clutch rotational speed NC) is set to be smaller than an absolute value of the target filter coefficient POLE_F_sr (a computing coefficient that determines the speed at which the filtering target value NC_cmd_f converges to the clutch rotational speed target value NC_cmd in the filtering computation).

$$-1<POLE\_F\_sr<POLE\_sr<0 \qquad (39)$$

Thus, a follow-up speed of the clutch rotational speed NC when the clutch rotational speed target value NC_cmd changes can be specified with relatively controlled influences of the switching function setting parameter POLE_sr. This makes it possible to further accurately specify a follow-up speed of the clutch rotational speed NC in response to a change in the clutch rotational speed target value NC_cmd by setting the target filter coefficient POLE_F_sr.

If the clutch rotational speed target value NC_cmd remains constant, then the filtering target value NC_cmd_f and the clutch rotational speed target value NC_cmd will be equal. Under the condition, if disturbance causes the clutch rotational speed NC to change, then the convergent behavior for a difference (NC−NC_cmd) between the clutch rotational speed NC and the clutch rotational speed target value NC_cmd can be set by the switching function setting parameter POLE_sr in the above equation (35).

Therefore, the slip rate controller 60 makes it possible to independently specify the follow-up speed of the actual clutch rotational speed NC with respect to the clutch rotational speed target value NC_cmd by setting the target filter coefficient POLE_F_sr in the above equation (33) when the clutch rotational speed target value NC_cmd changes. Moreover, the convergent speed of a difference between the clutch rotational speed target value NC_cmd and the actual clutch rotational speed NC can be independently set by setting the switching function setting parameter POLE_sr in the above equation (35).

An identifier 70 carries out processing for correcting the model parameters (a1_sr, b1_sr, and c1_sr) of the clutch mechanism 61 for each control cycle of the slip rate controller 60 so as to suppress influences of modeling errors from the above equation (32).

The identifier 70 calculates the model parameters (a1_sr, b1_sr, and c1_sr) of the above equation (32) according to equations (40) to (48). The above equation (32) can be represented in terms of the following equation (42) using a vector ζ_sr defined by the following equation (40) and a vector θ_sr defined by the following equation (41).

$$\zeta\_sr^T(k)=[NC(k-1)\ Pcl(k-1)\ 1] \qquad (40)$$

$$\theta\_sr^T(k)=[a1\_sr(k)\ b1\_sr(k)\ c1\_sr(k)] \qquad (41)$$

$$NC\_hat(k)=\theta\_sr^T(k-1)\cdot\zeta\_sr(k) \qquad (42)$$

where NC_hat(k): Estimated value of clutch rotational speed in a k-th control cycle.

The identifier 70 first calculates, according to an equation (43) given below, a difference e_id_sr between a clutch rotational speed estimated value NC_hat obtained by the above equation (42) and the actual clutch rotational speed NC as the value representing a modeling error in the above equation (32). Hereinafter, the difference e_id_sr will be referred to as an identification error e_id_sr.

$$e\_id\_sr(k)=NC(k)-NC\_hat(k) \qquad (43)$$

where e_id(k): Difference between clutch rotational speed estimated value NC_hat(k) and actual clutch rotational speed NC(k) in a k-th control cycle.

Then, the identifier 70 calculates P_sr, which denotes a tertiary square matrix, according to a recurrence formula of the following equation (44), and then calculates a tertiary vector KP_sr, which is a gain coefficient vector specifying the degree of change based on the identification error e_id_sr, according to the following equation (45).

$$P\_sr(k+1) = \frac{1}{\lambda_1\_sr} \quad (44)$$

$$\left\{ I - \frac{\lambda_2\_sr \cdot P\_sr(k) \cdot \varsigma\_sr(k) \cdot (\varsigma\_sr)^T(k)}{\lambda_1\_sr + \lambda_2\_sr \cdot \varsigma\_sr^T(k) \cdot P\_sr(k) \cdot \varsigma\_sr(k)} \right\} \cdot P\_sr(k)$$

where I: Unit matrix; and $\lambda\_sr_1$, $\lambda\_sr_2$: Identification weighting parameters.

$$KP\_sr(k) = \frac{P\_sr(k) \cdot \varsigma\_sr(k)}{1 + \varsigma\_sr^T(k) \cdot P\_sr(k) \cdot \varsigma\_sr(k)} \quad (45)$$

The identifier 70 calculates a parameter correction value $d\theta\_sr$ according to an equation (47) given below, using a predetermined reference parameter $\theta base\_sr$ defined by an equation (46) given below, the value of KP_sr calculated according to the above equation (45), and the value of e_id_sr calculated according to the above equation (43).

$$\theta base\_sr^T(k) = [a1base\_sr \; b1base\_sr \; 0] \quad (46)$$

$$d\theta\_sr(k) = d\theta\_sr(k-1) + KP\_sr(k) \cdot e\_id\_sr(k) \quad (47)$$

Then, the identifier 70 uses the following equation (48) to calculate a new model parameter $\theta\_sr^T(k) = [a1\_sr(k) \; b1\_sr(k) \; c1\_sr(k)]$.

$$\theta\_sr(k) = \theta base\_sr(k) + d\theta\_sr(k) \quad (48)$$

FIG. 24 shows the flowchart of the slip rate control conducted in STEP193 of FIG. 22. The control unit 1 first calculates the clutch rotational speed target value NC_cmd according to the following equation (49) in STEP230.

$$NC\_cmd(k) = \frac{NE(k) \cdot (100 - SR\_cmd)}{100} \quad (49)$$

where NC_cmd(k): Clutch rotational speed target value in a k-th control cycle; NE(k): Engine speed in a k-th control cycle; and SR_cmd: Target slip rate.

In subsequent STEP231 through STEP234, and STEP240, processing is implemented by the identifier 70 to identify the model parameters a1_sr, b1_sr, and c1_sr of the clutch mechanism 61. In STEP231, the identifier 70 applies the clutch rotational speed NC to the NC/a1base_sr map shown in FIG. 24 to acquire a reference parameter a1base_sr(k) and also applies the clutch position Pcl to the Pcl/b1base_sr map given in the figure to acquire a reference parameter b1base_sr(k).

If it is determined in the next STEP232 that the clutch stroke Pcl has not exceeded a clutch OFF position Pcloff, which means that the clutch assembly 82 is not in the OFF state, then the identifier 70 proceeds to STEP233 to calculate a correction value $d\theta\_sr(k)$ of a model parameter according to the above equation (47) before it proceeds to STEP234.

If, on the other hand, it is determined in STEP232 that the clutch stroke Pcl has exceeded the clutch OFF position Pcloff, which means that the clutch assembly 82 is in the OFF state, then the identifier 70 proceeds to STEP240 without updating the correction value $d\theta\_sr$ of the model parameter. This arrangement makes it possible to prevent the correction value $d\theta\_sr$ of the model parameter from increasing if the clutch rotational speed NC in the clutch OFF state does not reach zero (the target clutch rotational speed NC_cmd based on the target slip rate 100%) while the speed changing operation is being performed.

In the subsequent STEP234, the identifier 70 calculates model parameter identification values (a1_sr(k), b1_sr(k), and c1_sr(k)) according to the above equation (48). In STEP235, the slip rate controller 60 operates the subtracter 64, the switching function value calculator 65, the reaching law input calculator 66, the equivalent control input calculator 67, and the adder 68 to carry out computation according to the above equations (33) to (38) so as to determine the clutch stroke control input value Pcl(k) supplied to the clutch mechanism 61. The identifier 70 then proceeds to STEP236 to terminate the processing of the slip rate control.

In the present embodiment, the shift controller 50 and the selection controller 51 have used the sliding mode control as the response specifying control in the present invention. Alternatively, however, other types of response specifying control, such as back-stepping control, may be used. Furthermore, control values of the voltages to be applied to a selection motor may be calculated according a method other than the response specifying control.

In the present embodiment, the adaptation disturbance observer 57 has calculated the model parameter c1_sl(k) of the disturbance component term in the model equation in the above equation (8) as an estimated value of the disturbance applied to the selecting mechanism of the transmission 80. Alternatively, however, disturbances applied to the selecting mechanism may be estimated using other methods.

In the present embodiment, only the model parameter c1_sl(k) of the disturbance component term in the model equation of the above equation (8) has been identified by the adaptation disturbance observer 57. Alternatively, however, other model parameters may also be identified.

Second Embodiment

Referring now to FIG. 25, a control unit 1 in a second embodiment has replaced the adaptation disturbance observer 57 of the control unit 1 in the first embodiment shown in FIG. 4 by a partial parameter identifier 100.

The partial parameter identifier 100 identifies model parameters b1_sl, b2_sl, and c1_sl (corresponding to the identification model parameters in the present invention) used for the sliding mode control (corresponding to the response specifying control in the present invention) performed by a sliding mode controller 55.

Referring to FIG. 25, the sliding mode controller 55 of the selection controller 51 models a selecting mechanism 40 of a transmission 80, which moves the shift arm 11 in the selecting direction, according to the following equation (50) representing the position Psl of the shift arm 11 in the selecting direction in terms of a voltage Vsl to be applied to the selection motor 12 (corresponding to the control input supplied to the selection actuator in the present invention).

$$Psl(k+1) = a1\_sl \cdot Psl(k) + a2\_sl \cdot Psl(k-1) + \quad (50)$$
$$b1\_sl(k+1) \cdot Vsl(k) + b2\_sl(k+1) \cdot Vsl(k-1) + c1\_sl(k+1)$$

where Psl(k+1), Psl(k), Psl(k−1): Positions of the shift arm in a k+1(th) control cycle, a k-th control cycle, and a k−1(th) control cycle; Vsl(k) and Vsl(k−1): Voltages applied to the selection motor in a k-th control cycle and k−1 (th) control cycle; a1_sl and a2_sl: Model parameters; and b1_sl(k+1), b2_sl(k+1), and c1_sl(k+1): Identification values of model parameters in a k+1(th) control cycle.

The partial parameter identifier 100 carries out identification processing only on b1_sl and b2_sl, which are the coefficients of control input component terms related to the voltage Vsl applied to the selection motor 12 and which are closely related to changes in the dynamic characteristic of the selecting mechanism 40, and c1_sl, which is a disturbance component term, among the model parameters a1_sl, a2_sl, b1_sl, b2_sl, and c1_sl in the above equation (50).

The model parameters b1_sl, b2_sl, and c1_sl to be identified correspond to the identification model parameters in the present invention, while a1_sl and a2_sl, which are not to be identified, correspond to the non-identification model parameters in the present invention. An identification value of the disturbance component term c1_sl corresponds to an estimated disturbance value in the present invention.

Delaying the above equation (50) by one control cycle, the component terms related to the identification model parameters b1_sl, b2_sl, and c1_sl are placed together on the right side, while the remaining component terms are put together on the left side. This leads to the following equation (51).

$$Psl(k) - a1\_sl \cdot Psl(k-1) - a2\_sl \cdot Psl(k-2) = \quad (51)$$
$$b1\_sl(k) \cdot Vsl(k-1) + b2\_sl(k) \cdot Vsl(k-2) + c1\_sl(k)$$

Further, if the left side of the above equation (51) is defined as W(k), as shown in the following equation (52), while right side is defined as W_hat(k), as shown in the following equation (53), then W(k) will be a virtual output of a virtual plant 110 shown in FIG. 27. Hence, W(k) can be regarded as a model output of the virtual plant 110, and W_hat(k) can be regarded as a model equation of the virtual plant 110.

$$W(k)=Psl(k)-a1\_sl \cdot Psl(k-1)-a2\_sl \cdot Psl(k-2) \quad (52)$$

where W(k): Model output of the virtual plant in a k-th control cycle.

$$W\_hat(k)=b1\_sl(k) \cdot Vsl(k-1)+b2\_sl(k) \cdot Vsl(k-2)+c1_{13}sl(k) \quad (53)$$

where W_hat(k): Model equation of the virtual plant in a k-th control cycle.

The virtual plant 110 shown in FIG. 27 subtracts a component, which is obtained by delaying Psl(k) one control cycle by a $Z^{-1}$ converter 111 and multiplying the delayed Psl(k) by a1_sl by a multiplier 113, and a component, which is obtained by delaying Psl(k) two control cycles by the $Z^{-1}$ converter 111 and a $Z^{-1}$ converter 114 and multiplying the delayed Psl(k) by a2_sl by a multiplier 115, from the component of the position Psl(k) of the shift arm 11, and then outputs the result as W(k).

The model equation of the virtual plant 110 of the above equation (53) is formed only of the component terms related to the identification model parameters b1_sl(k), b2_sl(k), and c1_sl(k). Therefore, calculating the model parameters of the virtual plant 110 by using a sequential identification algorithm such that the output W(k) of the virtual plant 110 agrees with the model output W_hat(k) makes it possible to achieve sequential identification of the identification model parameters b1_sl(k), b2_sl(k), and c1_sl(k).

The partial parameter identifier 100 executes the processing for identifying the identification model parameters b1_sl(k), b2_sl(k), and c1_sl(k) according to the following equations (54) to (60). First, $\xi\_sl(k)$ is defined according to the following equation (54), and then $\theta\_sl(k)$ is defined according to the following equation (55). An output using the model parameters b1_sl(k−1), b2_sl(k−1), and c1_sl(k−1) in an immediately preceding control cycle, which have already been calculated, rather than the model parameters b1_sl(k), b2_sl(k), and c1_sl(k) in the above equation (53) is defined as W_hat'(k), as shown in the following equation (56).

$$\zeta\_sl^T(k)=[Vsl(k-1)\ Vsl(k-2)\ 1] \quad (54)$$

$$\theta\_sl^T(k)=[b1\_sl(k)\ b2\_sl(k)\ c1\_sl(k)] \quad (55)$$

$$W\_hat'(k) = b1\_sl(k-1) \cdot Vsl(k-1) + b2\_sl(k-1) \cdot \quad (56)$$
$$Vsl(k-2) + c1\_sl(k-1)$$
$$= \theta\_sl^T(k-1) \cdot \varsigma\_sl(k)$$

Then, a difference E_id_sl(k) between the model output W_hat'(k) and the output W(k) of the virtual plant 110 is calculated according to the following equation (57), the calculation result representing a modeling error of the above equation (56)(hereinafter, the error E_id_sl(k) will be referred to as the "identification error E_id_sl(k)").

$$E\_id\_sl(k)=W(k)-W\_hat'(k) \quad (57)$$

where E_id_sl(k): Difference between the output W(k) of the virtual plant in a k-th control cycle and the model output W_hat'(k).

The partial parameter identifier 100 calculates P_sl, which denotes a tertiary square matrix, according to a recurrence formula of the following equation (58), and then calculates a tertiary vector KP_sl, which is a gain coefficient vector specifying the degree of change based on the identification error E_id_sl(k), according to the following equation (59).

$$P\_sl(k+1) = \quad (58)$$
$$\frac{1}{\lambda_1\_sl}\left\{I - \frac{\lambda_2\_sl \cdot P\_sl(k) \cdot \varsigma\_sl(k) \cdot \varsigma\_sl^T(k)}{\lambda_1\_sl + \lambda_2\_sl \cdot \varsigma\_sl^T(k) \cdot P\_sl(k) \cdot \varsigma\_sl(k)}\right\} \cdot P\_sl(k)$$

where I: Unit matrix of 3×3; and $\lambda_1\_sl$, $\lambda_2\_sl$: Identification weighting parameters.

$$KP\_sl(k) = \frac{P\_sl(k) \cdot \varsigma\_sl(k)}{1 + \varsigma\_sl^T(k) \cdot P\_sl(k) \cdot \varsigma\_sl(k)} \quad (59)$$

The settings of the identification weighting parameters $\lambda_1\_sl$ and $\lambda_2\_sl$ in the above equation (58) have the meanings shown in the following Table 2.

TABLE 2

| $\lambda_1\_sl, \lambda_2\_sl$ | Settings of $\lambda_1\_sl$ and $\lambda_2\_sl$ Meaning |
|---|---|
| 1, 0 | Fixed gain |
| 1, 1 | Method of least squares |
| 1, λ | Decrescent gain. λ indicates a variable. |
| λ, 1 | Weighted method of least squares. λ indicates a variable. |

Then, the partial parameter identifier 100 calculates identification values $\theta\_sl^T(k)=[b1\_sl(k)\ b2\_sl(k)\ c1\_sl(k)]$ of a new model parameter according to the following equation (60).

$$\theta\_sl(k)=\theta\_sl(k-1)+KP\_sl(k)\cdot E\_id\_sl(k) \quad (60)$$

Using the identification value of the calculated model parameter, a reaching law input calculator 43 shown in FIG. 26 calculates a reaching law input Urch_sl(k) according to the following equation (61). The reaching law input Urch_sl(k) is an input used for putting error state amounts (E_sl(k), E_sl(k−1)) on a switching straight line having the switching function σ_sl set to zero (σ_sl(k)=0).

$$Urch\_sl(k) = -\frac{Krch\_sl}{b1\_sl(k)}\cdot \sigma\_sl(k) \quad (61)$$

where Urch_sl(k): Reaching law input in a k-th control cycle; and Krch_sl: Feedback gain.

An equivalent control input calculator 44 shown in FIG. 26 calculates an equivalent control input Ueq_sl(k) according to the following equation (62). The equation (62) sets σ_sl(k+1)=σ_sl(k) and calculates a control value Vsl(k) of a voltage to be applied to the selection motor 12, which is obtained by introducing the above equations (9) and (50), as the equivalent control input Ueq_sl(k).

$$Ueq\_sl(k) = \frac{1}{b1\_sl(k)}\{(1 - VPOLE\_sl - a1\_sl)\cdot Psl(k) + \quad (62)$$
$$(VPOLE\_sl - a2\_sl)\cdot Psl(k-1) - b2\_sl(k)\cdot Vsl(k-1) +$$
$$Psl\_cmd(k) + (VPOLE\_sl - 1)\cdot Psl\_cmd(k-1) -$$
$$VPOLE\_sl \cdot Psl\_cmd(k-2) - c1\_sl(k)\}$$

where Ueq_sl(k): Equivalent control input in a k-th control cycle.

The adder 45 calculates the control value Vsl of a voltage to be applied to the selection motor 12 of the selecting mechanism 40 according to the above equation (13).

As explained above, the partial parameter identifier 100 carries out identification processing only on b1_sl, b2_sl, and c1_sl, which are closely related to changes in the dynamic characteristic of the selecting mechanism 40, among the model parameters a1_sl, a2_sl, b1_s1, b2_sl, and c1_sl in the above equation (50). The sliding mode controller 55 of the selection controller 51 uses b1_sl(k), b2_sl(k), and c1_sl(k), which have been identified by the partial parameter identifier 100, to calculate a control value Vsl of a voltage to be applied to the selection motor 12.

In this case, the time required for a model parameter to converge to an optimum value can be shortened by decreasing the number of model parameters to be identified. The computation volume will be reduced with a resultant shorter computation time, as compared with a case where all model parameters are identified, so that the controllability of the selection controller 51 can be enhanced by setting a control cycle of the selection controller 51 to be shorter.

FIG. 28 is a graph showing displacements of the shift arm 11 in the selecting operation. The axis of ordinates indicates the actual position Psl and the target position Psl_cmd of the shift arm 11 in the selecting operation, and the axis of abscissas indicates time t. When the target position is changed from Psl_cmd70 to Psl_cmd71 at $t_{71}$ to start the selecting operation, a modeling error is quickly absorbed by the identification processing of the model parameters b1_sl(k), b2_sl(k), and c1_sl(k) by the partial parameter identifier 100.

Thus, the position Psl of the shift arm 11 converges to a target position Psl_cmd71 without overshooting the target position Psl_cmd71 or causing vibrations. Then, the selecting operation is quickly completed at $t_{72}$ when the conditions that determine the completion of the selecting operation, namely, (1) ΔPsl (=Psl−Psl_cmd)<D_Pslf (a determination value of a rate of change) and (2)|Psl−Psl_cmd61 |<E_Pslf (a determination value of difference) are satisfied.

The procedure for controlling the transmission 80 by the control unit 1 in the second embodiment is identical to that of the control unit 1 in the first embodiment described with reference to FIG. 15 to FIG. 24 except for the processing of calculating the equivalent control input Ueq_sl(k) and the reaching law input Ueq_sl(k) in STEP39 of FIG. 18.

More specifically, the partial parameter 100 carries out the identification processing based on the above equations (56) to (60) to calculate model parameters b1_sl(k), b2_sl(k), and c1_sl(k). The sliding mode controller 55 calculates the reaching law input Urch_sl(k) according to the above equation (61) and calculates the equivalent control input Ueq_sl(k) according to the above equation (62).

As an alternative of the selection controller 51 in the second embodiment, a parameter scheduler 101 for setting reference values of the model parameters a1_sl, a2_sl, b1_sl, and b2_sl in the above equation (50) according to the position Psl of the shift arm 11 may be provided, as shown in FIG. 29.

The parameter scheduler 101 applies the position Psl of the shift arm 11 to "Psl/a1_sl, a2_sl, b1_slb, b2_slb MAP" shown in FIG. 30 to acquire schedule values of the model parameters a1_sl, a2_sl, b1_slb, and b2_slb, which corresponds to Psl. The data of the "Psl/a1_sl, a2_sl, b1_slb, b2_slb MAP" is stored in a memory (not shown) in advance.

Referring back to FIG. 2A, the shift arm 11 is actually moved in the selecting direction by converting the rotation of the shift/selection shaft 20 into substantially linear movement through the intermediary of the crank mechanism (not shown). Therefore, the effective inertia of the shift arm 11 changes according to the configuration of the crank mechanism. It is possible therefore to reduce a modeling error by changing the model parameters according to the position Psl of the shift arm 11.

Further, the partial parameter identifier 100 corrects, according to the following equation (66), a reference value θbase_sl(k) of an identification model parameter defined by the following equation (63) by using dθ_sl(k) defined by the following equations (64) and (65) so as to calculate identification model parameters b1_sl(k), b2_sl(k), and c1_sl(k) in each control cycle. Thus, calculating the identification model parameters b1_sl(k), b2_sl(k), and c1_sl(k) by using θbase_sl(k) acquired from the "Psl/a1_sl, a2_sl, b1_slb, b2_slb MAP" makes it possible to restrain the influence of a modeling error caused by changes in the effective inertia of the shift arm 11 in the calculation of the identification model parameters b1_sl(k), b2_sl(k), and c1_sl(k).

$$\theta base\_sl^T(k)=[b1\_slb(k)\ b2\_slb(k)\ 0] \quad (63)$$

$$d\theta\_sl^T(k)=[db1\_sl(k)\ db2\_sl(k)\ dc1\_sl(k)] \quad (64)$$

$$d\theta\_sl(k)=\omega\_sl\cdot d\theta(k-1)+KP\_sl(k)\cdot E\_id\_sl(k) \quad (65)$$

$$\theta\_sl(k)=\theta base\_sl(k)+d\theta\_sl(k) \quad (66)$$

The feature for setting the non-identification parameters a1_sl and a2_sl on the basis of the position Psl of the shift arm 11 in the selecting direction by the parameter scheduler 101 corresponds to the non-identification parameter changer in the present invention. The feature for setting the reference values b1_slb and b2_slb of the identification model parameters on the basis of the position Psl of the shift arm 11 in the selecting direction by the parameter scheduler 101 corresponds to the identification parameter reference value setter in the present invention.

In the present embodiment, among the model parameters a1_sl, a2_sl, b1_sl, b2_sl, and c1_sl in the above equation (50), b1_sl, b2_sl, and c1_sl have been selected as the identification model parameters, while a1_sl and a2_sl have been selected as the non-identification model parameters. The selection of the identification model parameters, however, is not limited to the above. Other identification model parameters that are closely related to changes in the dynamic characteristic of the selecting mechanism may be selected according to the specifications of a transmission.

In the first embodiment and the second embodiment described above, the shift controller 50 and the selection controller 51 have adopted the sliding mode control as the response specifying control in the present invention. Alternatively, however, other types of response specifying control, such as back-stepping control, may be used. Furthermore, a control method other than the response specifying control may be used.

What is claimed is:

1. A transmission control system comprising:
   a selection controller which controls an operation of a selection actuator for moving a shift arm in a selecting direction so as to position the shift arm in a selected speed position, the shift arm being provided in a transmission to perform a selecting operation and a shifting operation and displaced from a neutral position in the shifting operation to establish a predetermined speed; and
   disturbance estimating means for estimating a disturbance applied to a selecting mechanism of the transmission during the selecting operation,
   wherein the selection controller determines a control input to be supplied to the selection actuator on the basis of an estimated disturbance value given by the disturbance estimating means.

2. The transmission control system according to claim 1, wherein the disturbance estimating means estimates the disturbance applied to the selecting mechanism of the transmission on the basis of the control input to be supplied to the selection actuator and a position of the shift arm in the selecting direction.

3. The transmission control system according to claim 1 or 2, wherein the selection controller calculates the control input to be supplied to the selection actuator by using response specifying control in which a behavior and a speed for attenuating a difference between a target position and an actual position of the shift arm can be variably specified.

4. The transmission control system according to claim 3, wherein the selection controller calculates a control input to be supplied to the selection actuator on the basis of an equivalent control input and a reaching law input calculated using the estimated disturbance value given by the disturbance estimating means in the response specifying control.

5. The transmission control system according to claim 1, wherein the disturbance estimating means calculates, as the estimated disturbance value, an identification value of a model parameter of a disturbance component term in a model equation that has modeled the selecting mechanism of the transmission by using a plurality of model parameters.

6. A transmission control system according to claim 5, wherein the selection controller carries out processing for identifying only the model parameter of the disturbance component term, while remaining model parameters being set to fixed values.

7. The transmission control system according to claim 5 or 6, wherein the disturbance estimating means calculates the identification value of the model parameter of the disturbance component term in each control cycle on the basis of a difference between an estimated position of the shift arm calculated using the model parameter of the disturbance component term in a previous control cycle and an actual position of the shift arm.

8. The transmission control system according to claim 5, further comprising:
   partial parameter identifying means for identifying an identification model parameter so as to minimize a difference between an output of a virtual plant that outputs an equation formed of a component term related to a non-identification model parameter not to be identified among the model parameters and an output of a model equation of the virtual plant that is formed of a component term related to the identification model parameter including the disturbance component term to be identified among the model parameters,
   wherein the model equation represents a position of the shift arm in the selecting direction in each predetermined control cycle by a positional component term related to the position of the shift arm in the selecting direction in a previous control cycle, a control input component term related to the control input supplied to the selection actuator in the previous control cycle, and the disturbance component term, and a coefficient of a positional component term, a coefficient of a control input component term, and the disturbance component term are used as the plurality of model parameters, and
   the selection controller uses the identification model parameter identified by the partial parameter identifying means and the non-identification model parameter to determine the control input to the selection actuator.

9. The transmission control system according to claim 8, wherein the identification model parameters are the coefficient of the control input component term and the disturbance component term, and the non-identification parameter is the coefficient of the positional component term.

10. The transmission control system according to claim 8 or 9, further comprising non-identification parameter changing means for changing the non-identification model parameter on the basis of a position of the shift arm.

11. The transmission control system according to claim 8, further comprising:
    identification parameter reference value setting means for setting a reference value of the identification model parameter on the basis of a position of the shift arm,
    wherein the partial parameter identifying means corrects the identification parameter reference value on the basis of a difference between an output of the virtual plant and a model equation of the virtual plant thereby to identify the identification model parameter.

12. A transmission control system comprising:
    a selection controller which controls an operation of a selection actuator for moving a shift arm in a selecting direction so as to position the shift arm in a selected speed position, the shift arm being provided in a transmission to perform a selecting operation and a shifting operation and displaced from a neutral position in the shifting operation to establish a predetermined speed; and partial parameter identifying means for identifying an identification model parameter so as to minimize a difference between an output of a virtual plant that outputs an equation formed of a component term related to a non-identification model parameter not to be identified among model parameters and an output of a model equation of the virtual plant that is formed of a component term related to an identification model parameter to be identified among the model parameters by using a model equation which models a selecting mechanism of the transmission, represents a position of the shift arm in a selecting direction in each predetermined control cycle by a positional component term related to a position of the shift arm in the selecting direction in a previous control cycle, a control input component term related to a control input to the selection actuator in the previous control cycle, and a disturbance component term, and uses a coefficient of the position component term, a coefficient of the control input component term, and the disturbance component term as model parameters, wherein the selection controller determines a control input to be supplied to the selection actuator on the basis of the identification model parameter identified by the partial parameter identifying means and the non-identification model parameter.

* * * * *